United States Patent
Moore et al.

(10) Patent No.: US 6,190,936 B1
(45) Date of Patent: Feb. 20, 2001

(54) INTERCONNECT PASSIVATION AND METALLIZATION PROCESS OPTIMIZED TO MAXIMIZE REFLECTANCE

(75) Inventors: Paul McKay Moore, San Bruno; Kevin Carl Brown, Sunnyvale; Richard Luttrell, Scotts Valley, all of CA (US)

(73) Assignee: National Semiconductor Corp., Santa Clara, CA (US)

( * ) Notice: Under 35 U.S.C. 154(b), the term of this patent shall be extended for 0 days.

(21) Appl. No.: 09/313,961

(22) Filed: May 18, 1999

Related U.S. Application Data

(63) Continuation-in-part of application No. 09/136,627, filed on Aug. 19, 1998.

(51) Int. Cl.[7] .................................................. M01L 21/00

(52) U.S. Cl. .......................... 438/36; 438/618; 438/158; 438/30; 438/48; 438/160; 438/152; 257/351; 349/113

(58) Field of Search ............................ 438/36, 618, 158, 438/160, 30, 151, 152, 258, 675, 48; 349/113, 156; 257/351

(56) References Cited

U.S. PATENT DOCUMENTS

| | | | |
|---|---|---|---|
| 3,862,360 | 1/1975 | Dill et al. | 178/7.3 D |
| 4,024,626 | 5/1977 | Leupp et al. | 29/571 |
| 4,103,297 | 7/1978 | McGreivy et al. | 340/324 M |
| 4,125,446 | 11/1978 | Hartsough et al. | 204/192 P |
| 4,185,894 | * 1/1980 | Hilton et al. | 350/338 |
| 4,191,452 | 3/1980 | Grinberg et al. | 350/342 |
| 4,239,346 | * 12/1980 | Lloyd | 350/334 |
| 4,302,498 | 11/1981 | Faith | 428/209 |
| 4,382,658 | 5/1983 | Shields et al. | 350/334 |

(List continued on next page.)

OTHER PUBLICATIONS

Cacharelis, P., et al., "18.1: An 0.8–um EEPROM Technology Modified for a Reflective PDLC Light–Valve Application", SID 97 Digest, pp. 289–292 (May 1997).

Sato, F., et al., "L1.2: High Resolution and Bright LCD Projector with Reflective LCD Panels", SID 97 Digest, pp. 997–1000 (1997).

Sugiura, N., et al., "42.1: Designing Bright Reflective Full–color LCD's Using an Optimized Reflector", SID 97 Digest, pp. 1011–1014, (1997).

(List continued on next page.)

Primary Examiner—Matthew Smith
Assistant Examiner—V. Yevsikov
(74) Attorney, Agent, or Firm—Limbach & Limbach LLP

(57) ABSTRACT

A metal surface having optimized reflectance is created utilizing the following process steps alone or in combination: 1) performing alloy/sintering of the metal-silicon interface prior to a chemical mechanical polish of the intermetal dielectric before the reflective metal electrode is formed; 2) chemical-mechanical polishing the intermetal dielectric layer again after vias are formed; 3) forming a metal adhesion layer composed of collimated titanium over the underlying dielectric; 4) depositing metal upon the adhesion layer at as low a temperature as feasible to maintain small grain size; 5) depositing at least the first layer of the reflectance enhancing coating on top of the freshly deposited metal prior to etching the metal; and 6) depositing the initial layer of the reflective enhancing coating at a temperature as close as possible to the temperature of formation of the metal electrode layer in order to suppress hillock formation in the metal. Deposition of the REC serves two distinct purposes. First, the REC coats the freshly deposited metal layer immediately following deposition, preserving the metal in its highly reflective state. Second, the REC generates constructive interference of light reflected by the metal layer. This constructive interference can generate reflectivity greater than that of the bare metal surface.

23 Claims, 41 Drawing Sheets

U.S. PATENT DOCUMENTS

| | | | |
|---|---|---|---|
| 4,431,271 | 2/1984 | Okubo | 350/334 |
| 4,470,060 | 9/1984 | Yamazaki | 357/41 |
| 4,602,850 | 7/1986 | DeBenedetti | 350/333 |
| 4,839,707 | 6/1989 | Shields | 357/23.7 |
| 4,999,619 | 3/1991 | Velde | 340/784 |
| 5,159,476 | 10/1992 | Hayashi | 359/54 |
| 5,244,534 | 9/1993 | Yu et al. | 156/636 |
| 5,281,840 * | 1/1994 | Sarma | 257/351 |
| 5,365,355 * | 11/1994 | Hastings, III et al. | 359/59 |
| 5,399,236 | 3/1995 | Ha et al. | 156/643 |
| 5,461,501 | 10/1995 | Sato et al. | 359/435 |
| 5,473,448 | 12/1995 | Yoshinaga et al. | 359/51 |
| 5,497,025 | 3/1996 | Wong | 257/435 |
| 5,706,067 | 1/1998 | Colgan et al. | 349/114 |
| 5,710,460 | 1/1998 | Leidy et al. | 257/752 |
| 5,764,324 * | 6/1999 | Lu et al. | 349/113 |
| 5,838,715 | 11/1998 | Corzine et al. | 372/96 |
| 5,982,472 * | 11/1999 | Moore | 349/156 |
| 6,017,794 * | 1/2000 | Burns et al. | 438/258 |
| 6,051,446 * | 4/2000 | Moore et al. | 438/36 |
| 6,061,111 * | 5/2000 | Kataoka et al. | 349/113 |

OTHER PUBLICATIONS

Moore, P. M., "Reflectance Enhancing Thin Film Stack", Co–pending U.S. Application 08/872, 013, filed Jun. 9, 1997.

Colgan, E.G., et al., "On–Chip Metallization Layers for Reflective Light Valves", IBM J. Res. Develop. vol. 42 No. 3/4 May/Jun. 1998, pp. 339–345.

Takayama, S., et al., "Effects of Y of Gd Addition of the Structures and Resistivities of AI Thin Films", J. Vac. Sci. Technol. A 14(4), Jul./Aug. 1996, pp. 2499–2504.

Takayama, S., et al., "Low Resistivity AI–RE (RE=La, Pr, and Nd) Alloy Thin Films with High Thermal Stability for Thin–Film–Transistor Interconnects", J. Vac. Sci. Technol. B 14(5), Sep./Oct. 1996, pp. 3257–3262.

O'Hara, A., et al., "Planarisation of Spatial Light Modulator Silicon Back–Planes Using Chemical–Mechanical Polishing", 1994 The Institution of Electrical Engineers, publishes by IEE, Savoy Place, London WC2R OBL. UK. pp. 5/1–5/6.

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., Color–TV Projection with Fast–Switching Reflective HAN–Mode Light Valves, SID 92 Digest, ISSN 0097–0966X, pp. 277280.

Cacharelis, P., et al., "A 0.8 μm CMOS, Double Polysilicon EEPROM Technology Module Optimized for Minimum Wafer Cost", 24th Proceedings of European Solid State Device Research Conference (ESSDERC), pp. 195–198.

Nagae, Y., et al., "16.1: Invited Paper: Compact Liquid–Crystal Projectors with High Optical Efficiency", SID 95 Digest, pp. 223–226 (1995).

Stearns, D.G., "The scattering of x rays from nonideal multilayer structures", 1988 American Institute of Physics, pp. 491–506.

Frear, D. R., et al., "Structure and Properties of Al–a%Si Thin Films on Si as a Function of Gas Impurities During DC Magnetron–Sputtered Deposition", Journal of Electronic Materials, vol. 18, No. 4, pp. 517–525 (1989).

Critchley, B. R., et al., "Picture quality in large–screen projectors using the Digital Micromirror Device", Journal of the SID, 3/4, pp. 199–202 (1995).

Cacharelis, P., et al., "A Reflective–mode PDLC Light Valve Display Technology", Proceedings of European Solid State Device Research Conference (ESSDERC) (1997), pp. 596–599.

* cited by examiner

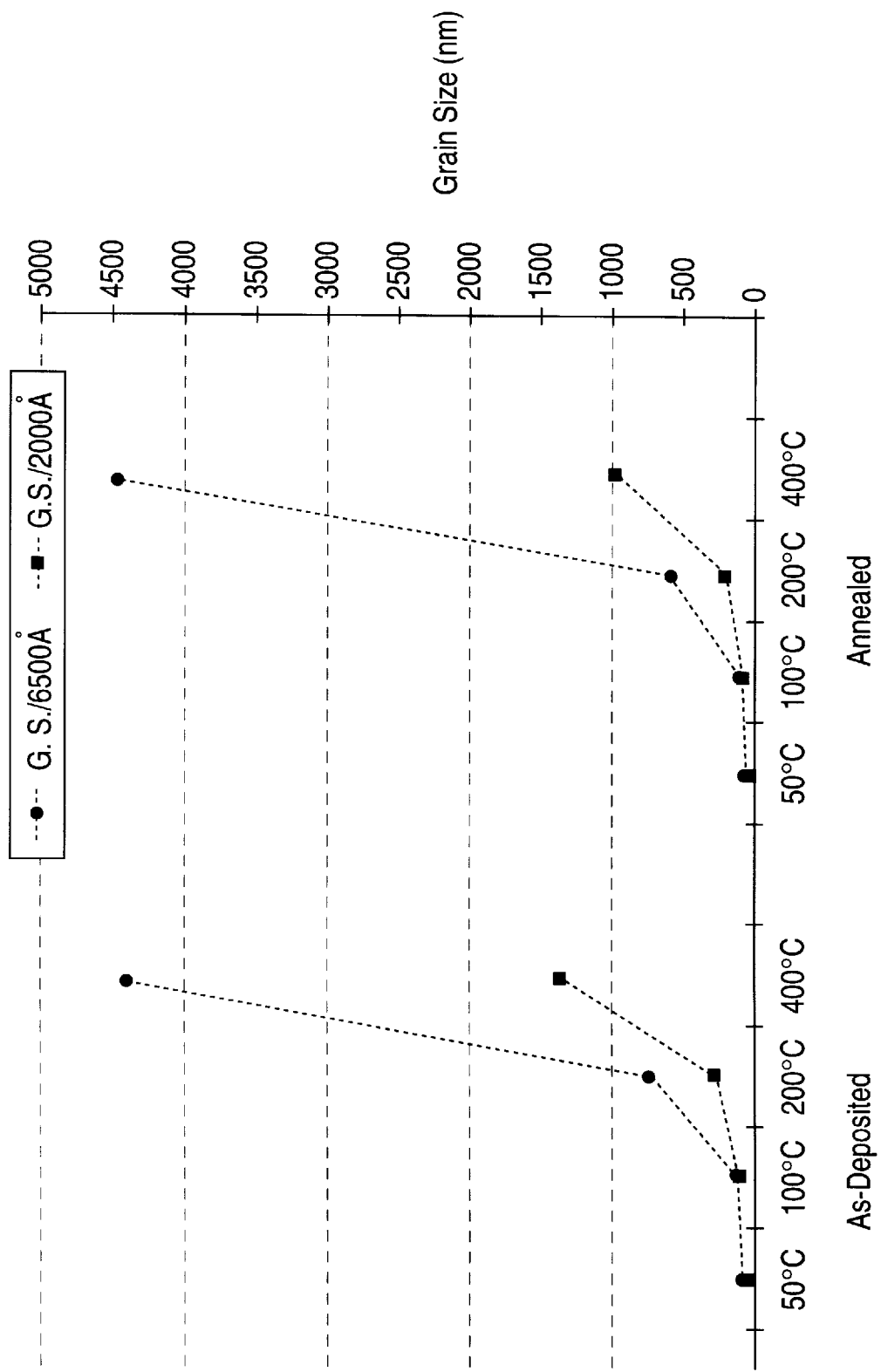

US 6,190,936 B1

INTERCONNECT PASSIVATION AND METALLIZATION PROCESS OPTIMIZED TO MAXIMIZE REFLECTANCE

CROSS-REFERENCE TO RELATED APPLICATION

This is a continuation-in-part application of pending U.S. nonprovisional patent application Ser. No. 09/136,627, filed Aug. 19, 1998, entitled "Silicon Interconnect Passivation and Metallization Process Optimized to Maximize Reflectance," inventors Paul M. Moore, Kevin C. Brown, and Richard Luttrell. The text of this related application is hereby incorporated by reference.

BACKGROUND OF THE INVENTION

1. Field of the Invention

The present invention relates to a method for forming a reflective metal surface, and, in particular, to a silicon interconnect passivation and metallization processes designed to maximize reflectance.

2. Description of the Related Art

Liquid crystal displays (LCDs) are becoming increasingly prevalent in high-density projection display devices. These conventional high density projection-type color display devices typically include a light source which emits white light. Dichroic mirrors separate the white light into its corresponding red, green and blue (RGB) bands of light. Each of these colored bands of light is then directed toward a corresponding liquid crystal light valve which, depending with the image to be projected, either permits or prevents transmission of light therethrough. Those RGB bands of light which are permitted to be transmitted through the light valves are then combined by dichroic mirrors or a prism. A projection lens then magnifies and projects the image onto a projection screen.

FIG. 1 illustrates a conventional LCD projection-type imaging system 100. Imaging system 100 includes a light source 101. White light is emitted from light source 101. Once the light hits the prism 103, the light is separated into its red, green and blue colored bands of light by dichroic filter coatings. Colored light is directed toward liquid crystal display (LCD) light valves 105. When reflected off light valve 105, the colored light waves travel back through the prism and through projection lens 107. Lens 107 magnifies and projects the synthesized color image onto projection screen 109.

FIG. 2 illustrates a cross-sectional view of adjacent pixel cell structures that form a portion of a conventional light valve. Portion 200 of the conventional light valve includes a glass top plate 202 bonded to an interconnect structure 204 by a sealing member (not shown). The sealing member serves to enclose a display area and to separate glass plate 202 from interconnect 204 by a predetermined minute distance. Thus, the light valve has an inner cavity 206 defined by the glass plate 202 and interconnect 204. Liquid crystal material 211, such as polymer dispersed liquid crystal (PDLC), is sealed in inner cavity 206.

In a reflective mode display technology, an image is generated by creating regions within the light valve having differing contrast. This contrast is created by the state of the liquid crystal material above the reflective surface, which in turn regulates the amount of light passing from the ambient to the reflective surface.

During operation of the light valve shown in FIG. 2, selective application of voltage to pixel electrodes 212a and 212b from underlying capacitor structures 218a and 218b through metallization 222 and 224 and via 240 switches pixel cells 210a and 210b on and off. Voltage applied to pixel electrodes 212a and 212b varies the direction of orientation of the liquid crystal material over the pixel electrode. A change in the direction of orientation of the liquid crystal material at the pixel electrode changes the optical characteristics of the light traveling through the liquid crystal.

If the light valve contains twisted nematic crystal, light passes through the light valve unchanged where no voltage is applied to the pixel electrode, and the light is polarized if a voltage is applied to the pixel electrode. If the light valve contains PDLC, light passes through the light valve unchanged where a voltage is applied to the pixel electrode, and light is scattered if no voltage is applied to the pixel electrode.

One key attribute of light valve performance is the amount of light reflected by the pixel cell. The degree of reflectance of the pixel cell in turn affects other system attributes such as contrast ratio, pixel coherence and brightness efficiency. One approach to enhancing the performance of any reflective mode light valve is to increase the reflectance of the mirror toward the ideal.

In examining FIG. 2, it is apparent that pixel electrodes 212a and 212b will serve as the reflective surface of the light valve. Moreover, the highest (third) intermetal dielectric layer 228 serves as the substrate for the reflective pixel electrodes 212a and 212b. Therefore, the reflectance of the light value is dependent in large measure on the processing steps which follow formation of the highest intermetal dielectric layer 228 and all subsequent layers.

FIGS. 3A–3L illustrate cross-sectional views of the conventional processing steps affecting pixel cell reflectance during formation of adjacent pixel cell electrodes. FIG. 3A illustrates the formation of TEOS base 328a upon lower metallization layer 324, followed by the formation of SOG layer 328b over TEOS base 328a.

FIG. 3B illustrates planarization by etchback of SOG 328b. FIG. 3C shows formation of TEOS cap 328c over planarized TEOS base 328a and SOG 328b, forming highest intermetal dielectric layer 328.

FIG. 3D illustrates the patterning of a photoresist mask 330 over the planarized surface of highest intermetal dielectric 328, followed by etching in unmasked areas to create vias 340.

FIG. 3E illustrates formation of a liner layer 342 within vias 340, followed by the formation of a layer of Tungsten 344 over the highest intermetal dielectric 328, filling vias 340.

FIG. 3F illustrates removal of tungsten layer 344 outside of the vias. This step can be accomplished by straight CMP, or alternatively by etchback followed by CMP.

FIG. 3G illustrates formation of the pixel adhesion underlayer 346, typically formed from Ti/TiN. This Ti/TiN layer 346 provides an adhesion surface for the AlCu and thereby prevents degradation of reflectance due to roughness occurring during subsequent thermal exposure. The potential contribution of the pixel adhesion layer to loss of reflectance is described in greater detail under Section 4 of the detailed description of the invention.

FIG. 3H shows formation of the pixel electrode layer 312 on top of pixel adhesion underlayer 346. Pixel electrode layer 312 is conventionally formed by depositing an Al/Cu mixture at approximately 400° C.

FIG. 3I illustrates patterning of a photoresist mask 350 on top of pixel electrode layer 312, followed by etching of unmasked regions of the pixel electrode layer and the pixel adhesion layer 346 to form discrete pixel electrodes 312a and 312b.

FIG. 3J illustrates removal of patterned photoresist mask 350 from the surface of pixel electrodes 312a and 312b to complete formation of reflective pixel electrodes 312a and 312b. Stripping of photoresist mask 350 is conventionally accomplished utilizing a 1) plasma ash, 2) solvent strip, and 3) plasma ash, sequence.

FIG. 3K illustrates formation of a passivation layer 352 on top of the reflective pixel electrodes 312a and 312b. This passivation layer 352 (typically silicon dioxide) is deposited at around 400° C. and protects the surface of the pixel electrodes 312a and 312b.

FIG. 3L illustrates the final alloy/sintering step, wherein a gas mixture including $H_2$ is diffused through the entire structure at high temperatures. Under these conditions, the $H_2$ reacts with dangling Si and oxygen bonds at the interface between metal and the underlying silicon, eliminating stray charges that could disrupt the integrity and precision of the silicon-metal contacts.

The high temperatures required during this alloy/sintering step can degrade the reflectance of the pixel cell in several ways. First, exposing the reflective electrode to heat directly reduces its reflectance, as discussed more completely in connection with FIGS. 19A–19D and 20A–20C below.

A second source of reflectance loss is growth and movement of metal grains in underlying interconnect metallization layer 324 due to heating. Metal growths 356 formed in metallization layer 324 can in turn disrupt planarity in the overlying intermetal dielectric 328, creating unwanted nonplanar "microlens" structures 360 in metal pixel electrodes 312a and 312b that can disrupt reflectance of the pixel electrode.

The conventional process flow depicted above in FIGS. 3A–3L enables creation of a reflective pixel cell. Unfortunately however, several steps of the conventional process inevitably degrade the reflectance of the pixel electrode.

First, the SOG etchback planarization step shown in FIG. 3B generally does not result in an intermetal dielectric layer having a surface that is sufficiently smooth to promote optimum reflectance of the reflective pixel electrode layer to be formed above.

Therefore, there is a need in the art for a process flow that creates a highly smooth surface of the intermetal dielectric layer that will serve as the substrate for the reflective pixel electrode.

A second process step leading to diminished reflectance of the pixel cell is the etchback of tungsten outside of the vias as shown in FIG. 3F. Highest intermetal dielectric layer 328 forms the substrate for the pixel metal electrode. Roughness in the surface of Tungsten in this underlying layer can promote roughness and a loss of reflectance of the electrode formed above.

Therefore, there is a need in the art for a process flow that removes Tungsten outside of the via while creating a highly smooth surface of the Tungsten remaining within the via.

A third process step leading to diminished reflectance of the pixel cell is utilization of a pixel electrode adhesion layer composed of Ti/TiN as shown in FIG. 3G. The character of the adhesion layer affects roughness of the overlying AlCu.

Therefore, there is a need in the art for a process flow that decreases the roughness of the adhesion layer and also permits further suppression of hillock formation.

A fourth process step leading to diminished reflectance of the pixel cell is the high temperature deposition of the pixel electrode layer shown in FIG. 3H. Deposition of the metal pixel electrode at high temperatures (>200° C.) leads to formation of AlCu having large grain sizes. Large grains of AlCu naturally increase the roughness of the pixel electrode layer, thereby diminishing its reflectance.

Therefore, there is a need in the art for a process flow that produces a metal pixel electrode layer having sufficiently small grains to promote reflectance of the pixel electrode.

A fifth process step leading to diminished reflectance of the pixel cell is stripping of the photoresist mask utilized to etch the pixel electrode layer as shown in FIG. 3J. Exposure of the smooth freshly deposited surface of the pixel electrode layer to harsh conditions of the solvent strip and asher clean necessary to remove the photoresist increases roughness in the pixel electrode surface, diminishing its reflectance.

Therefore, there is a need in the art for a process flow that prevents roughening of the surface of the pixel electrode due to the removal of the photoresist mask used to etch the pixel electrodes.

A sixth process step leading to diminished reflectance of the pixel cell is deposition of the passivation layer at a temperature substantially different from the temperature at which the metal pixel electrode layer was originally formed. A large temperature difference between these steps can lead to the formation of hillocks in the metal surface. Such hillocks are generated by shear forces exerted on the metal layer due to the differing coefficients of thermal expansion of the metal pixel electrode layer and the overlying dielectric layer. The hillocks render the surface of the pixel cell uneven, and thereby degrade reflectance.

Therefore, there is a need in the art for a process flow that prevents the formation of hillocks in the pixel electrode layer upon the formation of the overlying passivation layer due to the difference in temperature of formation of these layers.

A seventh process step leading to diminished reflectance of the pixel cell is the alloy of the metal-silicon interface. Heating during this step can degrade reflectance of the electrode and also result in additional growth and movement of grains in the underlying metallization, with corresponding disruption in planarity of the overlying intermetal dielectric and pixel electrode.

Therefore, there is a need in the art for a process flow that avoids formation of nonplanar "microlens" structures in the surface of the pixel attributable to the alloy step.

Roughness in the pixel electrode surface caused by processing can adversely affect reflectance. However, it is also possible to enhance the reflectance of a pixel cell beyond that of a bare metal electrode by forming a reflective-enhancing coating (REC) over the pixel cell electrode. U.S. patent application Ser. No. 08/827,013, entitled "REFLECTANCE ENHANCING THIN FILM STACK" describes utilization of a reflective coating consisting of thin films of dielectric materials that increase reflectance. The thin dielectric films accomplish this result by promoting constructive interference of incident light reflected by the pixel electrode.

Therefore, there is a need in the art for a process flow that leads to the formation of a REC over the surface of a pixel electrode.

SUMMARY OF THE INVENTION

The present invention relates to a process for forming a metal surface that is designed to maximize reflectance. Steps forming a part of the process in accordance with the present invention include 1) performing alloy/sintering of the metal-silicon interface prior to a chemical mechanical polish of the intermetal dielectric before the reflective metal electrode is formed; 2) chemical mechanical polishing the intermetal dielectric again after vias are formed; 3) forming a metal adhesion layer composed of collimated titanium over the underlying dielectric prior to the formation of the metal layer; 4) depositing metal at as low a temperature as feasible in order to maintain small grain size; 5) depositing at least the initial layer of a reflectance enhancing coating on top of the freshly deposited metal prior to etching the metal layer; and 6) depositing the initial layer of the reflectance enhancing coating at a temperature as close as possible to the temperature of formation of the metal electrode layer.

Depositing the REC serves two distinct purposes. First, the initial layer of REC coats the freshly deposited metal layer, preserving the metal in its highly reflective state. Second, the REC as a whole generates constructive interference of reflected light. This constructive interference can generate reflectivity greater than that of the bare metal surface.

A process of forming a reflective metal surface in accordance with a first embodiment of the present invention includes the steps of forming a highest intermetal dielectric layer on top of a highest layer of interconnect metallization and heating the highest intermetal dielectric in the presence of hydrogen to alloy underlying silicon-metal contacts. A via is created in the highest intermetal dielectric, the walls of the via are lined with a liner layer, and the via is filled with an electrically conductive material. An electrode adhesion layer is formed on top of the highest level intermetal dielectric and the via, and an electrode layer is formed on top of the electrode adhesion layer. At least a first layer of a reflectance enhancing coating is formed on top of the electrode layer prior to etching the electrode layer to define a plurality of discrete electrodes, the reflectance enhancing coating generating constructive interference of light waves reflected by the electrode layer.

The features and advantages of the present invention will be understood upon consideration of the following detailed description of the invention and the accompanying drawings.

BRIEF DESCRIPTION OF THE DRAWINGS

FIGS. 20A–20C plot the effect upon grain size, surface roughness, and reflectance of annealing pixel electrode layers having thicknesses of 6500 Å and 2000 Å.

DETAILED DESCRIPTION OF THE INVENTION

Figure 1:
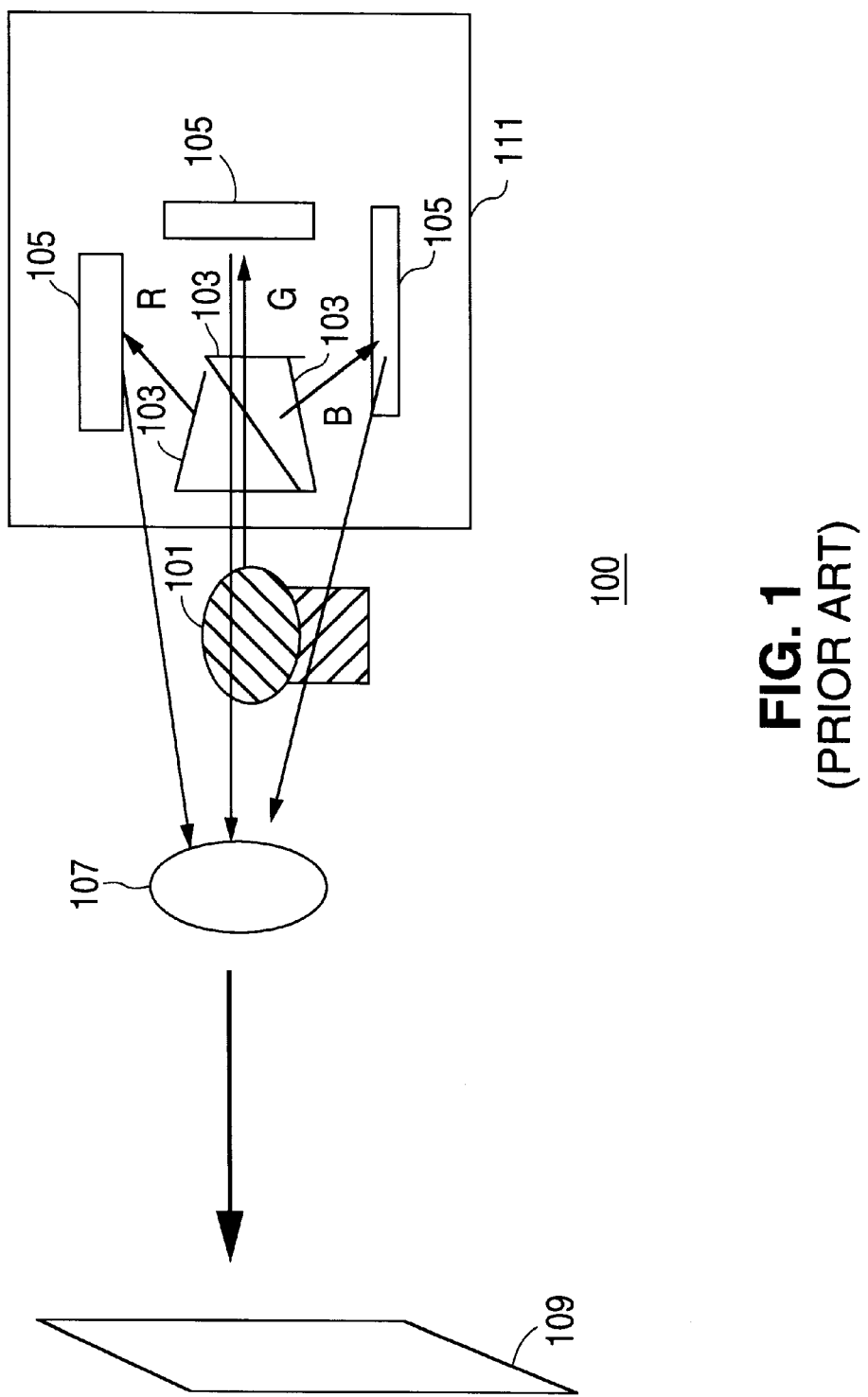
FIG. 1 illustrates a conventional LCD projection-type imaging system.

The subject matter of this application is related to pending U.S. patent application Ser. No. 08/827,013, filed Jun. 9, 1997, entitled "REFLECTANCE ENHANCING THIN FILM STACK", inventor Paul M. Moore. The text of this related application is hereby incorporated by reference.

The process in accordance with the present invention combines a number of separate process steps designed to optimize the reflectance of a metal surface forming a pixel electrode. These steps are discussed below in the order of occurrence in the process flow.

1. Introduction

Ideally, the pixel electrode will obey the reflectivity given by Equation 1. In Equation 1 the reflection of light from the pixel electrode is dependent upon the electrode's material properties, quantified by the index of refraction. If the index of refraction were independent of the wavelength of the incident light, reflectivity would be constant versus wavelength. However, the index of refraction is a function of wavelength (i.e., dispersion) and produces reflectivity which is dependent upon wavelength. Therefore, Equation 1 approximates the reflectance as a function of inherent material properties with which variation is limited to dispersion and the material sample.

$$\rho = \frac{[(\eta_{AlCu} - \eta_{external})^2 + K_{AlCu}^2]}{[\eta_{AlCu} + \eta_{external})^2 + K_{AlCu}^2]} \quad (1)$$

In practice, fabrication of the pixel cell does not provide the ideal reflectivity given by Equation (1). Instead, roughness in the pixel electrode will attenuate the measured reflectance as a function of wavelength. Equation 2 provides a general attenuation function for an illuminating source projected normal to the surface.

$$r = r_{ideal} \tilde{\omega} \left[ -\frac{4\pi}{\lambda} \right] \quad (2)$$

Where the reflectance given by Equation (2) is multiplied by its complex conjugate, the omega-tilde function indicates the Fourier transform of the interface profile. The profile is the manner in which one medium transitions into an adjoining medium. Any number of interface functions may be placed in Equation (2). When the interface transition is given by the error function the reflectance becomes:

$$\rho = \frac{[(\eta_{AlCu} - \eta_{external})^2 + K_{AlCu}^2]}{[\eta_{AlCu} + \eta_{external})^2 + K_{AlCu}^2]} \exp\left[-\left(\frac{4\pi\sigma}{\lambda}\right)^2\right] \quad (3a)$$

Where sigma is the interface thickness or root-mean-squared (RMS) roughness depending upon one's interpretation of the surface being deterministic or random.

Observed reflectance is actually a combination of specular and scattered reflectance. The amount of the total observed reflectance is dependent upon the size of the instrument's objective. Therefore, the reflectance is truly:

$$\rho = \rho_{specular} + \rho_{scattered} \quad (3b)$$

$$\rho_{scattered} = \frac{[(\eta_{AlCu} - \eta_{external})^2 + K_{AlCu}^2]}{[\eta_{AlCu} + \eta_{external})^2 + K_{AlCu}^2]} \quad (3c)$$

$$\left[1 - \exp\left[-\left(\frac{4\pi\sigma}{\lambda}\right)^2\right]\right]\left[1 - \exp\left[-\left(\frac{\pi\alpha\delta}{\lambda}\right)^2\right]\right]$$

Where $\alpha$ is the objectives half angle and $\delta$ is the correlation distance between interface features. With assumption that the product $\alpha \times \delta$ is much smaller than the wavelength of light we may neglect this term from (3a). However, this simplification may provide a source of error for estimations.

2. Highest Intermetal Dielectric

A. Non-Planarity of Highest Intermetal Dielectric

Figure 3A:
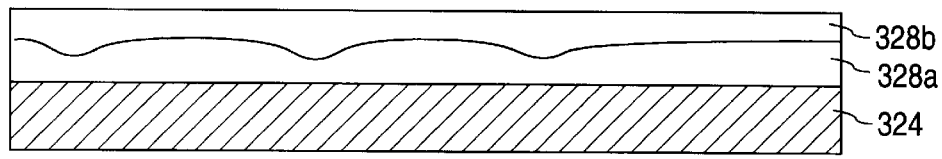
FIGS. 3A–3L illustrate cross-sectional views of the conventional processing steps affecting pixel cell reflectance during formation of adjacent pixel cell electrodes.
Figure 3B:
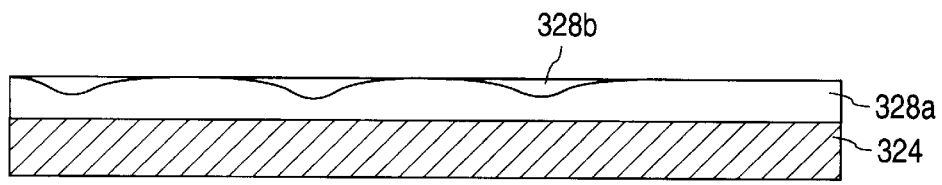

As discussed above in connection with FIGS. 3A–3C, the first step in the process is formation of the highest intermetal dielectric layer over the highest interconnect metallization layer. The reflective metal pixel electrode layer will ultimately be formed over the highest interconnect metallization.

Figure 3C:
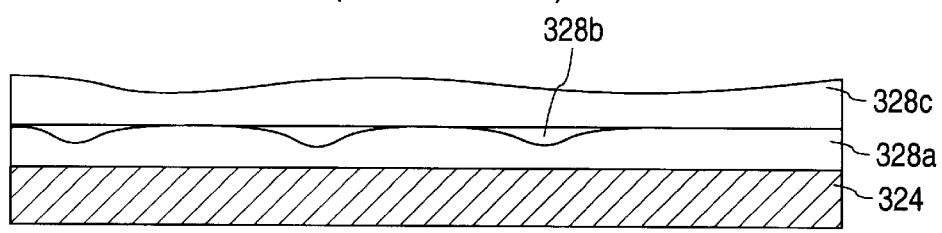

Conventionally, as described above in FIG. 3L an alloy step is performed at high temperatures (400° C.) at the conclusion of processing in order to eliminate dangling silicon and oxide bonds. Unfortunately the application of high temperatures during this alloy step can cause growth and movement of the metal grains of the interconnect metallization. Growth and movement of grains of the underlying metal can in turn create bumps in the overlying highest intermetal dielectric. These bumps can disrupt the planarity of the overlying reflective pixel electrode, degrading reflectance.

Figure 4:
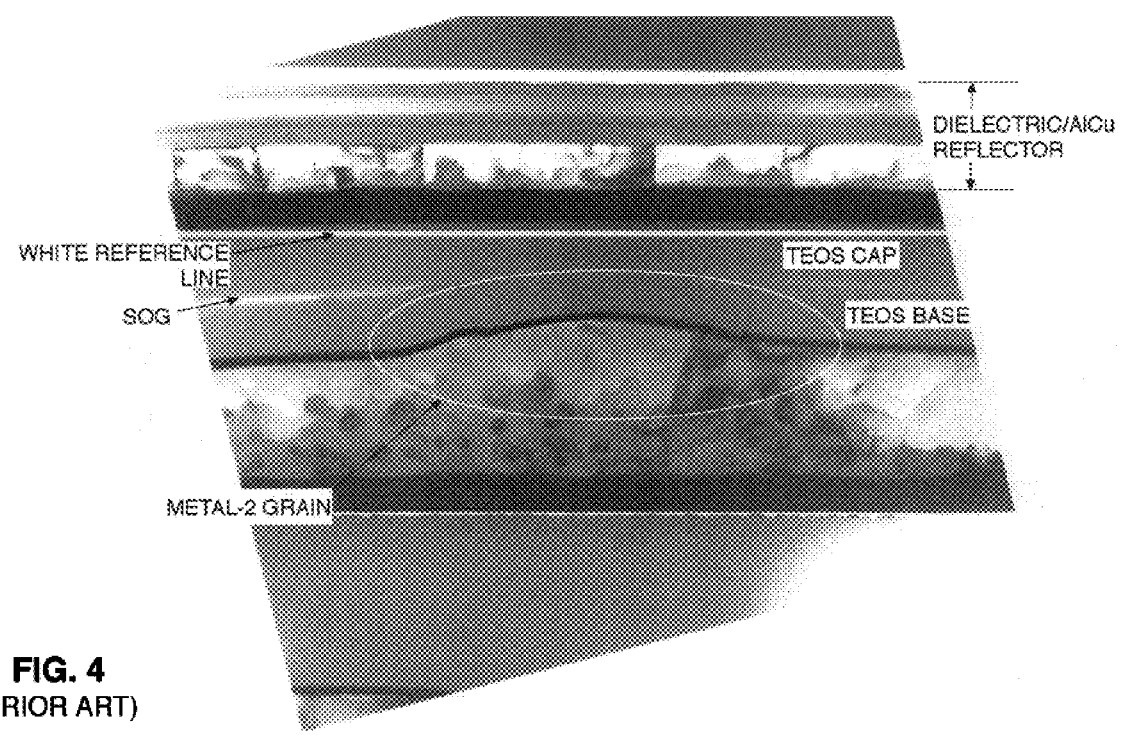
FIG. 4 shows a TEM photograph of a cross-section of a pixel cell illustrating growth/movement of grains in the interconnect metallization due to a conventional alloy/sintering step.

FIG. 4 shows a TEM photograph of a cross-section of a pixel cell following conventional high temperature sintering/alloy. FIG. 4 shows growth/movement of grains of the interconnect metallization (below the TEOS Base), together with a corresponding bump in the overlying intermetal dielectric (shown in that portion of the TEOS Cap lying above the white reference line).

Accordingly, the present invention proposes placing the alloy step in the process flow immediately following formation of the highest intermetal dielectric and prior to subsequent chemical-mechanical polishing of this highest intermetal dielectric. In this manner, non-planarity of the highest intermetal dielectric layer attributable to growth or movement in the metal grains of the underlying metallization due to alloy heating can be minimized before the overlying reflective metal pixel electrode layer is formed.

B. Roughness of Highest Intermetal Dielectric

As discussed above in connection with FIG. 3C, another processing step that can degrade reflectivity of the pixel electrode is SOG planarization of the highest intermetal dielectric followed by cap oxide formation. These steps may create a dielectric layer having less than adequate smoothness.

To correct this problem, the present invention adds a CMP step immediately following completion of the intermetal dielectric. The thickness of the cap oxide layer is increased to compensate for the bulk removal of dielectric material required to planarize the surface by CMP.

The additional CMP step provides a three-fold benefit to the pixel reflectance. First, the CMP removes any bumps in the intermetal dielectric due to the previous alloy/sintering step. Second, the CMP reduces topology created by the underlying circuitry and interconnect structures. This topology is on the order of $1 \times 10^3$ Å. A third advantage of CMP after SOG planarization is reduction in the root mean square ("RMS") roughness of the highest level of intermetal dielectric. This RMS roughness is on the order of $1\times10^1 \times 1\times10^2$ Å.

Figure 5:
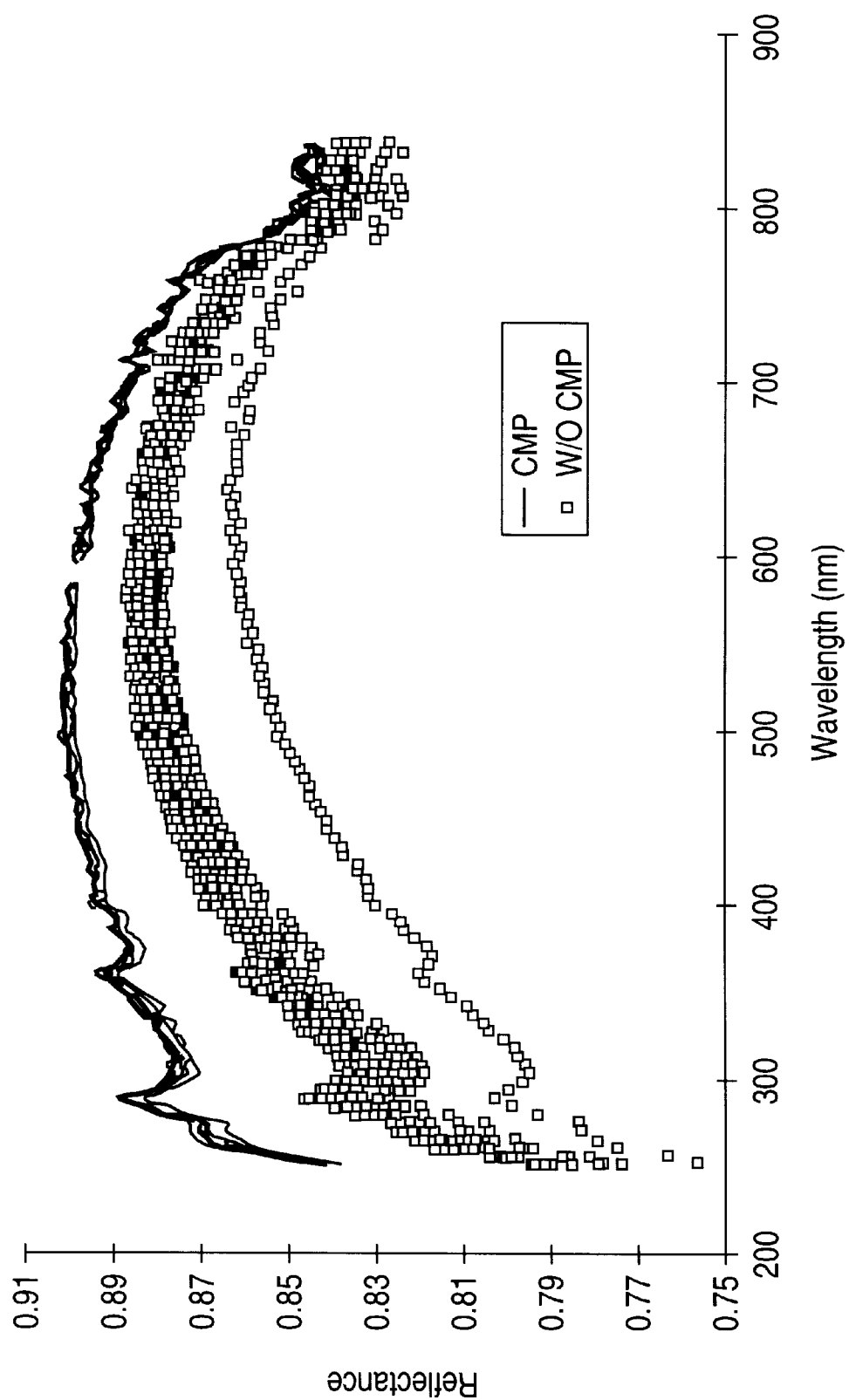
FIG. 5 shows reflectance as measured by two sets of wafers, one set including SOG planarization only, the other set including SOG planarization followed by chemical mechanical polishing.

FIG. 5 shows reflectance as measured by two sets of wafers, one set including SOG planarization only, the other set including both SOG planarization and the chemical mechanical polishing step disclosed in accordance with the present invention. The data plotted in FIG. 5 was taken from an area of the wafer which was free of any device or interconnect related topology. In this manner, any degradation in reflectance due to the randomly induced roughness was isolated from the systematic interconnect topography.

By chemical mechanical polishing the surface of the highest intermetal dielectric, surface roughness of the pixel layer deposited upon the intermetal dielectric was reduced by approximately 67 Å. This 67 Å figure was obtained by the following approximation.

For two separate surfaces with uniquely individual surface roughness, but composed of the same material the ratio of the individual reflectance given by Equation 3a may be algebraically manipulated to reveal:

$$(\sigma_1 - \sigma_2) = \sqrt{-\ln\left(\frac{\rho_1}{\rho_2}\right) \cdot \left(\frac{4\pi}{\lambda}\right)^{-2}} \qquad (4)$$

Substituting the reflectance of a given surface to the average observed reflectance of FIG. 4 yields the difference in average surface roughness of Equation (4) to be 67 Å. This is thus the average difference in roughness between the CMP and no/CMP wafers shown in FIG. 5.

Figure 6:
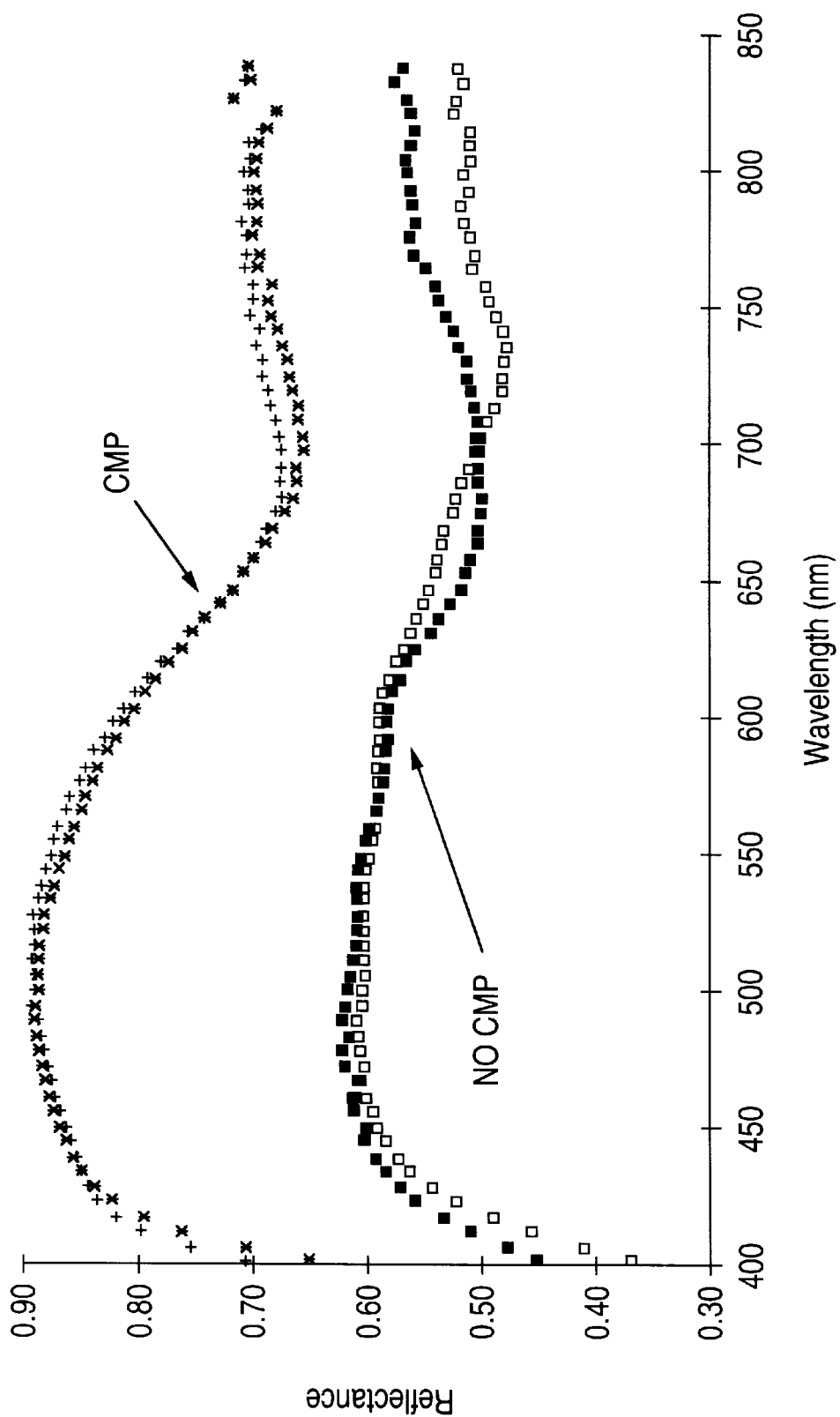
FIG. 6 plots reflectance of two lots of wafers with and without the CMP step.

FIG. 6 also plots reflectance of two lots of wafers with and without the additional CMP step. The reflectance data of FIG. 6 was collected by centering a ten micrometer spot light over a single twelve micrometer pixel. FIG. 6 shows that absent CMP, the measured reflectance decreased by thirty percent.

3. Roughness of Via Liner

Figure 3D:
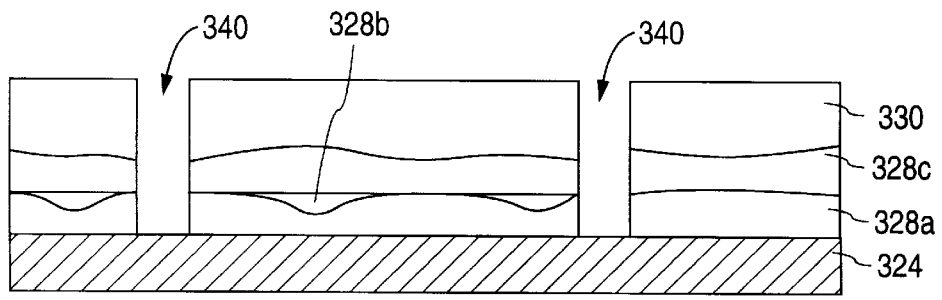
Figure 3E:
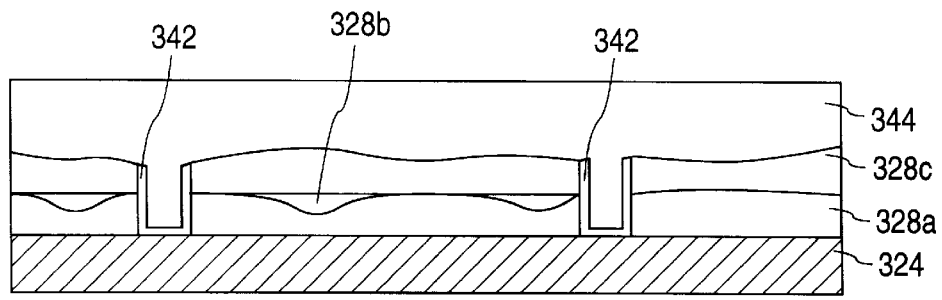
Figure 3F:
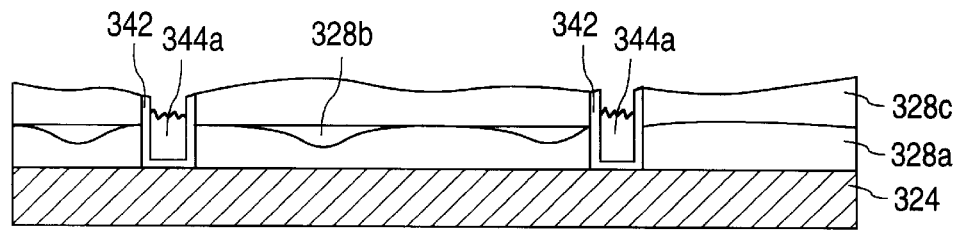

As shown in prior FIGS. 3D–3F, following formation and planarization of the highest intermetal dielectric layer, the pixel cell fabrication process continues with the steps of etching the highest dielectric layer to form vias to the underlying lower interconnect metallization layer. Titanium and titanium nitride are then deposited to serve as a via liner layer. Tungsten is then deposited to fill the via, and then the tungsten is removed outside of the via either by straight CMP or by a combination of etchback and CMP.

The surface roughness of the reflective pixel electrode is dependent not only upon smoothness of the underlying substrate, but also upon grain formation of AlCu in the metal layer. Thus, the underlying titanium nitride must be smooth compared to the surface formed by the AlCu grains, or roughness of the underlying substrate will be the determining factor of the reflectance of the pixel electrode.

Figure 7:
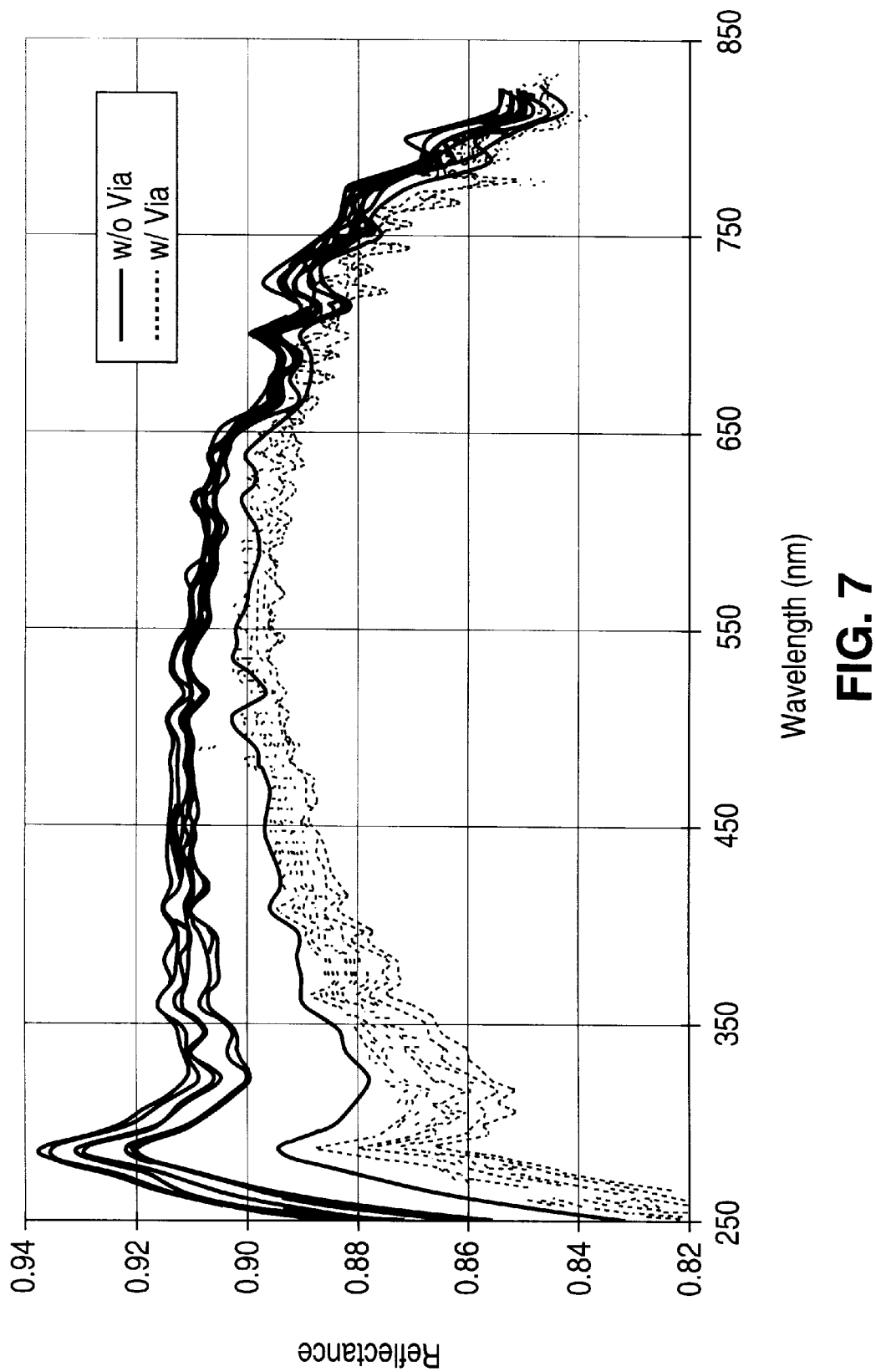
FIG. 7 plots reflectance of pixels with and without via processing.

FIG. 7 compares the highest measured reflectance at a pixel corner for pixels with and without via processing. In each data point of FIG. 7, reflectance was measured on a portion of the wafer which had no vias, the "field". Measuring the field reflectance on wafers with and without vias enabled isolation of the processes which had the greatest effect on the surface roughness of the pixel electrode layer.

Figure 8:
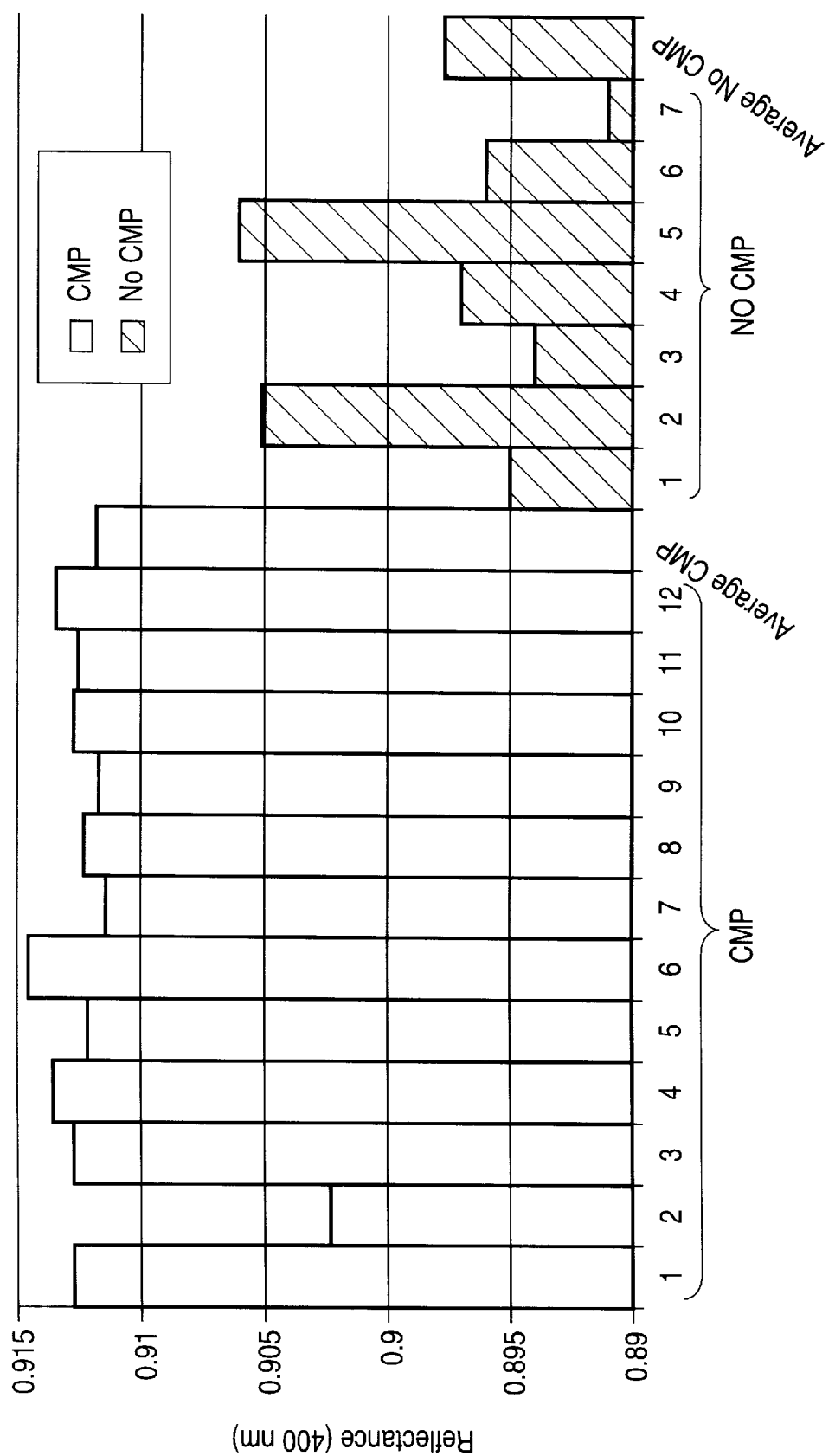
FIG. 8 presents a bar graph showing reflectance of wafers with and without the additional CMP touch-up step following Tungsten etchback.

Because tungsten etch-back was identified as a source of roughness in the pixel electrode surface, a CMP touch-up step following tungsten etch-back was performed. FIG. 8 presents a bar graph comparing reflectance of wafers with and without the additional CMP touch-up step following tungsten etchback.

FIG. 8 consistently reveals that wafers including CMP touch-up after tungsten etch back possessed higher reflectance than wafers lacking this additional processing step. Specifically, the touch-up CMP increased the reflectance of the AlCu surface at the low wavelengths. Such a reflectance increase is due to a decrease of in scattered light relative to specular light, and indicates a roughness reduction. Thus, the benefits of cold AlCu sputtering are not realized unless a touch-up CMP step following tungsten removal is employed. FIG. 8 also indicates less variance in the reflectance of multiple wafers having the CMP touch-up step.

Figure 9:
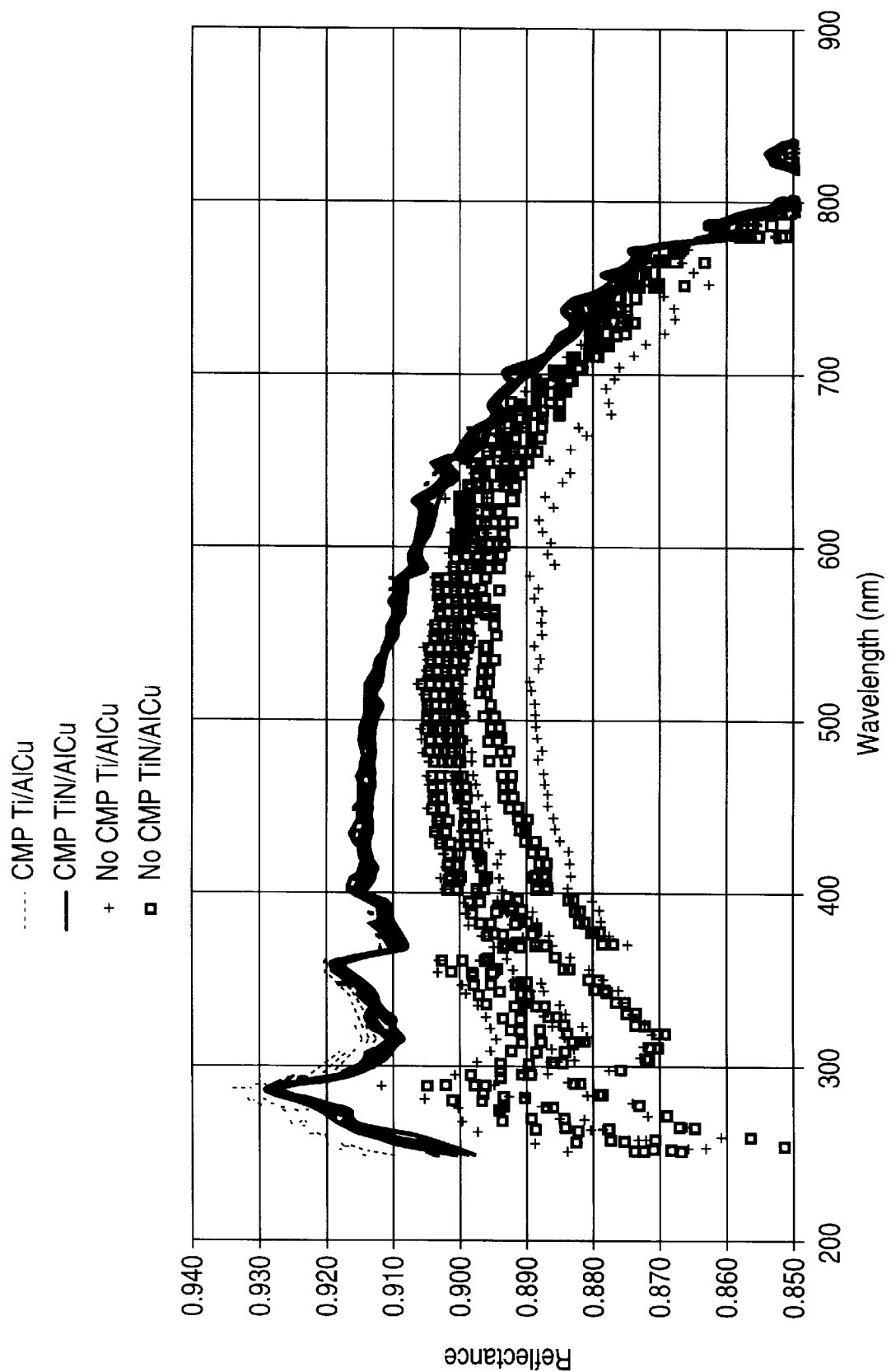
FIG. 9 plots the effect of touch-up CMP upon reflectance of a pixel electrode layer deposited over a pixel adhesion layer composed of either TIN or collimated Ti, for lots of wafers including and omitting CMP processing.

FIG. 9 shows reflectance of a 5000Å pixel electrode layer deposited at 50° C. over a pixel adhesion layer composed of either TiN or collimated Ti, with and without CMP of tungsten vias following etchback.

Ti/AlCu wafers including CMP (indicated by the dashed line) evidenced consistently higher reflectance than otherwise identical wafers not subjected to the CMP (indicated by the pluses "+"). Similarly, TiN/AlCu wafers including CMP (indicated by the solid line) evidenced consistently higher reflectance than otherwise identical wafers not subjected to the CMP (indicated by the squares "☐").

In reviewing FIG. 9, it is important to notice the increase in the reflectance and the small variance of distribution over a single wavelength, of wafers subjected to the touch-up CMP versus the wafers which where not polished.

4. Roughness of Pixel Adhesion Layer

Figure 3G:
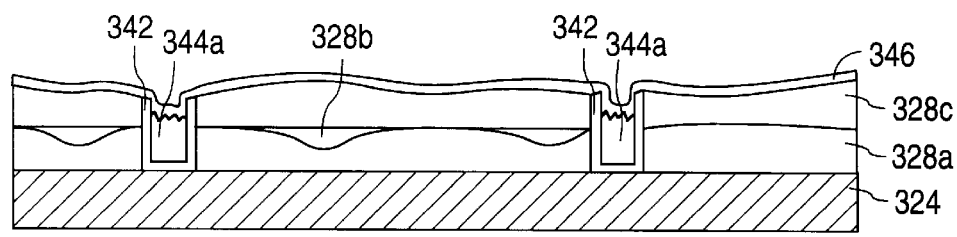
Figure 3H:
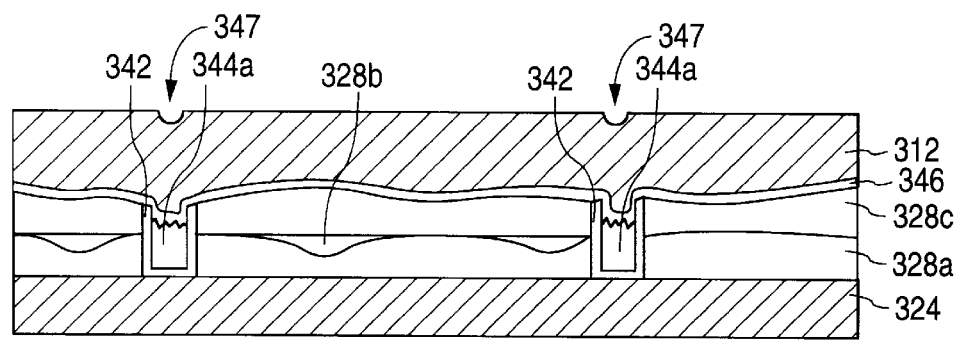

As discussed above in connection with FIG. 3G, formation of the pixel adhesion layer can affect the reflectance of the pixel electrode layer. This is also shown graphically in FIG. 9.

Wafers subjected to CMP utilizing a collimated Ti adhesion layer (indicated by the dashed line) evidenced slightly greater reflectance than otherwise identical wafers utilizing a TiN adhesion layer (indicated by the solid line). Similarly, wafers not subjected to CMP utilizing a collimated Ti adhesion layer (indicated by the pluses "+") evidenced slightly greater reflectance than otherwise identical wafers utilizing a TiN adhesion layer (indicated by the squares "☐").

Here, it is interesting to note that while the overall reflectance difference attributable to the adhesion layer was relatively minor, the difference was especially pronounced 1) at low wavelengths, and 2) where CMP following W etchback was employed.

5. Deposition of Pixel Electrode Layer

A. Effect of Temperature of Metal Deposition

The AlCu metal layer making up the pixel electrode is typically formed on top of the adhesion layer utilizing sputter deposition techniques. The grain size of the deposited Al/Cu can vary according to the temperature at the time of deposition. Deposition of the metal at higher temperatures generally leads to the formation of larger grains. These larger metal grains render the metal surface more rough, and decrease reflectance.

Figure 10:
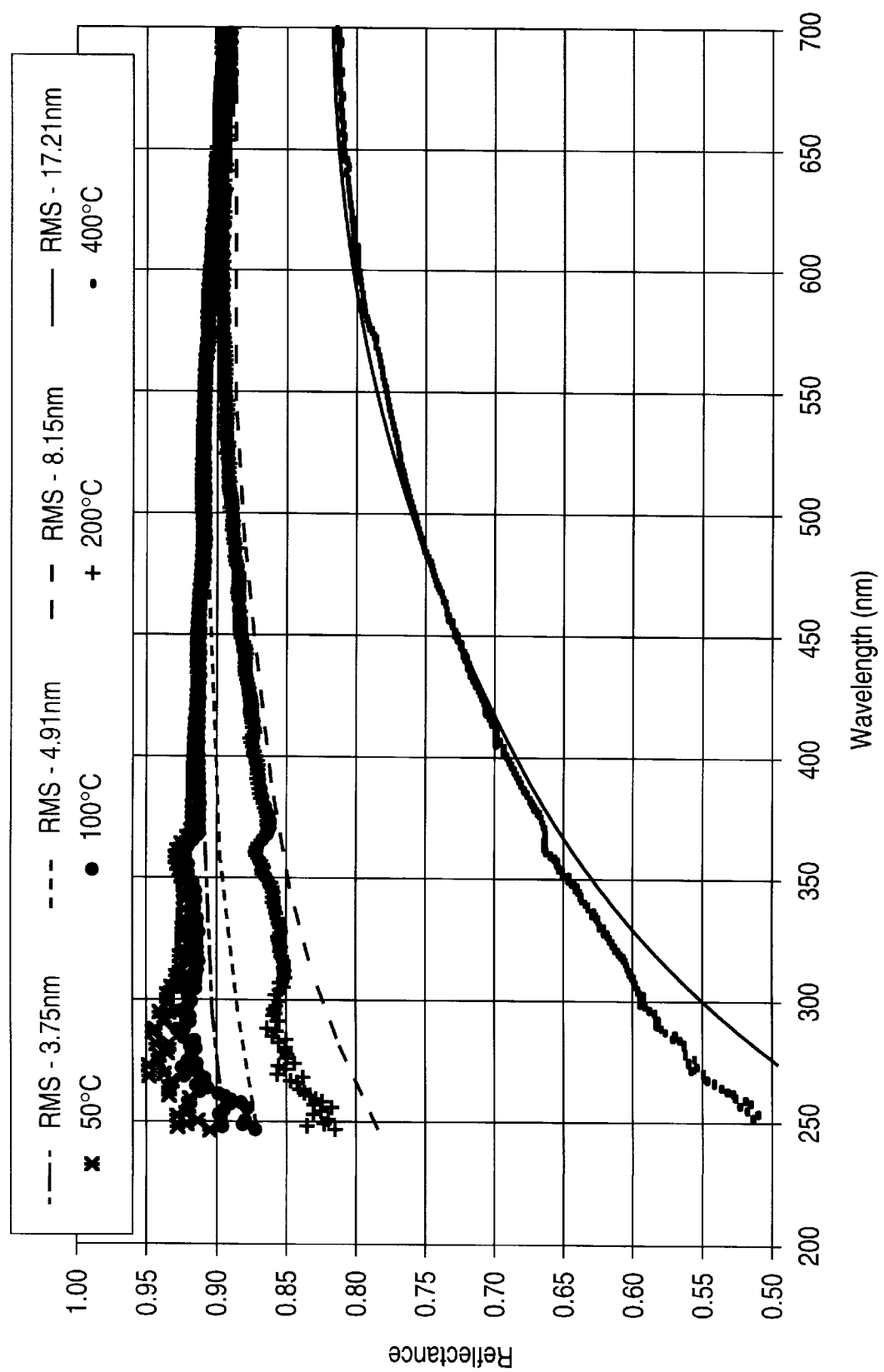
FIG. 10 plots observed and predicted reflectance for a pixel electrode layer of 99.5%/0.5% Al/Cu sputter deposited at four different temperatures.

FIG. 10 depicts observed reflectance data for an AlCu (99.5%/0.5% wt.) mixture sputter deposited at four different temperatures. FIG. 10 also plots the predicted reflectance as derived by root-mean-squared (RMS) roughness data measured by an atomic force microscope (AFM) and input into Equation (3a).

In reviewing FIG. 10, it is important to note that for both observed and predicted reflectance, temperature of AlCu deposition is inversely proportional to reflectance. This relationship is likely attributable to the grain size of the AlCu formed, where higher temperature deposition leads to the formation of larger grains and greater surface roughness. Reducing grain size and surface roughness is thus clearly a major goal in preserving the theoretical absolute maximum reflectivity. Ideally, maximum reflectance would be attained by sputtering AlCu at 50° C.

Figure 11B:
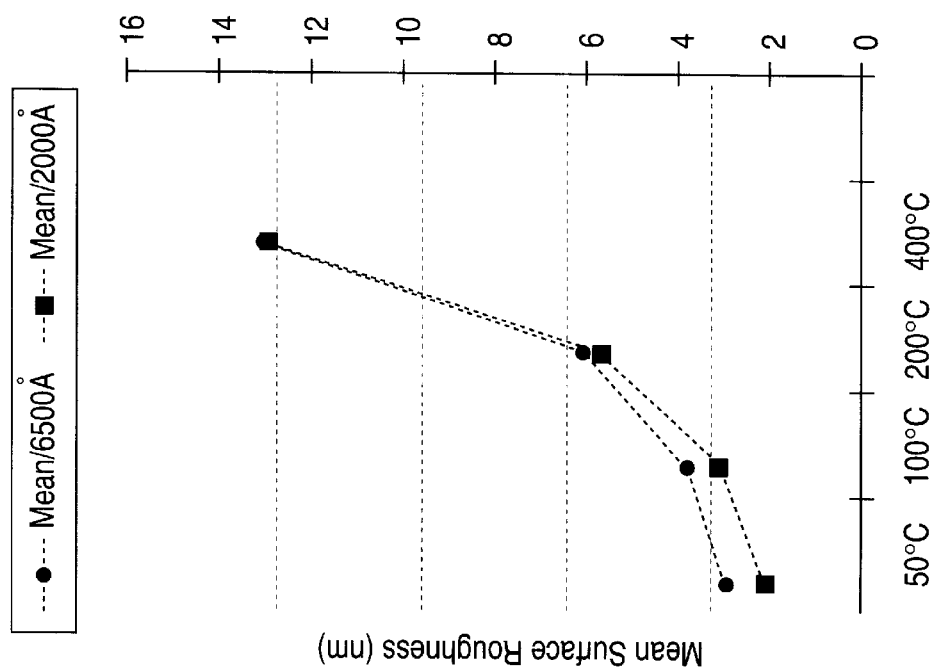
FIGS. 11A–11C plot metal deposition temperature versus grain size, mean surface roughness, and reflectance for AlCu metal layers having thicknesses of 6500 Å and 2000 Å.
Figure 11A:
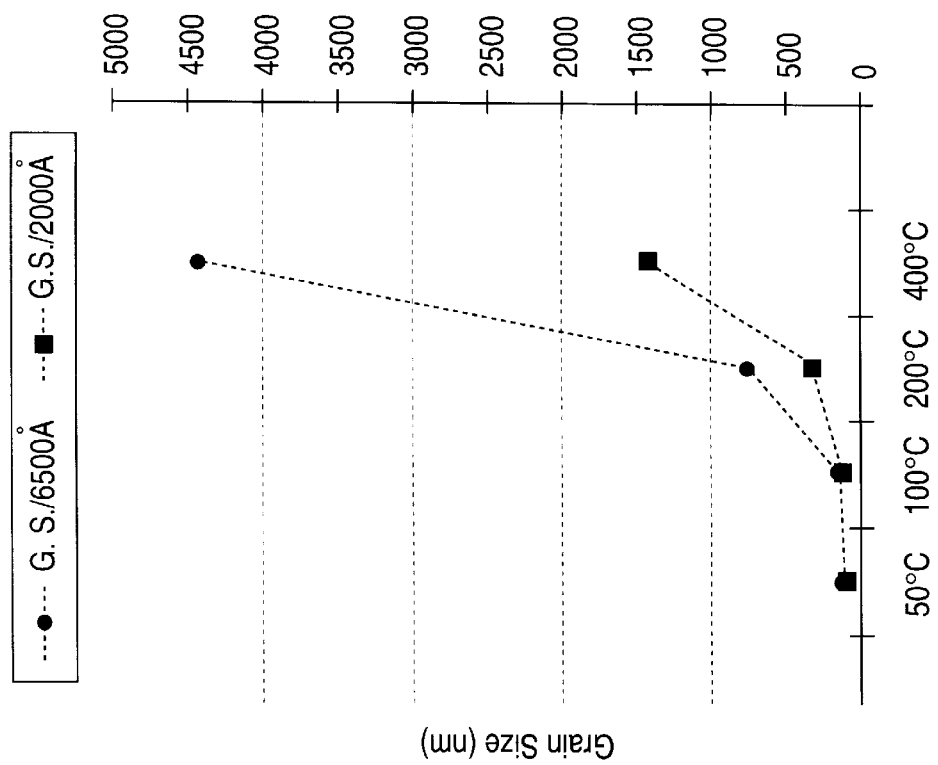
Figure 11C:
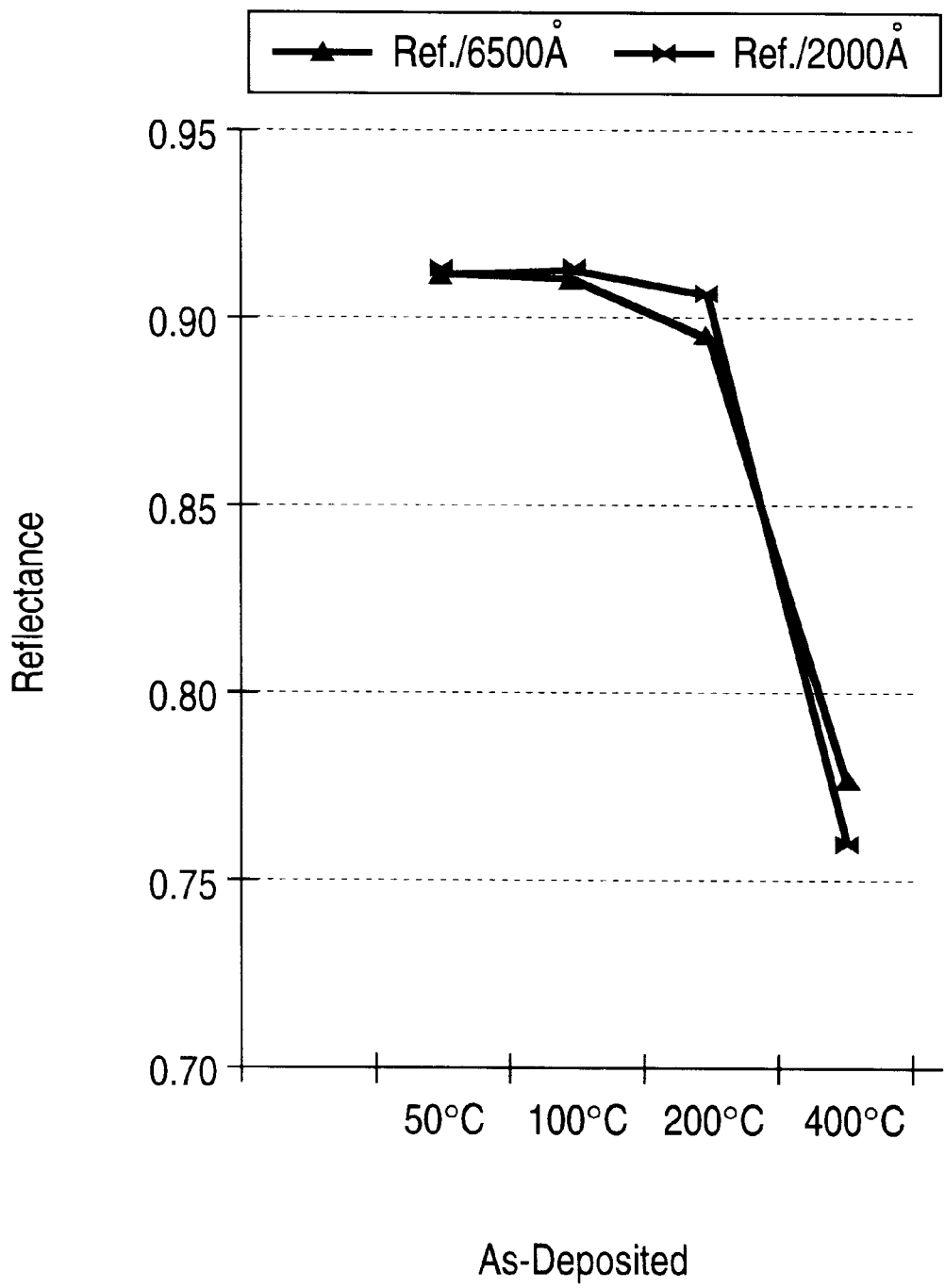

The relationship between metal deposition temperature and grain size, roughness, and reflectance is further illustrated in FIGS. 11A–11C. FIG. 11A plots metal deposition temperature versus grain size for 6500 Å thick and 2000 Å thick AlCu layers. FIG. 11B plots metal deposition temperature versus mean surface roughness for the 6500 Å thick and the 2000 Å thick AlCu layers. FIG. 11C plots metal deposition temperature versus reflectance for the 2000 Å thick and the 6500 Å thick AlCu layers.

Comparison of FIGS. 11A–11C reveals that as the temperature of metal deposition increases from 50° C. to 400° C., grain size also increases from <200 mm to approximately 4500 mm for the 6500 Å layer, and to approximately 1500 mm for the 2000 Å layer. This dramatic increase in grain size of the deposited metal results in increased surface roughness and decreased reflectance.

FIGS. 10 and 11A–11C indicate the desirability of depositing the metal forming the pixel electrode layer at as low a temperature as possible. Metal deposition at a low temperature ensures that the grain size of the deposited metal remains small, and the reflectance high.

Finally, it is interesting to note that little difference in roughness was observed between films deposited at 50° C. versus 100° C., where collimated Ti was employed as the underlying adhesion layer instead of TiN.

B. Effect of Metal Thickness

The thickness of the metal layer deposited to form the pixel cell electrode also affects reflectance. Referring again to prior FIGS. 11A–11C, comparison of these FIGS. reveals that for each temperature of metal deposition, as metal thickness increases so does grain size and mean surface roughness. These changes in turn produce a decline in reflectance.

Figure 12:
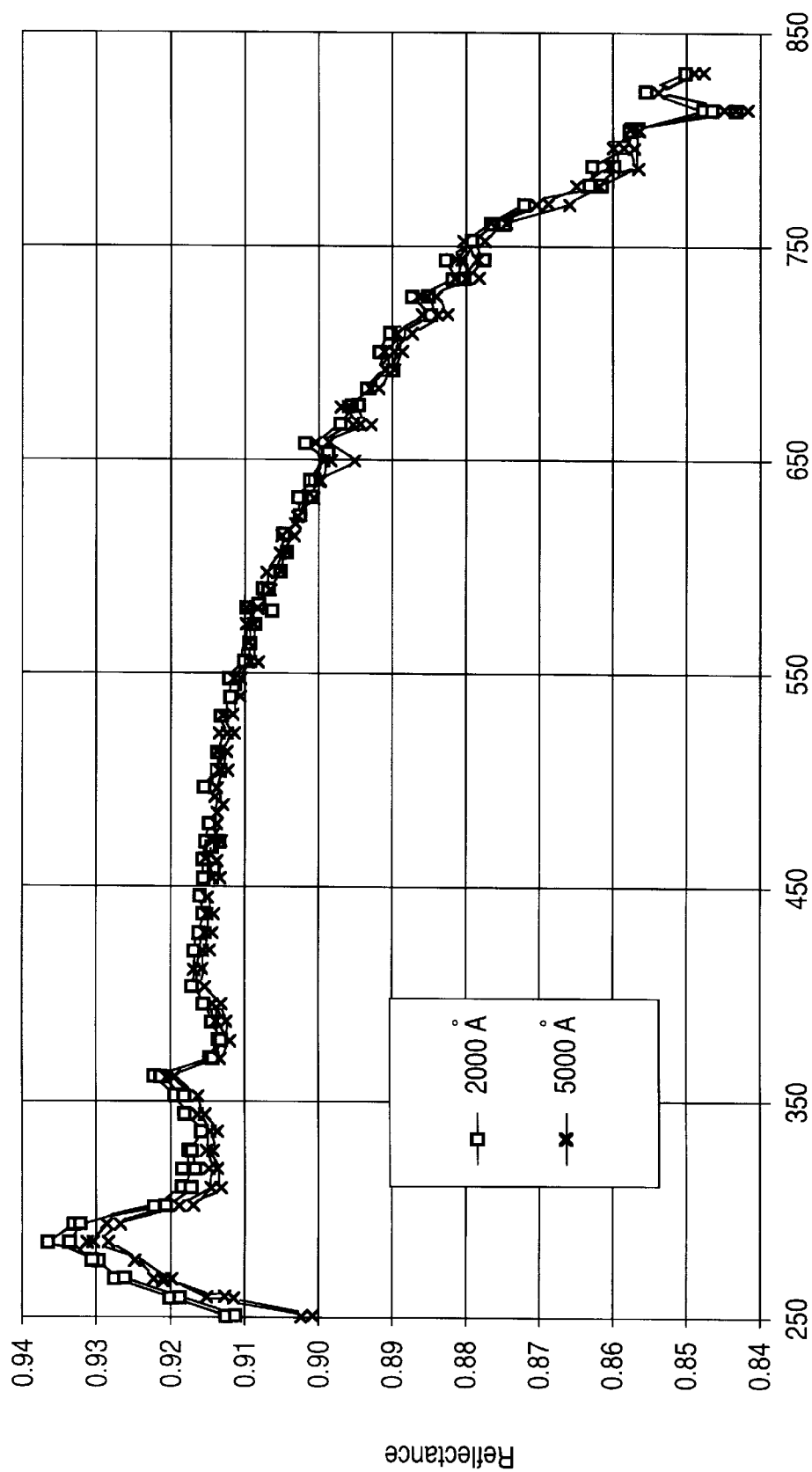
FIG. 12 plots reflectance as deposited for AlCu layers having thicknesses of 5000 Å and 2000 Å.

FIG. 12 also shows the variation in reflectance for a pixel electrode layers of varying thickness, in this case AlCu layers having thicknesses of 2000 Å and 5000 Å. Focusing upon the lower region of the spectrum, it is apparent that the 2000 Å metal layer has slightly greater reflectance.

6. Etching of Pixel Electrode Layer

Figure 3I:
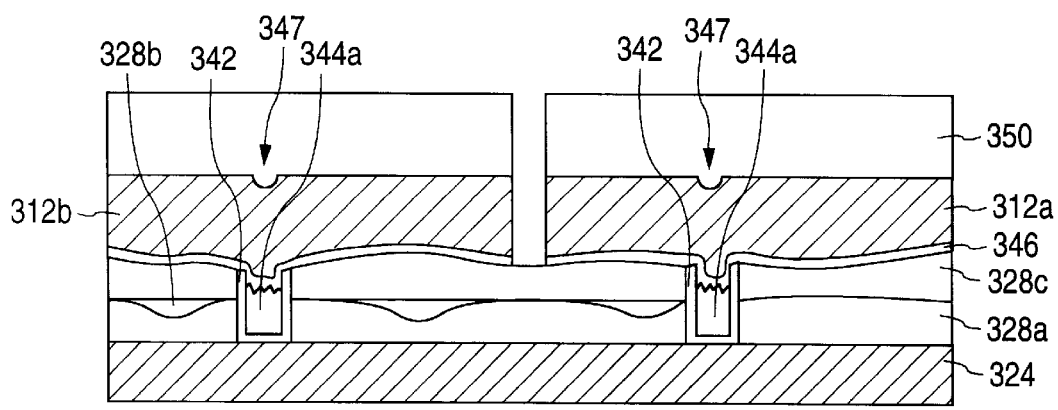
Figure 3J:
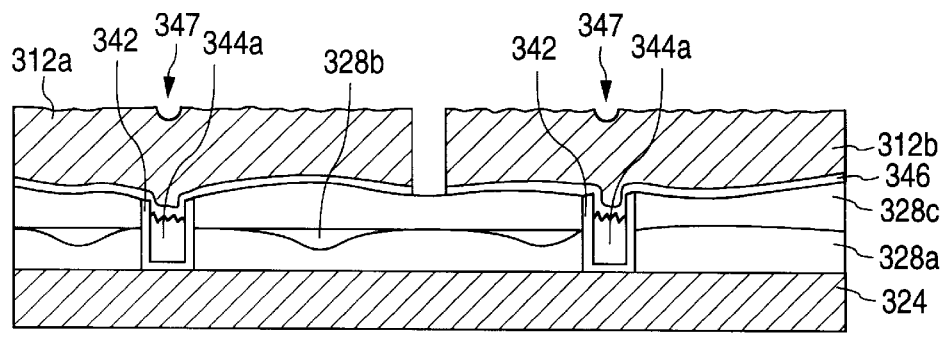

As shown in prior FIG. 3I, after forming the reflective pixel electrode layer on top of the highest intermetal dielectric layer, the next step is to etch the reflective pixel layer to define the discrete electrodes of individual pixel cells.

Following masking and etching of the reflective pixel electrode layer, three process steps are executed to remove the photo resist: 1) first plasma ash; 2) solvent strip; and 3) second plasma ash. As these processes occur after deposition of the smooth pixel electrode layer, they subject the surface of the pixel electrode layer to roughening and a corresponding loss of reflectance.

Figure 13:
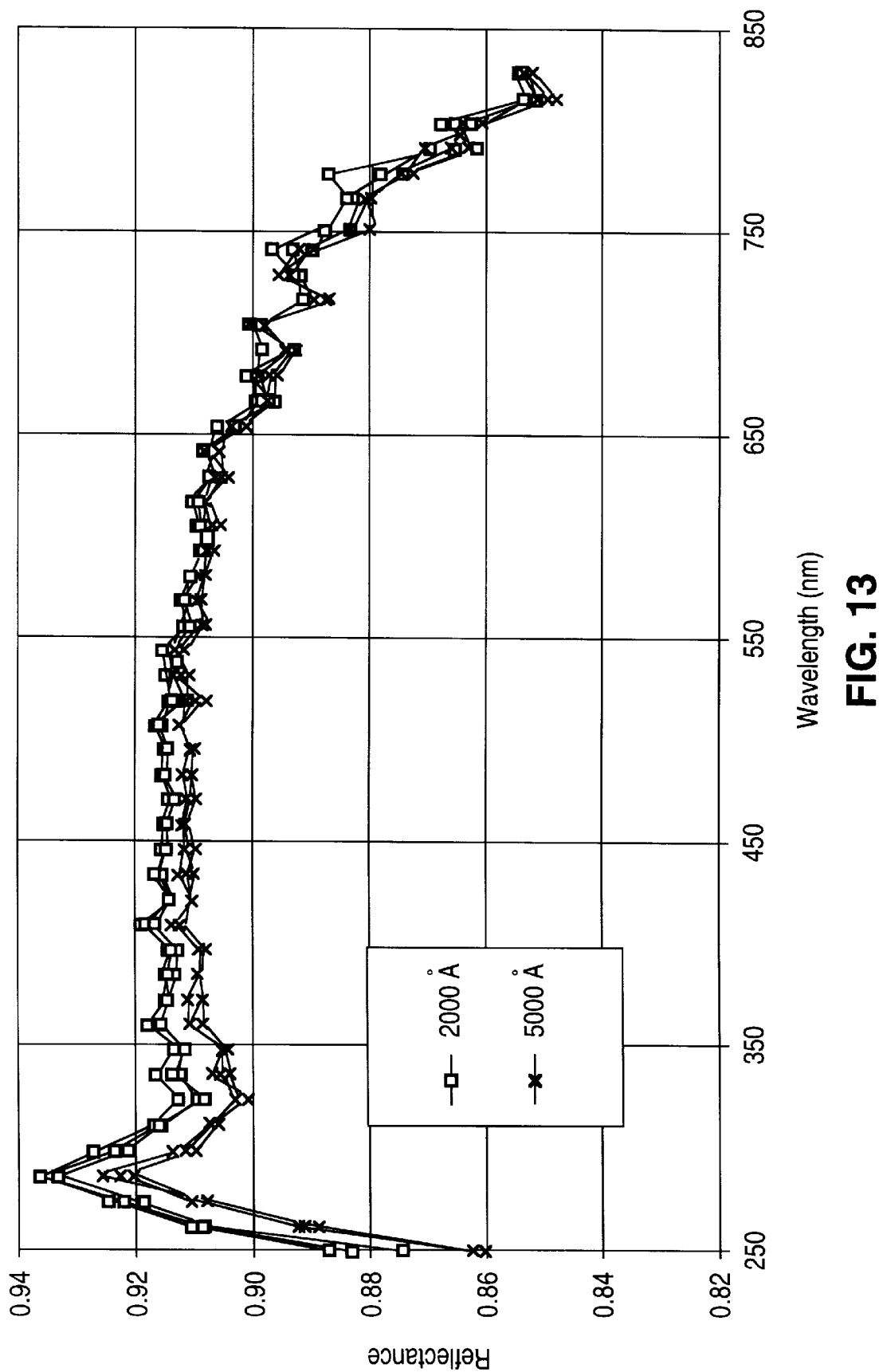
FIG. 13 plots reflectance for the 5000 Å and 2000 Å AlCu layers of FIG. 12 following the first plasma ash step and the solvent strip step.
Figure 14:
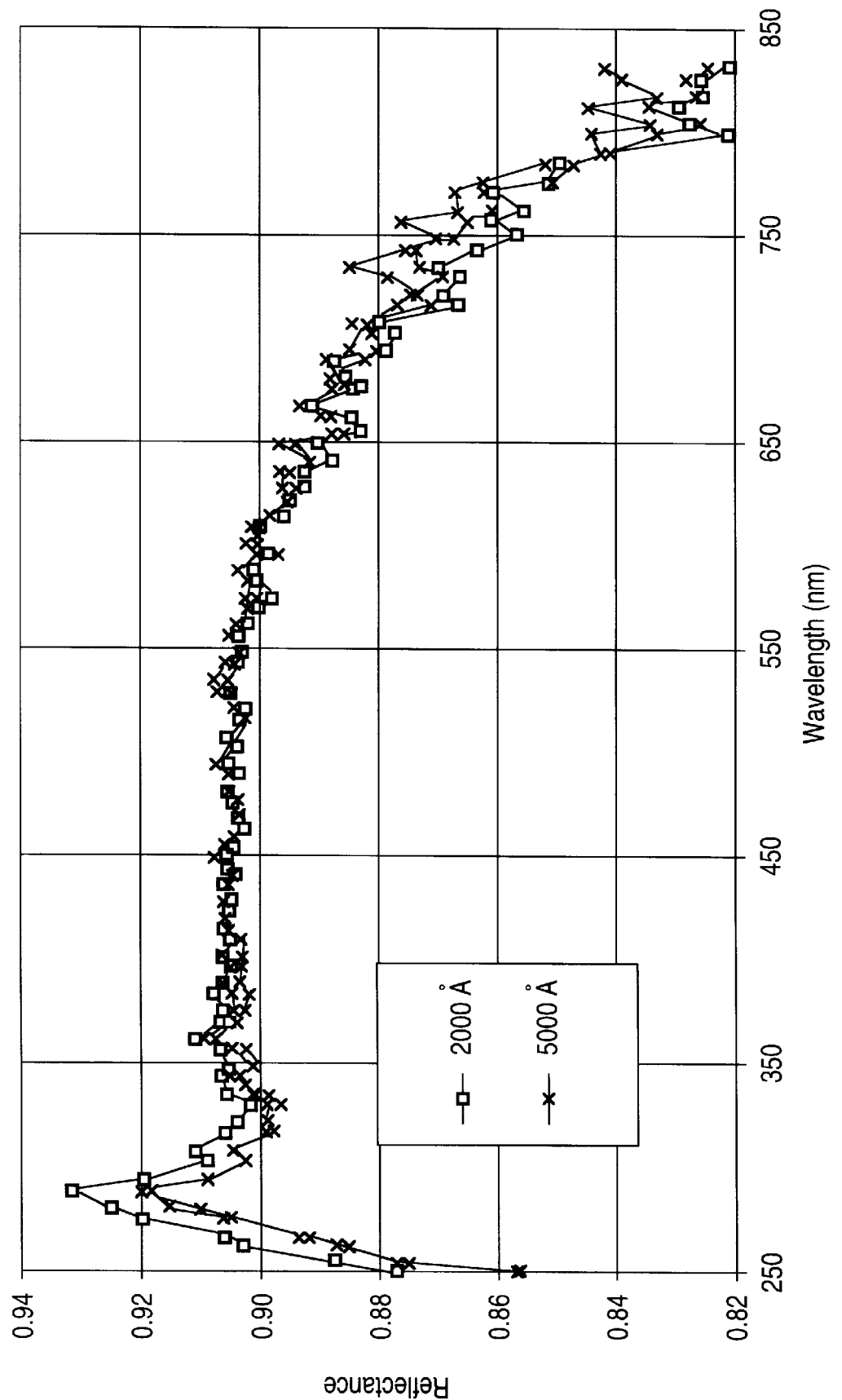
FIG. 14 plots reflectance for the 5000 Å and 2000 Å AlCu layers of FIG. 13 following the second plasma ash step.

The harmful effect of photoresist stripping upon the reflectivity of the pixel electrode is shown by FIGS. 13 and 14. FIG. 13 shows the reflectance of the 2000 Å and 500 Å metal layers of FIG. 12, following the first plasma ash step and the solvent strip step. For FIG. 13, it is interesting to note that the dependence between reflectance and metal thickness becomes greater than as shown in FIG. 12.

FIG. 14 shows the reflectance of the 2000 Å and 5000 Å metal layers depicted in FIGS. 12 and 13 following the second plasma ash step. For FIG. 14, it is interesting to note that the dependence between reflectance and metal thickness is less pronounced after the second plasma ash. This suggests that the increased roughness of the pixel electrode layer is driven by exposure of that surface to the plasma ash process.

The above discussion indicates that the final plasma ash step significantly degrades the reflectance of the underlying metal pixel electrode layer. In order to avoid this degradation, this invention forms the REC prior to etching the pixel electrode layer. Detailed discussion of the REC and its formation is given below.

7. Rec Formation

A. Introduction

While the reflectance of AlCu will benefit from as little roughness as possible, the maximum reflectance of the pixel electrode layer will generally be less than the elusive 100%. Therefore, other means of increasing reflectance must be employed.

Figure 3K:
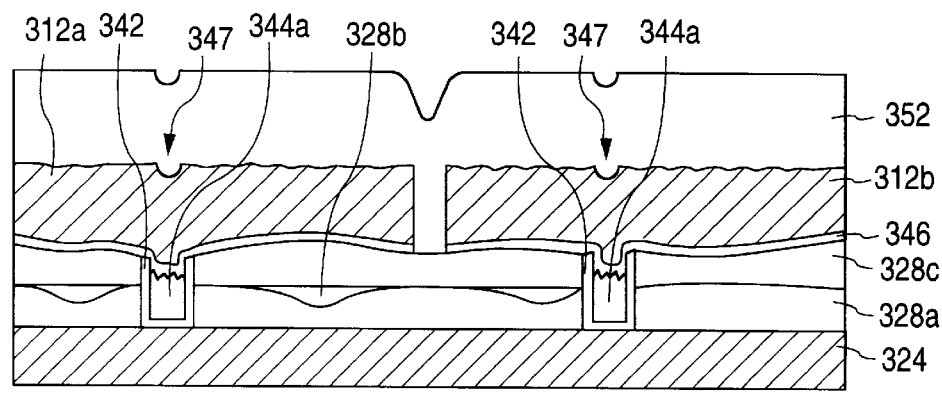
Figure 3L:
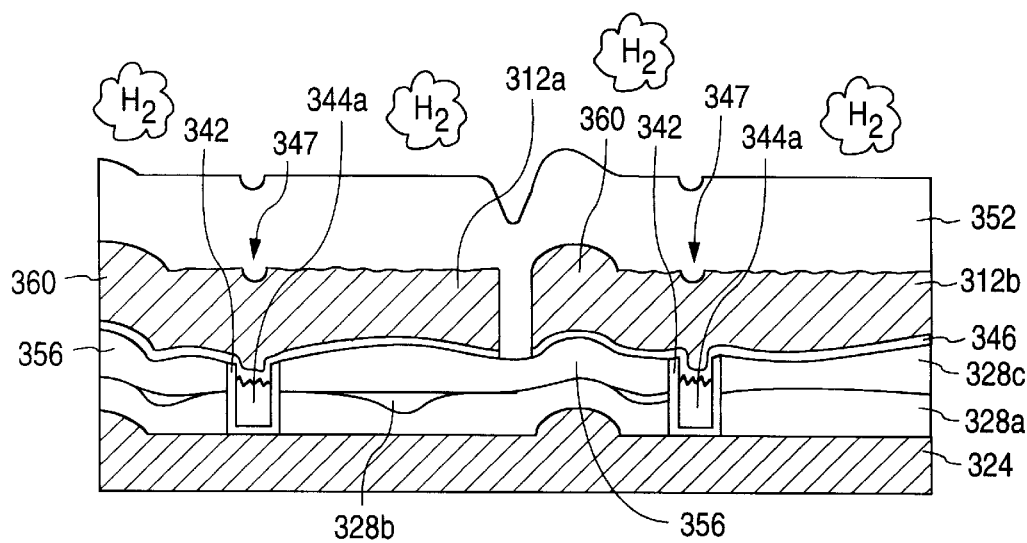

As shown in FIG. 3K, a passive layer of dielectric is normally added following etching to protect the silicon circuitry from the external environment. However, as described in co-pending patent application Ser. No. 08/827,013, this passivation component can also be designed to generate constructive interference.

Such constructive interference is achieved by layering dielectrics of differing indices of refraction on top of the pixel electrode layer. Interference between reflections at each interface of the passivating dielectric layers combine to exceed the reflectance of the individual films.

Figure 15:
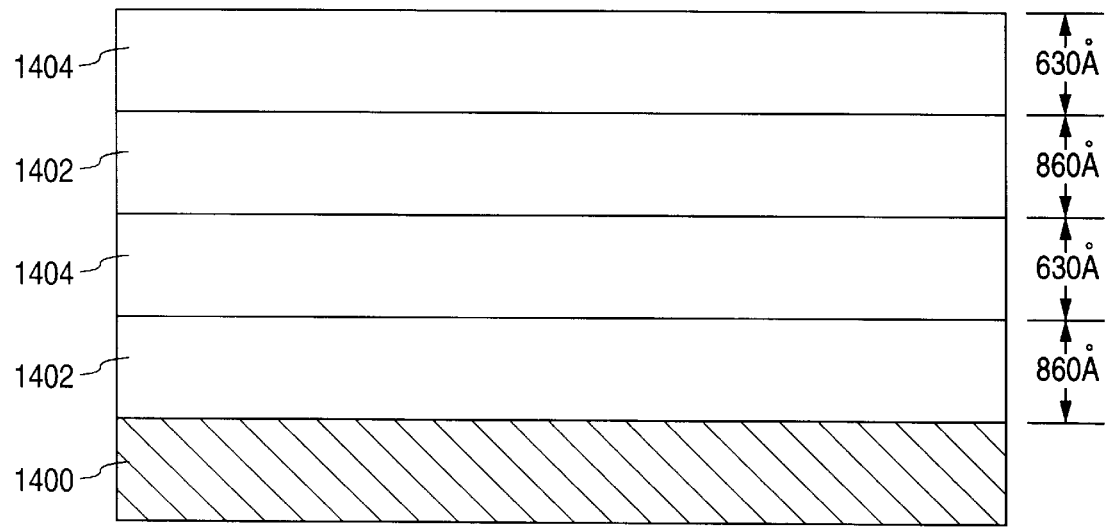
FIG. 15 illustrates a cross-sectional view of a four layer REC produced by the pixels in accordance with a first embodiment of the present invention.

FIG. 15 illustrates a cross-section of the pixel electrode layer 1400 bearing a REC comprising alternating layers of $SiO_2$ 1472 and $Si_3N_4$ 1474. $SiO_2$ layers 1402 have a thickness of approximately 860 Å. $Si_3N_4$ layers 1404 have a thickness of approximately 630 Å. This embodiment of the REC has two beneficial aspects. First, both $SiO_2$ and $Si_3N_4$ are commonly used as passivation layers. Second, plasma enhanced chemical vapor deposition (PECVD) is a commonly employed low temperature processing method. As discussed in detail below in Section 6, low temperature deposition of REC is of paramount importance in retaining the optimal reflectance from the AlCu surface.

Figure 16:
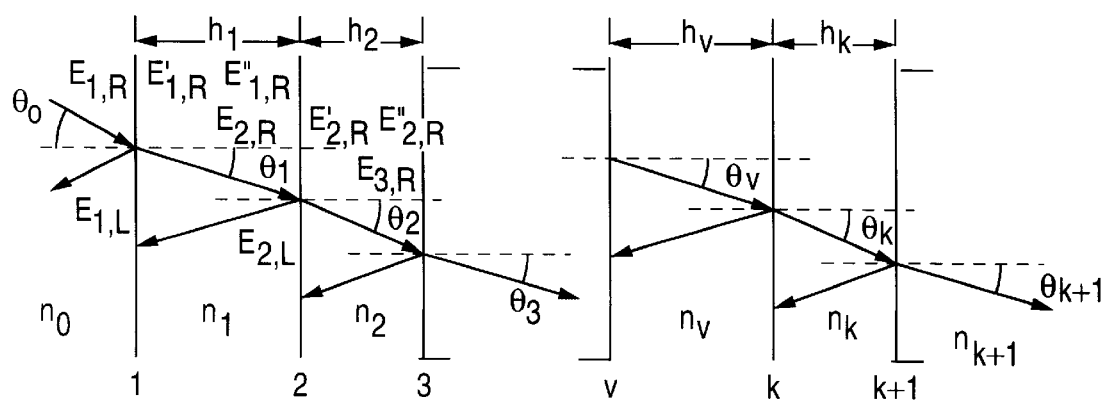
FIG. 16 shows a simple reflection diagram of the REC shown in FIG. 15.

FIG. 16 shows a simple reflection diagram of the REC. After selecting the composition of the various layers of the REC, the remaining design parameter is thickness respective to each film. As example, one may select the optical or phase thickness (n*d) to be one quarter of the mid-band wavelength of light at 550 nm. One quarter wavelength is derived from the phase relationship of Equation (5), setting the phase $\phi_v$ to be 90° and solving for the thickness d. In that manner the maximum reflectance will occur at the wavelength 550 nm. Equation (5) relates the thickness of the constituent film to its index of refraction and the wavelength of light propagating through that film.

$$\varphi_v = \frac{2\pi n_v d_v \cos\theta_v}{\lambda} \quad (5)$$

Equation (6) provides the relationship of an ideal film on an ideal substrate to the individual film properties. The subscripts indicate the interface of the external medium to the first film, 1, and the interface of the film atop the substrate, 2. As an example, one would take the top film as silicon dioxide and the optical substrate would be AlCu. In this example the first interface would be air/$Sic_2$, 1, and the second interface would be $SiO_2$/AlCu, 2. In general the relationship for n number of films is expanded to $2^{n-1}$ products summed in the numerator and $2^{n-1}$ products plus 1 summed in the denominator. These terms include the terms in (5) in addition to the remaining products of the amplitude coefficients, $r_{k+1}$.

$$r_{ideal} = \frac{r_1 + r_2 \exp[-2j(\varphi_1)]}{1 + r_1 r_2 \exp[-2j(\varphi_1)]} \quad (6)$$

In the case of normal incidence the reflection coefficients, $r_v$, are:

$$r_v = \frac{n_{v-1} - n_v}{n_{v-1} + N_v} \quad (7)$$

The REC thus can enhance reflectance from the surface of the pixel cell electrode beyond that of AlCu alone. In theory, the reflectance will asymptotically approach a maximum of 100% as the number of dielectric layers in the interference stack increases. While the reflectance would never become 100%, the reflectance would theoretically increase incrementally as more films are added to the REC.

B. Formation of 4 Layer REC

As shown in FIG. 15, the first embodiment of a process for forming a REC in accordance with the present invention creates a first 860 Å $SiO_2$ film, a second 630 Å $Si_3N_4$ film, a third 860 Å $SiO_2$ film and a fourth 630 Å $Si_3N_4$ film.

Figure 17:
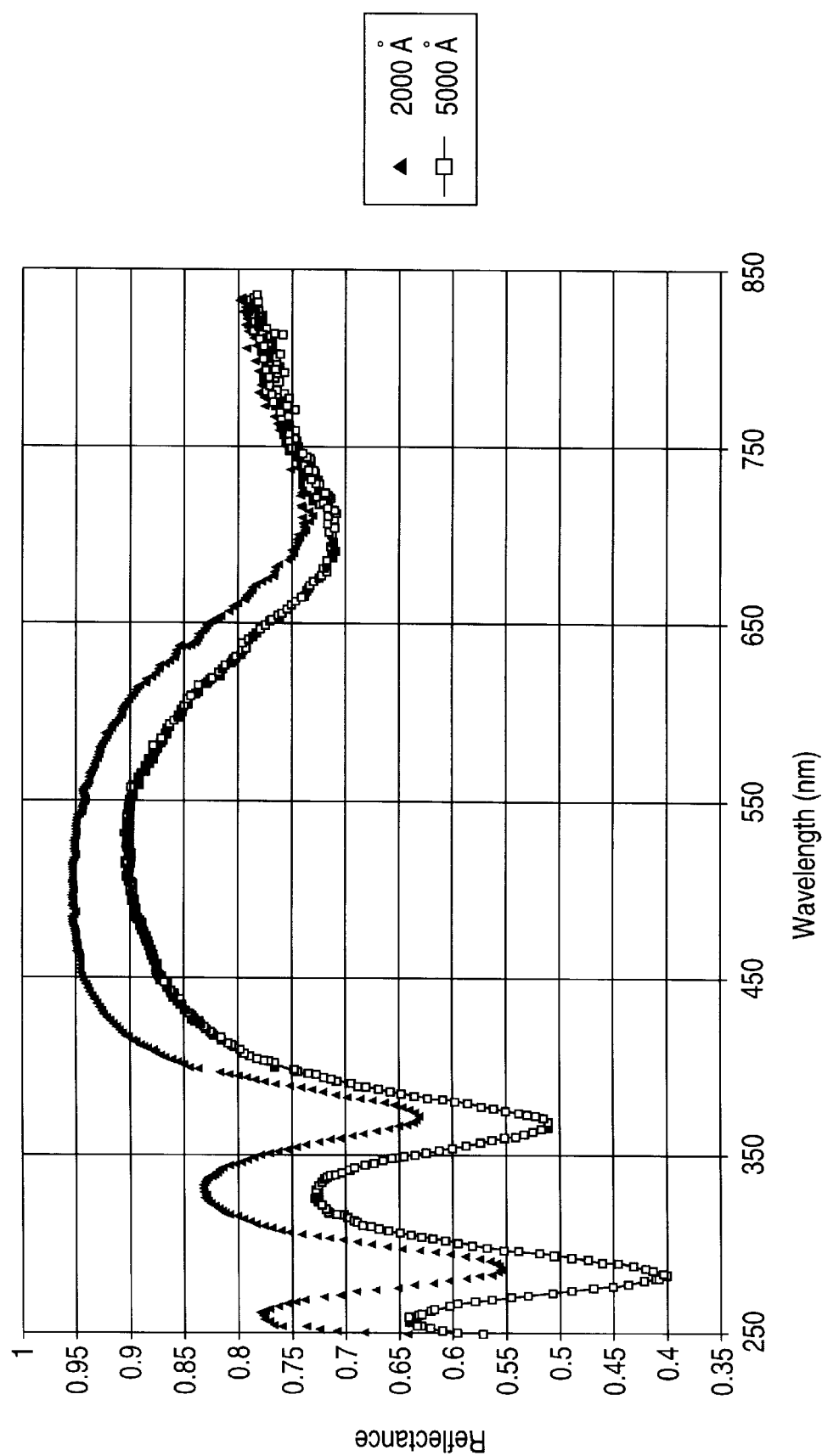
FIG. 17 plots average reflectance of the REC of FIG. 15 on top of pixel electrode layers having a thickness of 2000 Å and 5000 Å.

FIG. 17 shows average reflectance data from this combination of layers on top of pixel electrode layers having a thickness of 2000 Å and 500 Å. In reviewing FIG. 17, it is important to note the higher reflectance of wafers having a 2000 Å metal layer versus those having a 5000 Å metal layer. This data from FIG. 17 independently confirms the results previously discussed in connection with section 5B and FIGS. 11A–11C and 12, confirming that deposition of a thin metal layer will produce the highest achievable reflectance.

Figure 18:
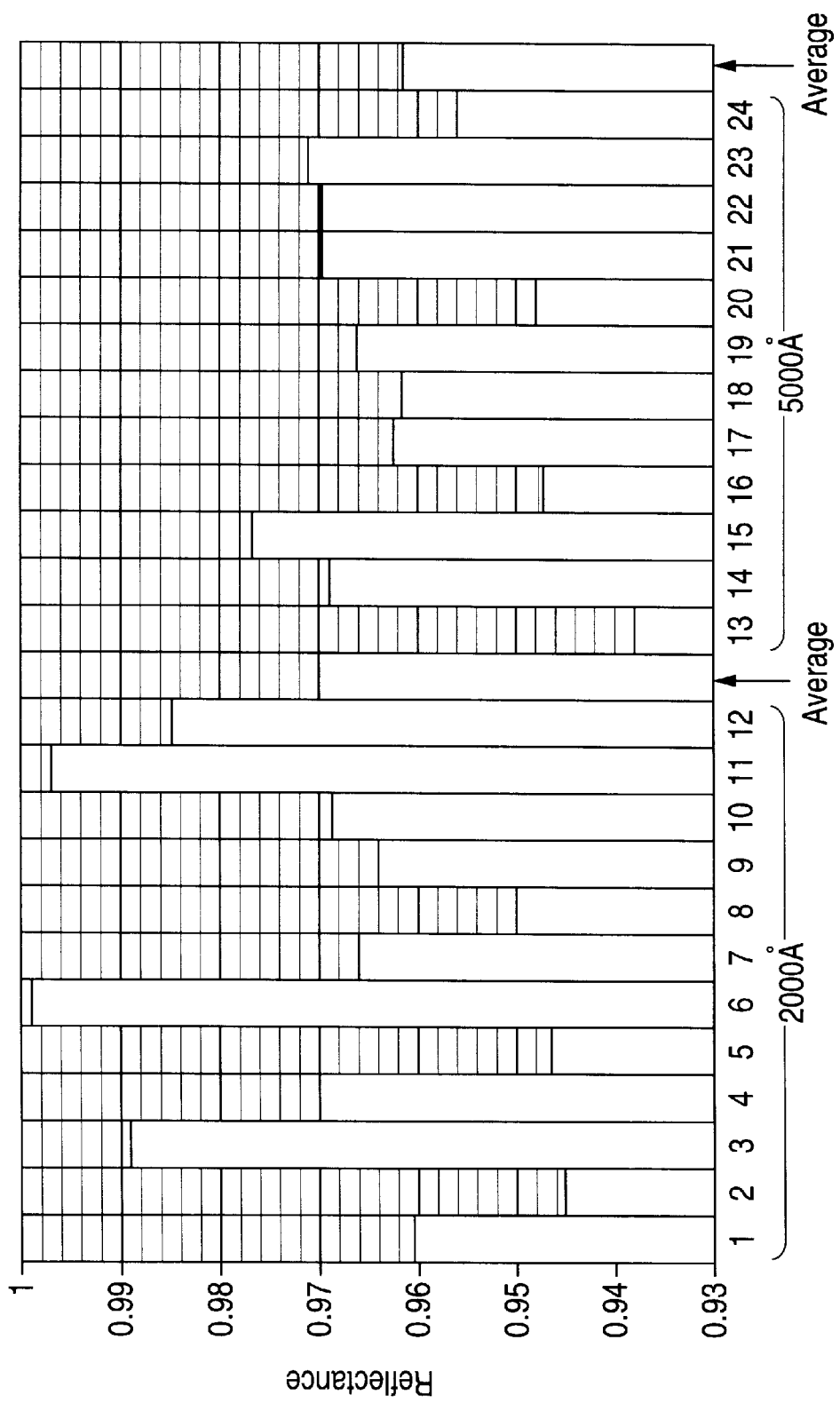
FIG. 18 presents a bar graph showing maximum and average reflectance resulting from a simple process flow that creates a REC on top of an aluminum layer formed over silicon.

FIG. 18 presents a bar graph of maximum and average reflectance resulting from a simple process flow that creates a REC on top of an aluminum layer formed over silicon. FIG. 18 indicates that the average reflectance of the REC over a 2000 Å metal layer is one percent higher than the average reflectance of the REC over a 5000A metal layer.

C. Effect of Temperature of REC Deposition

To understand the effects of temperature of REC deposition upon reflectance, several experiments were conducted. In the first experiment, metal was deposited and the wafers baked under conditions necessary to form a four layer REC as described above. However, no gases flowed during this experiment and thus no films were deposited.

FIGS. 19A–19D show the effect of such thermal exposure upon reflectance. FIGS. 19A–19D plot reflectance for wafers exposed to a REC thermal budget of 4 min at 4000C, 400° C., 350° C., and 300° C. respectively, unaccompanied by the formation of an actual REC.

Figure 19A:
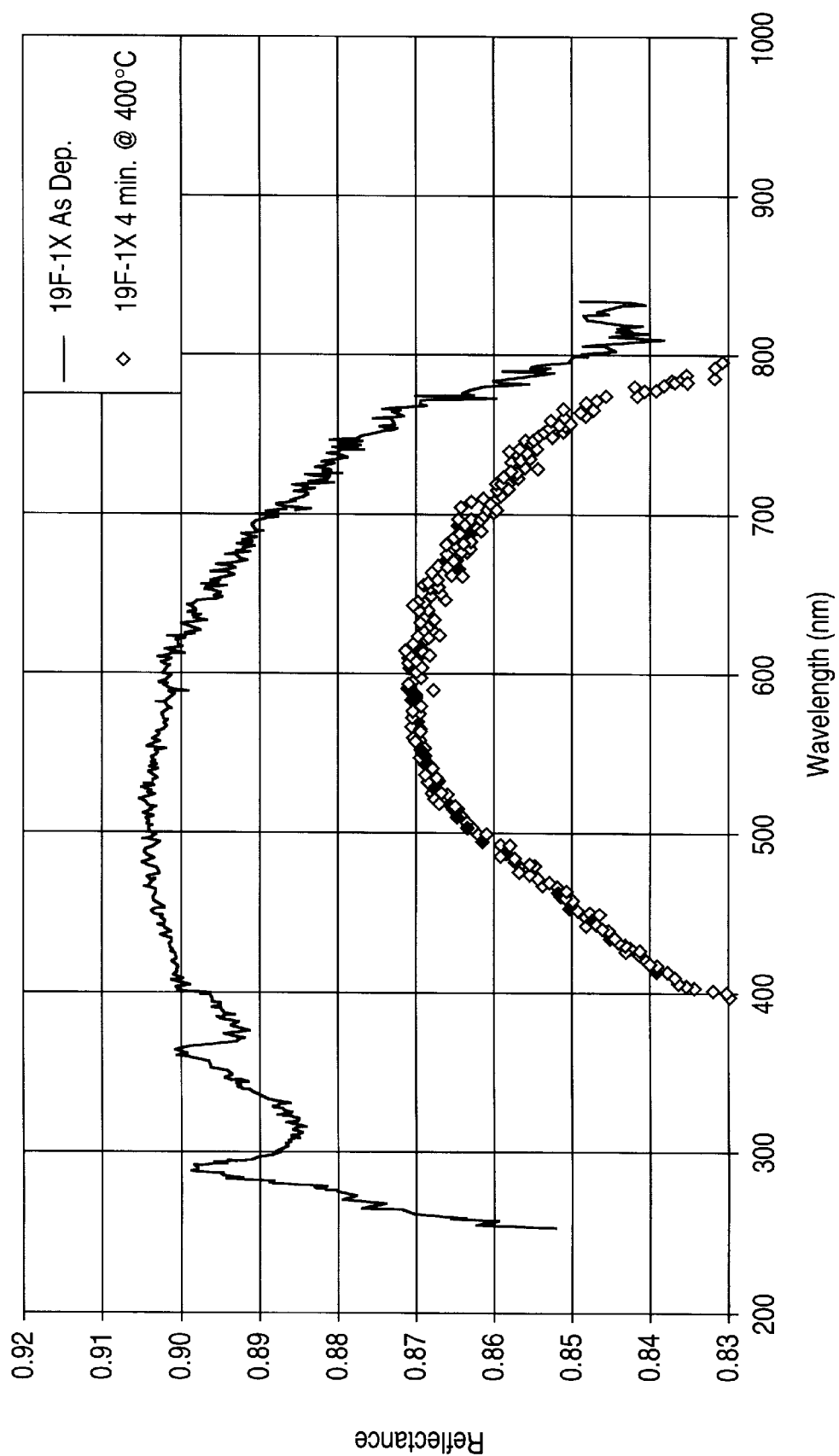
FIGS. 19A–19D plot the effect upon reflectance of a bare metal layer subject to thermal processing equivalent to that utilized in the process to form a four layer REC as described in FIG. 18.
Figure 19B:
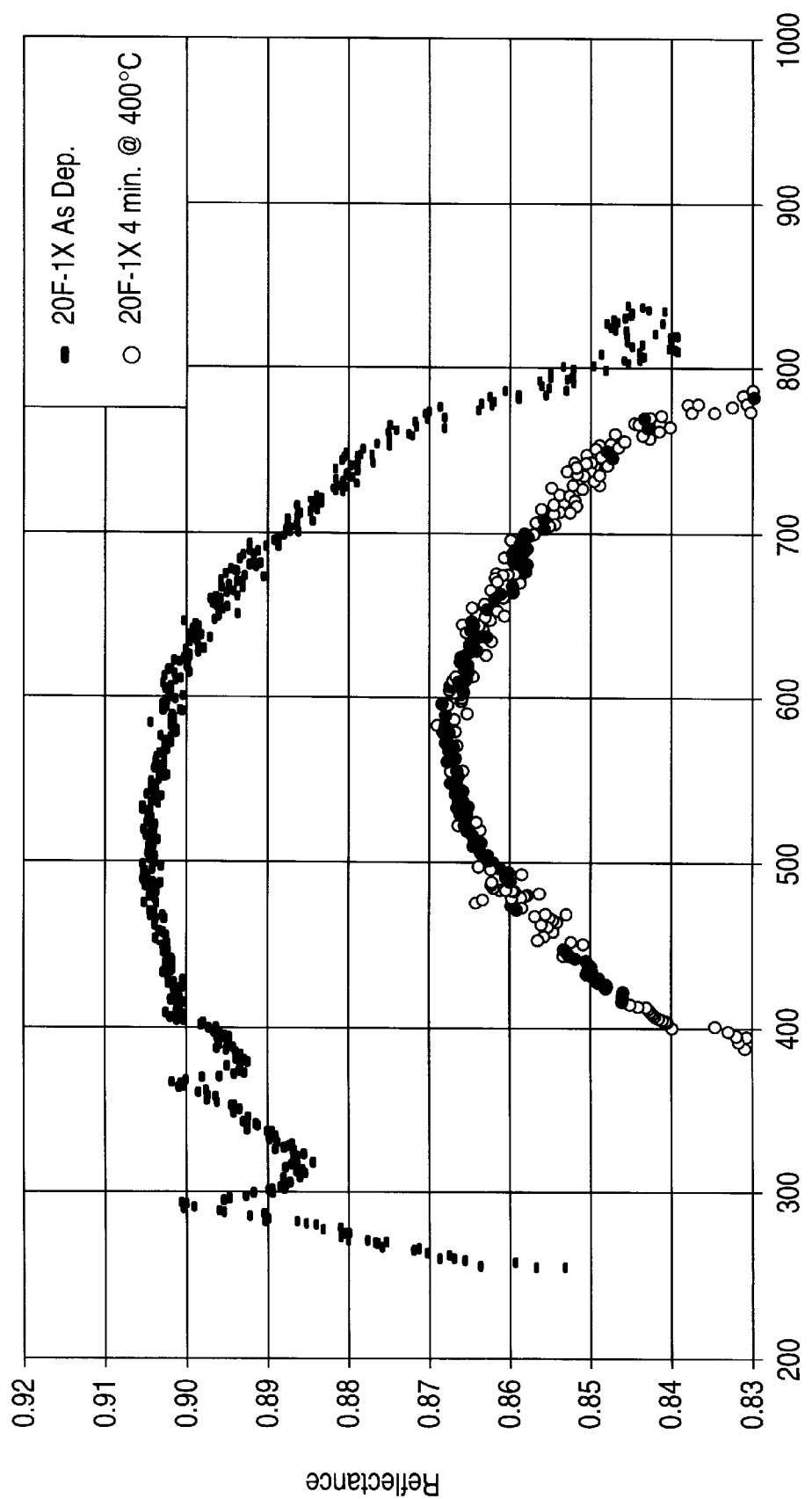
Figure 19C:
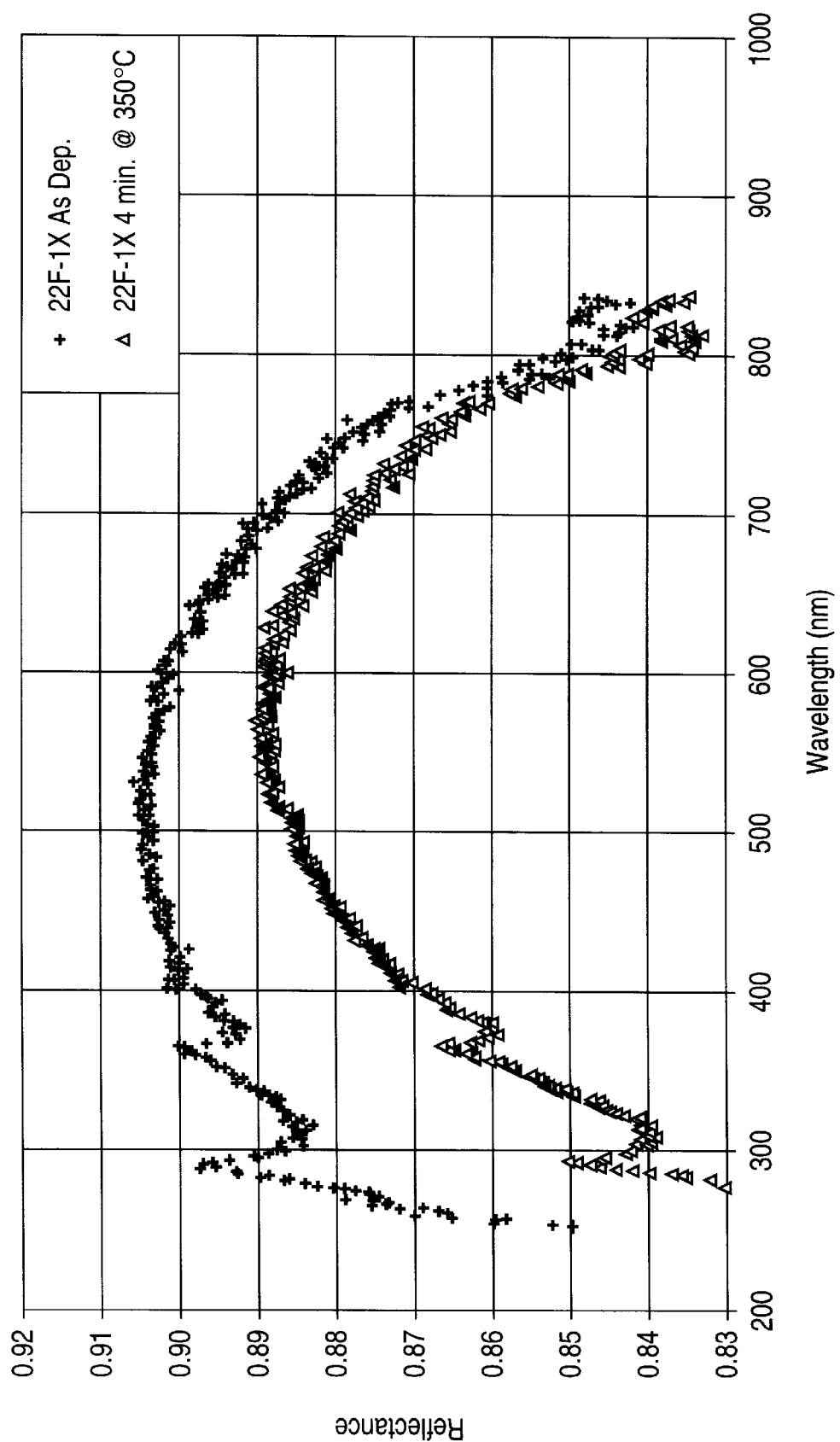
Figure 19D:
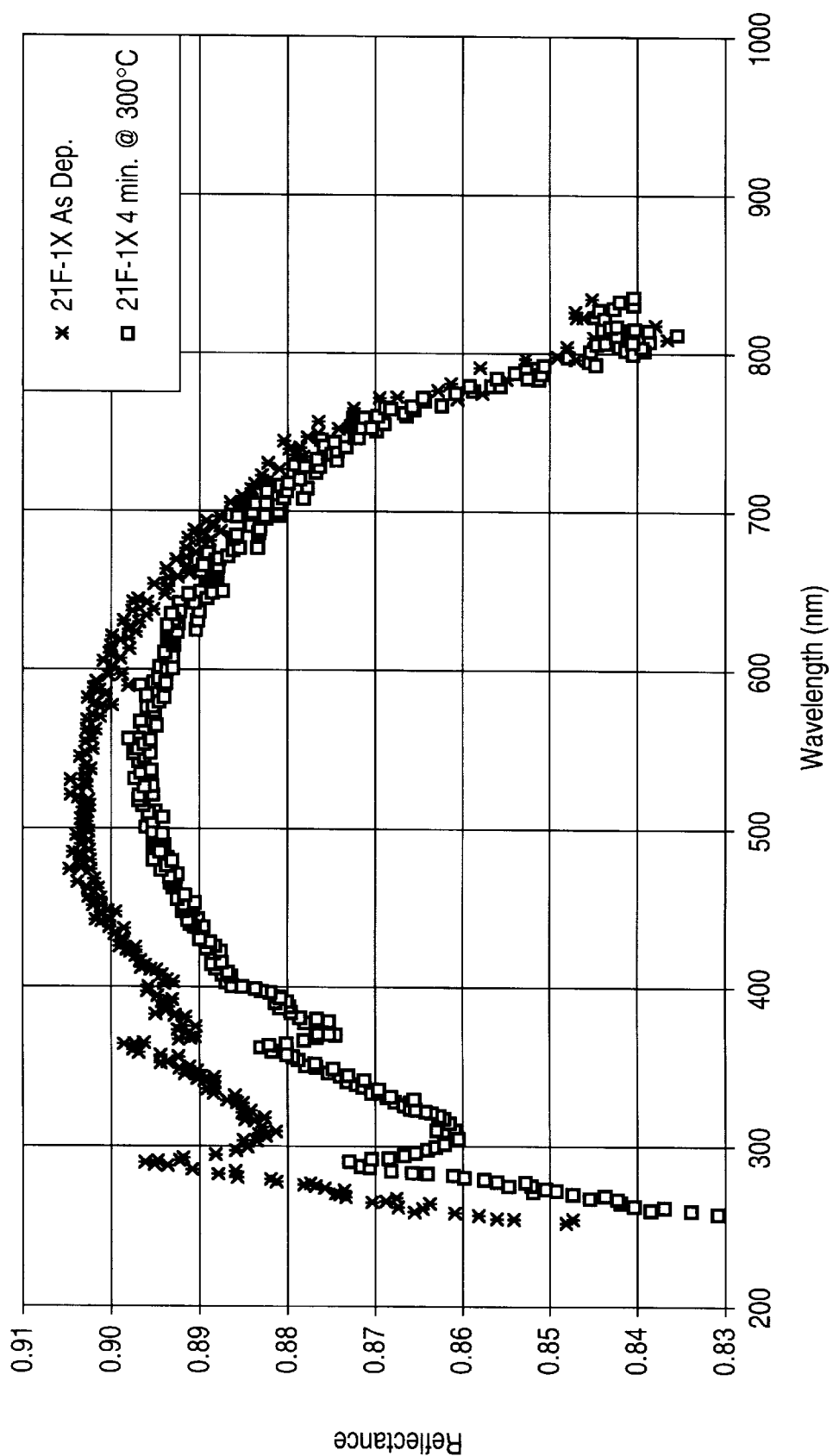

Bare Al exhibits relatively constant reflectance over the visible light spectrum. FIGS. 19A–19D are thus particularly instructive in that because there is no REC, a nearly flat reflectance profile would be expected. Therefore, the variance in reflectance of FIGS. 19A–19D is attributable to surface roughness. In comparing FIGS. 19A–19D, the optimum REC deposition temperature is 300° C. as shown in FIG. 19D. This temperature roughens the AlCu the least, given the resulting small decrease in reflectance.

Figure 20B:
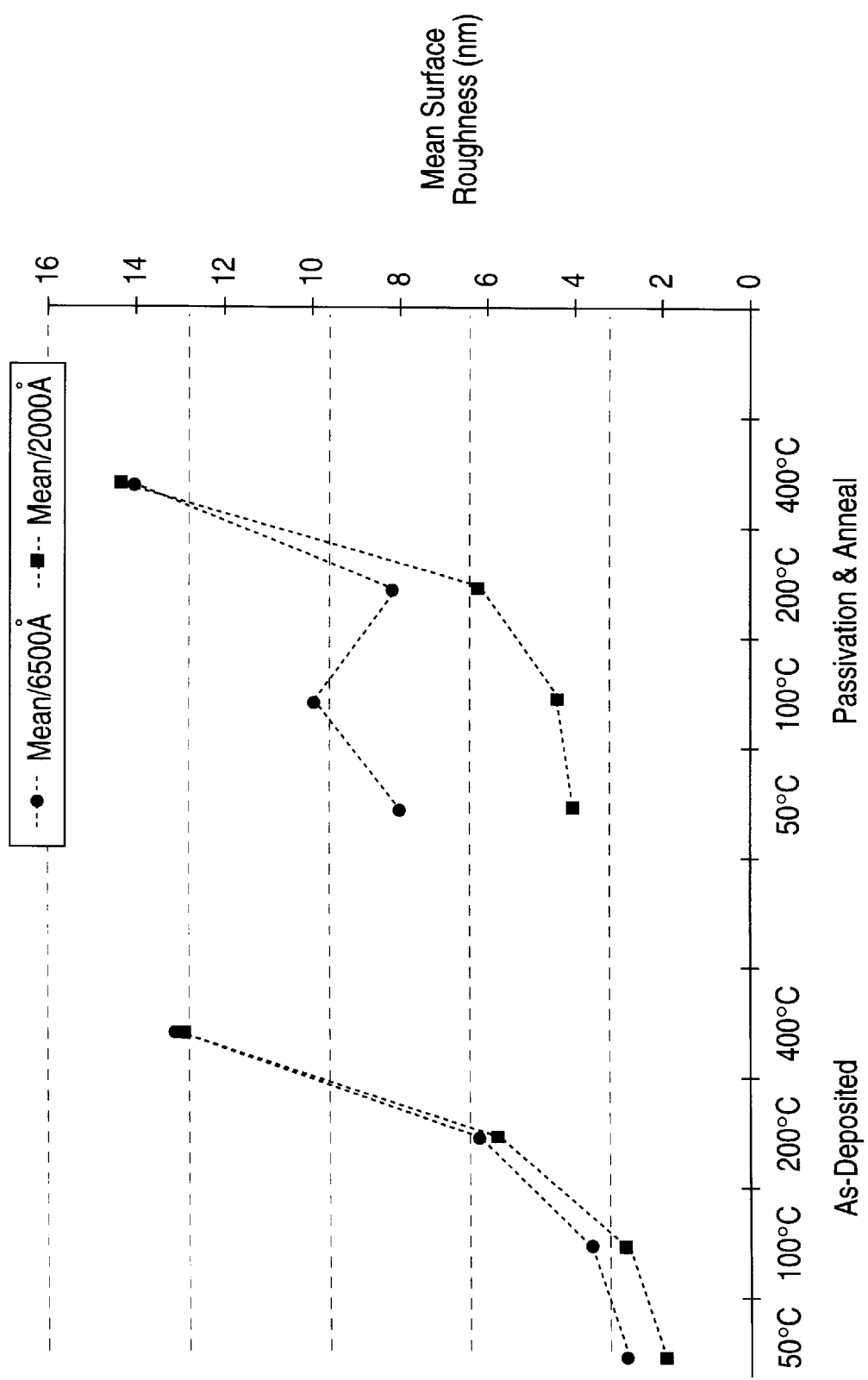
Figure 20C:
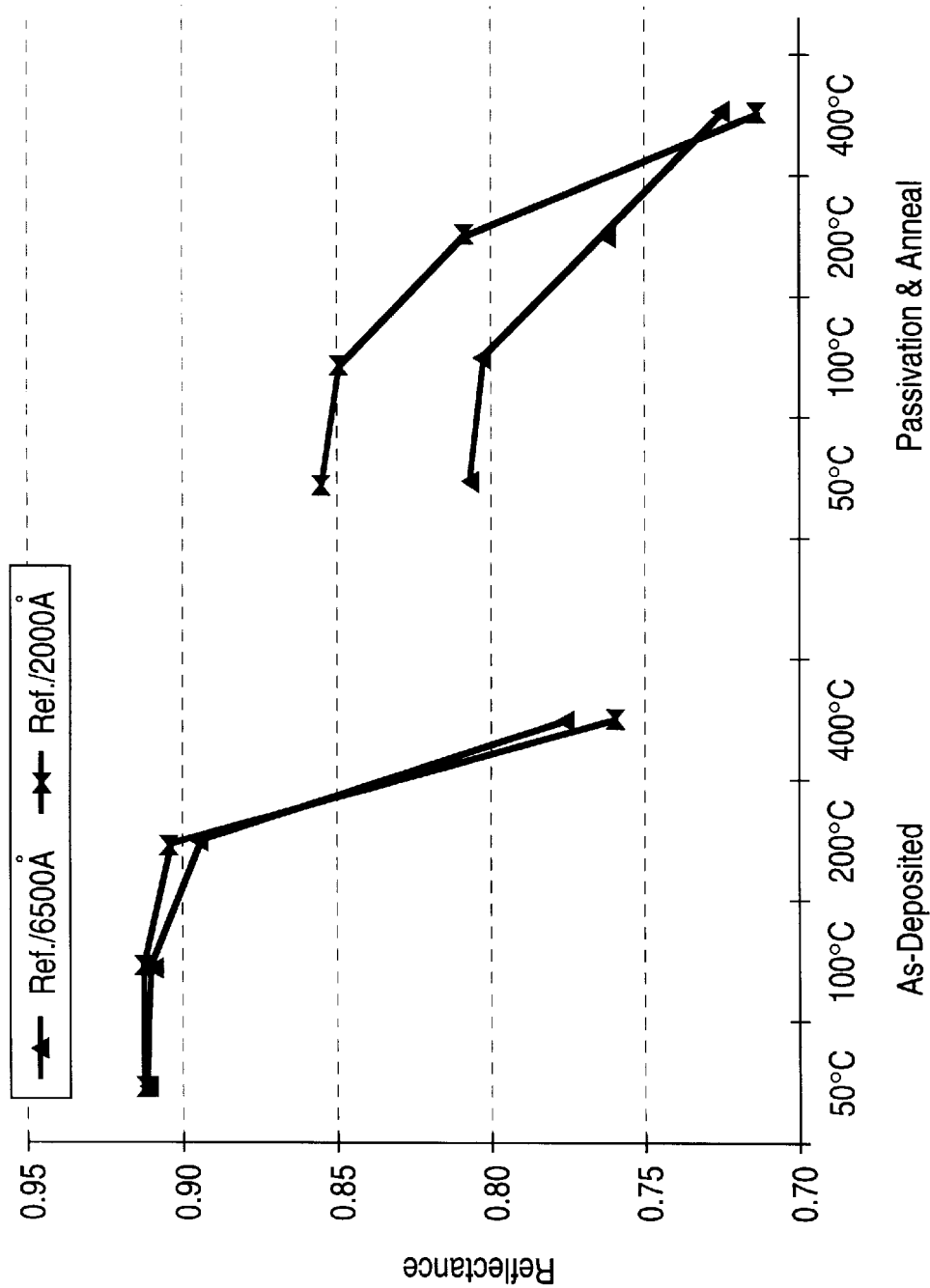

FIGS. 20A–20C also demonstrate the effect upon reflectance of the pixel electrode due to high processing temperatures subsequent to the deposition of the metal layer. FIG. 20A shows the changes in grain size of 6500 Å and 2000 Å AlCu layers that are subject to annealing at a variety of temperatures for one hour. FIG. 20B shows the changes in surface roughness of the 6500 Å and 2000 Å AlCu layers that are subjected to formation of a passivation layer and then annealed at a variety of temperatures for one hour. FIG. 20C shows the changes in reflectance of the 6500 Å and 2000 Å AlCu layers that are subjected to the formation of a passivation layer and then annealed at a variety of temperatures for one hour.

As indicated in FIG. 20A, grain size does not change appreciably after deposition following the annealing step. However, as indicated in FIGS. 20B and 20C, both the 6500 Å and 2000 Å metal layers experienced increased surface roughness and decreased reflectance following annealing.

Figure 21:
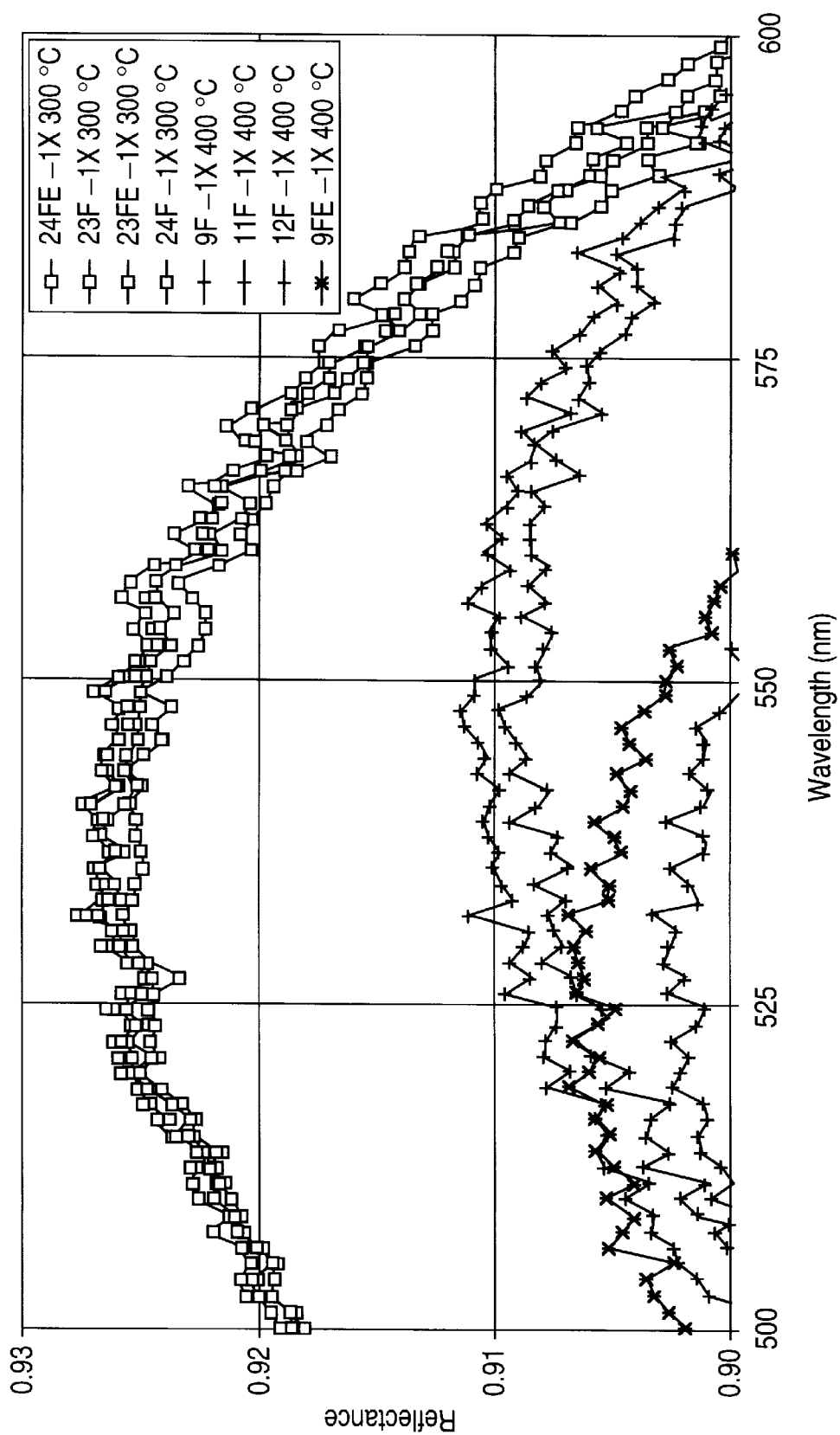
FIG. 21 plots reflectance of wafers having a four layer REC deposited at either 300° C. or 400° C. in accordance with the process of the present invention.

A second experiment was conducted to verify the correlation between loss in reflectivity and high REC deposition temperature. FIG. 21 plots reflectance data of wafers having a four-layer REC deposited at 300° C. and 400° C. The significant decrease in the reflectance of the wafers having REC deposited at 400° C. confirms the correlation between low REC deposition temperature and enhanced reflectance.

In assessing the effect upon reflectance of a REC layer above the metal surface, it is also important to recognize that reflectance of the pixel cell electrode layer is dependent not only upon (1) the absolute temperature of metal deposition (see section 5A above) and (2) the absolute temperature of REC deposition (see discussion immediately above), but is also dependent upon (3) the difference in temperature between metal deposition and REC deposition.

Figure 22:
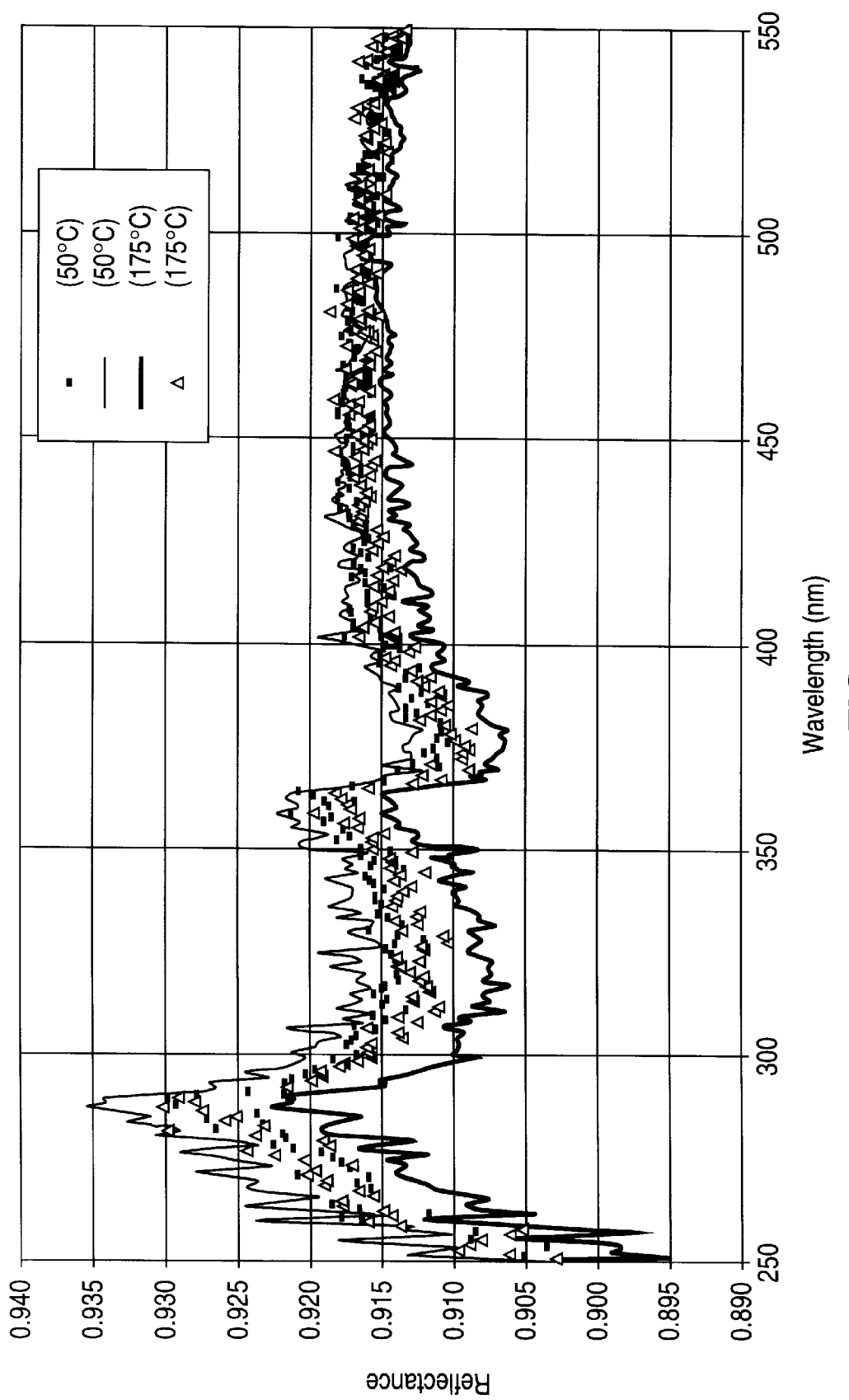
FIG. 22 plots reflectance following deposition of a 5000 Å AlCu pixel electrode layer on top of a 400 Å pixel adhesion layer under four combinations of metal deposition temperature and REC deposition temperature.
Figure 23:
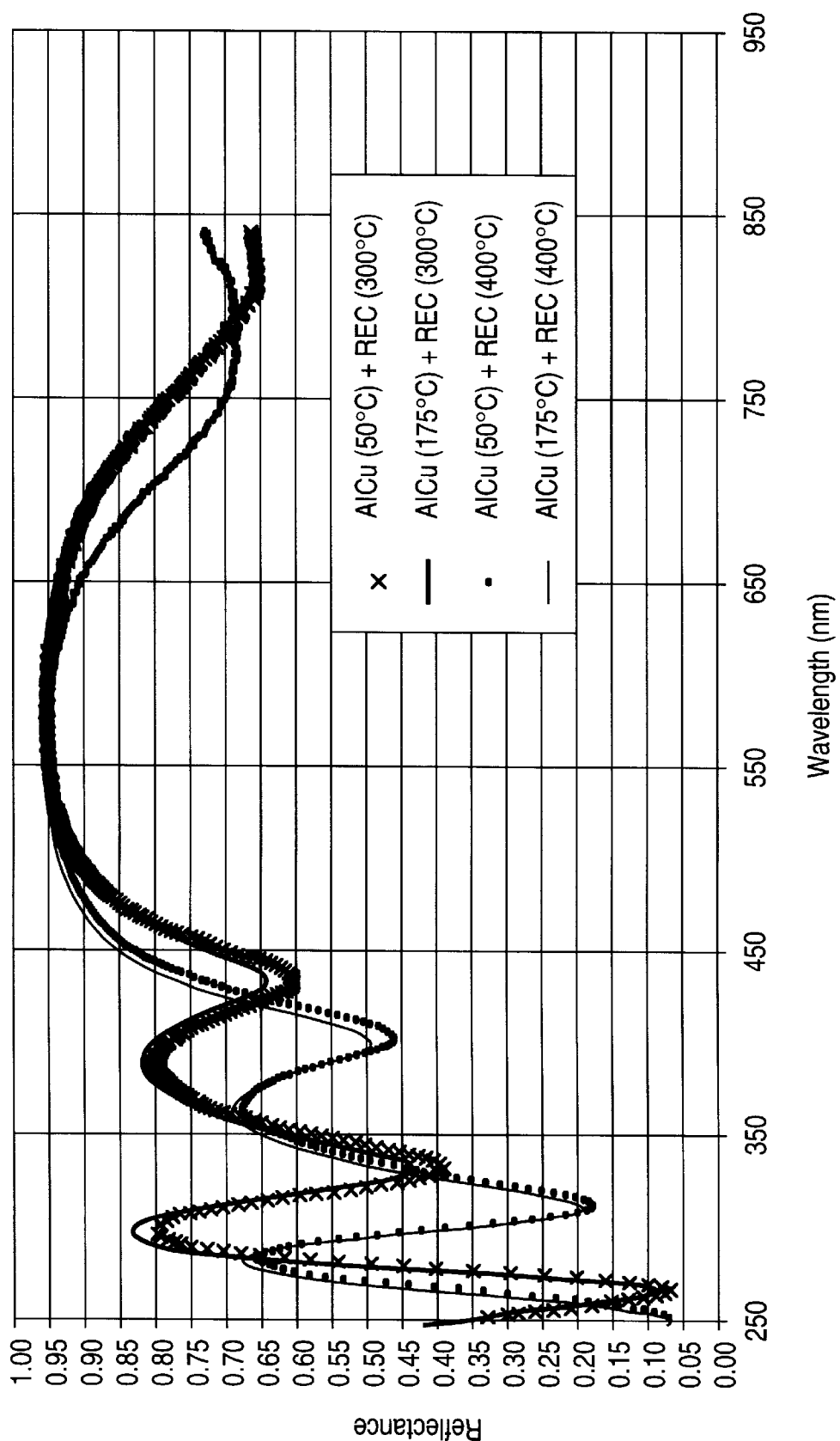
FIG. 23 plots reflectance following formation of a four layer REC on top of the 5000 Å pixel electrode layer and the 400 Å pixel adhesion layer deposited under the four combinations of metal deposition temperature and REC deposition temperature of FIG. 22.

Table 1 and FIGS. 22 and 23 illustrate this point. Table 1 shows four combinations of metal and REC deposition temperature conditions.

TABLE 1

| Combination | AlCu Deposition Temp (° C.) | REC Deposition Temp (° C.) | ΔT (° C.) |
|---|---|---|---|
| 1 | 50 | 300 | 250 |
| 2 | 175 | 300 | 125 |
| 3 | 50 | 400 | 350 |
| 4 | 175 | 400 | 225 |

FIG. 22 illustrates reflectance following deposition of 5000 Å AlCu on top of a 400 Å Ti pixel adhesion layer under temperature combinations 1–4 shown in Table 1. FIG. 23 illustrates reflectance following formation of a four layer REC on top of the metal deposited under temperature combinations 1–4.

As suspected, optimum reflectance is generally observed in combination 2, where the difference between the temperature of AlCu deposition and the temperature of REC deposition is the lowest (125° C.). This is likely attributable to the formation of hillocks in the AlCu layer due to shear forces generated by the differential coefficient of thermal expansion between AlCu and the overlying REC. Where the difference in temperature at the time of formation of the metal and REC is minimized, the difference in thermal expansion will also be minimized, producing less shear stress on the AlCu. This lowering of shear stress in turn produces fewer hillocks.

Ideally, the difference between the metal and REC deposition temperatures would be zero. However, attaining this goal has been elusive because the lowest range for depositing REC is currently between 300 and 400° C. Unfortunately, large grains of AlCu form at these high temperatures and degrade reflectance, as discussed above in connection with section 5A and FIGS. 10 and 11A–11C.

Thus, the process challenge solved by the present invention was optimization of conditions leading to formation of AlCu having small grains while maintaining a small difference between AlCu and REC deposition temperature and thus low hillock density.

FIGS. 22 and 23 demonstrate the advantage in reflectance achieved by maintaining the difference in AlCu deposition temperature and REC deposition temperature as small as possible. FIGS. 22 and 23 also demonstrate that initial roughness caused by the larger AlCu grains formed at 175° C. versus 50° C. did not negate the advantage conferred by the REC.

B. Effect of Multilayered REC

Figure 24A:
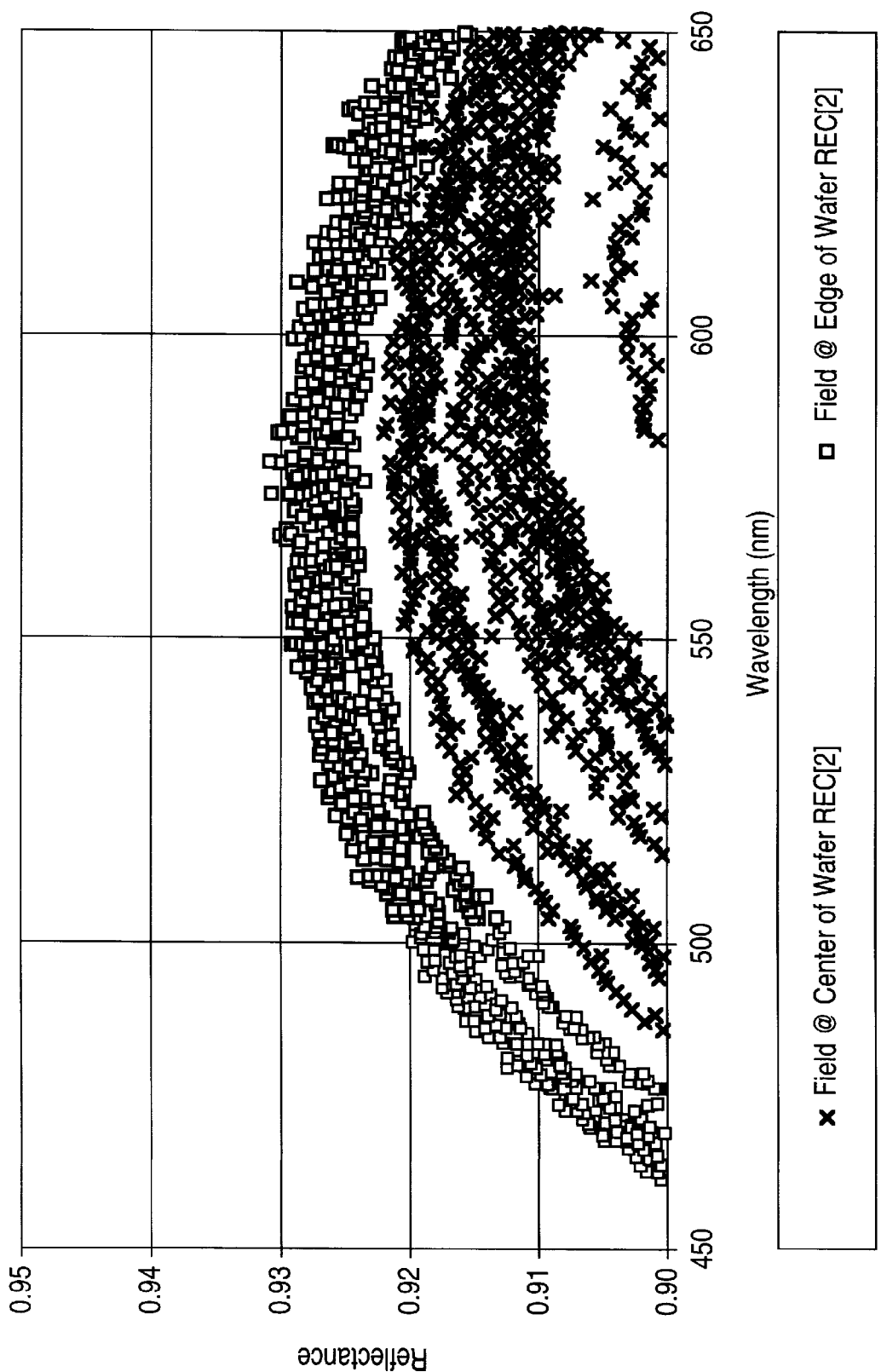
FIGS. 24A–24B plot reflectance measured after deposition of a two layer REC, and after deposition of a four layer REC.
Figure 24B:
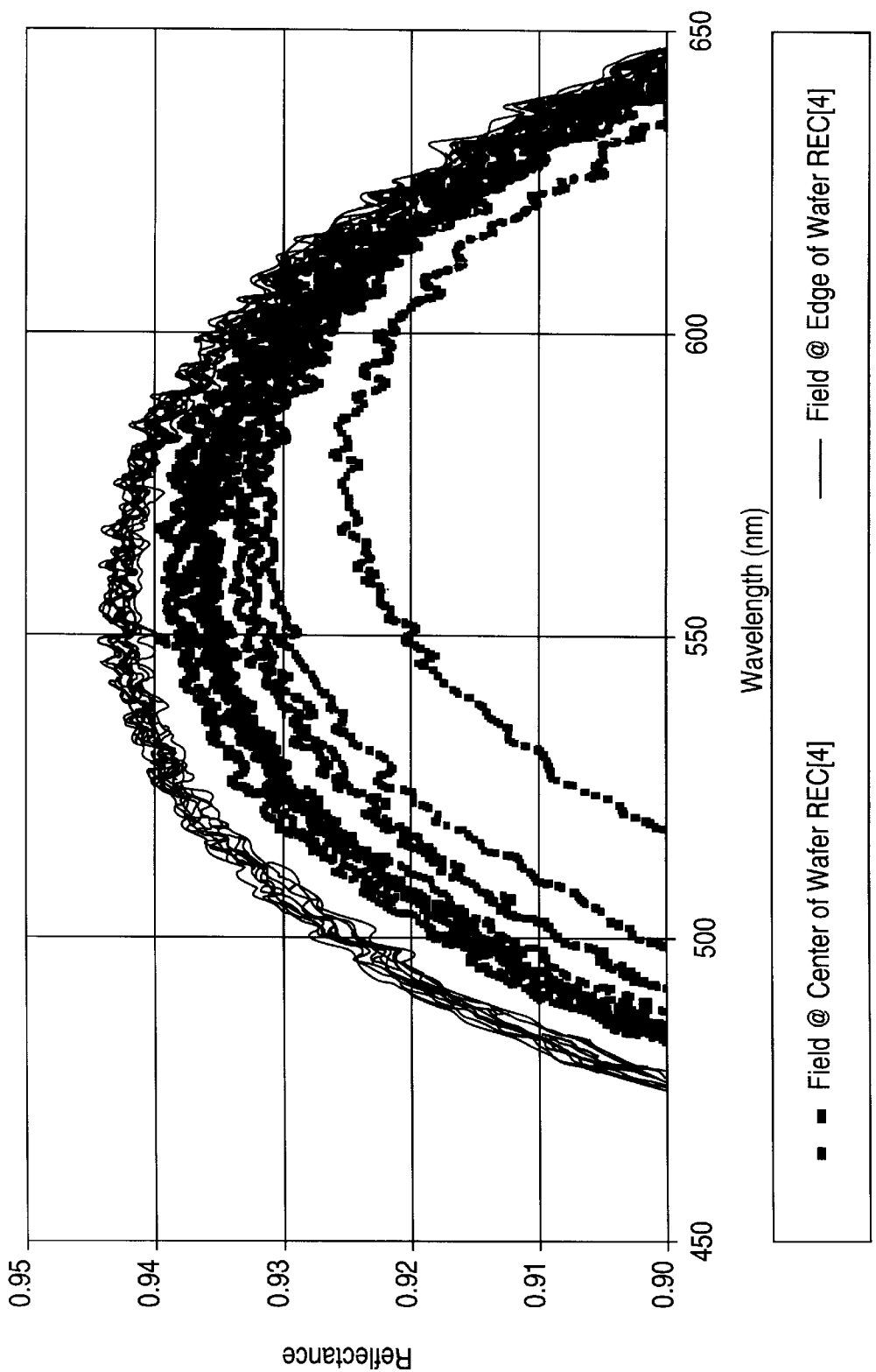

Due to the lack of roughness created in the REC films during deposition of the third and forth layers, reflectance should be greater in a two layer REC. FIGS. 24A and 24B plot reflectance measured after deposition of a two layer REC, and after deposition of a four layer REC. FIG. 24A plots field reflectance at the center of the wafers. FIG. 24B plots field reflectance at the edge of the wafers.

Comparison of reflectance data from FIGS. 24A and 24B reveal that the effect of roughness created during film deposition does not diminish the reflectance of the four layer REC as compared to the two layer REC.

Figure 25:
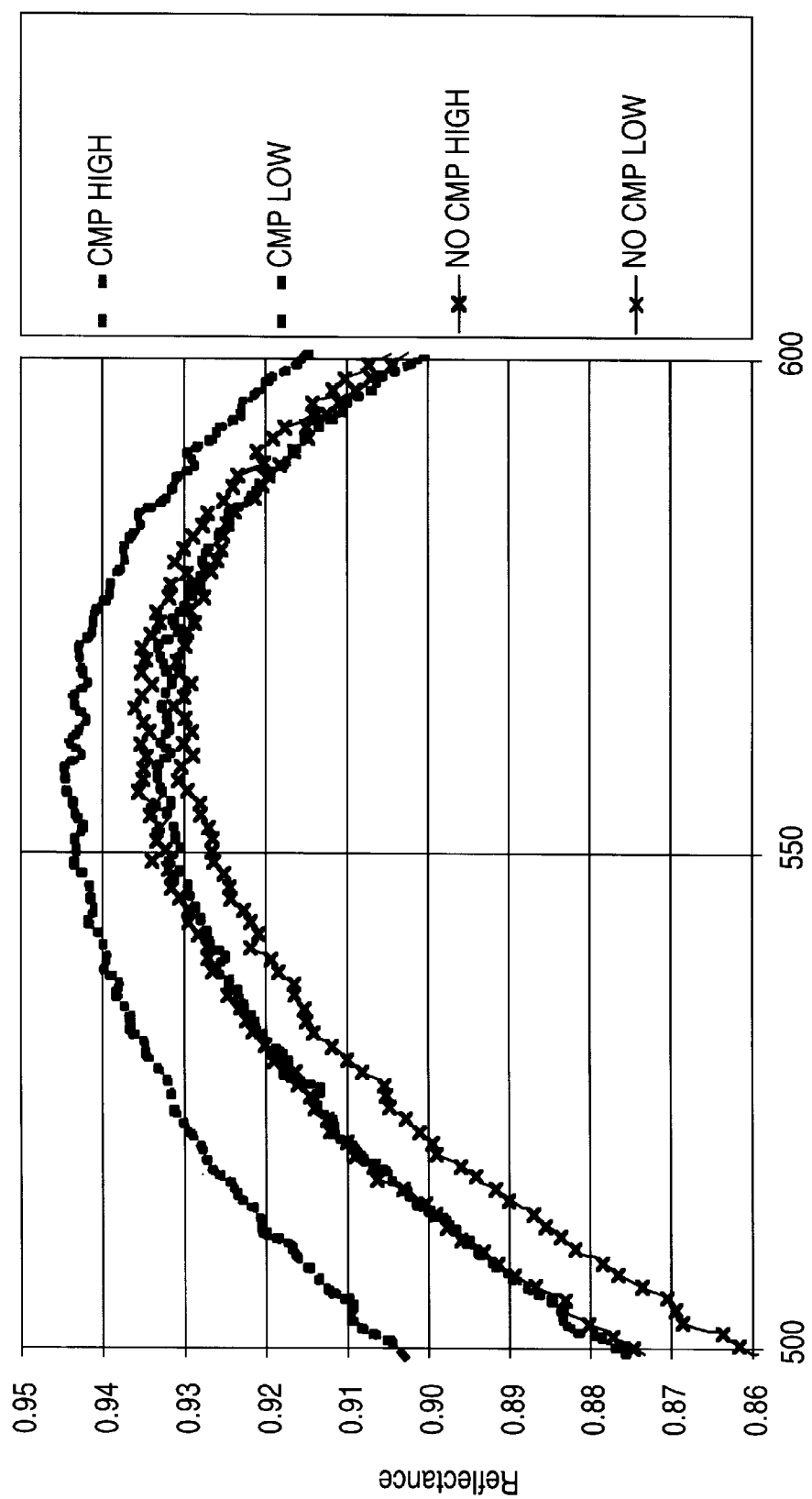
FIG. 25 plots maximum and minimum reflectance of a metal layer covered by a six layer REC.

The theory underlying operation of the REC as described above predicts that addition of layers would produce an increase in reflectance. FIG. 25 illustrates the maximum and minimum reflectance of a metal layer covered by a six layer REC.

Comparison of FIGS. 24A–24B and FIG. 25 reveals that experimental results did not correlate with theory. Specifically, higher reflectance was observed in the case of a four layer REC than in the case of a six layer REC. This departure from theory suggests that the increased thermal energy associated with deposition of the additional two films created additional roughness and eliminated any potential advantage in reflectance conferred by constructive interference from the additional layers of REC.

Comparison of FIGS. 24A–24B and FIG. 25 also reveals that the maximum reflectance versus wavelength was approximately equal as between the four and six layer REC. Additionally, FIG. 25 reveals that the bandwidth of reflected light was significantly truncated by adding the last two layers of REC. Thus, the data suggests that the thermal effects of REC deposition inherently limit the maximum reflectance achievable by creating an interference stack atop a 5000 Å AlCu layer.

8. Reflectance of Pixel vs. Field

During examination of the effect of processing upon reflectance, an unexpected source of systematic variation arose between the smaller 12 mm pixel region of the wafer, and the unpatterned portion of the test site, sometimes referred to as the "field". This difference in reflectance may be attributable to several different factors.

A. REC Thickness of Field vs. Pixel

Figure 26:
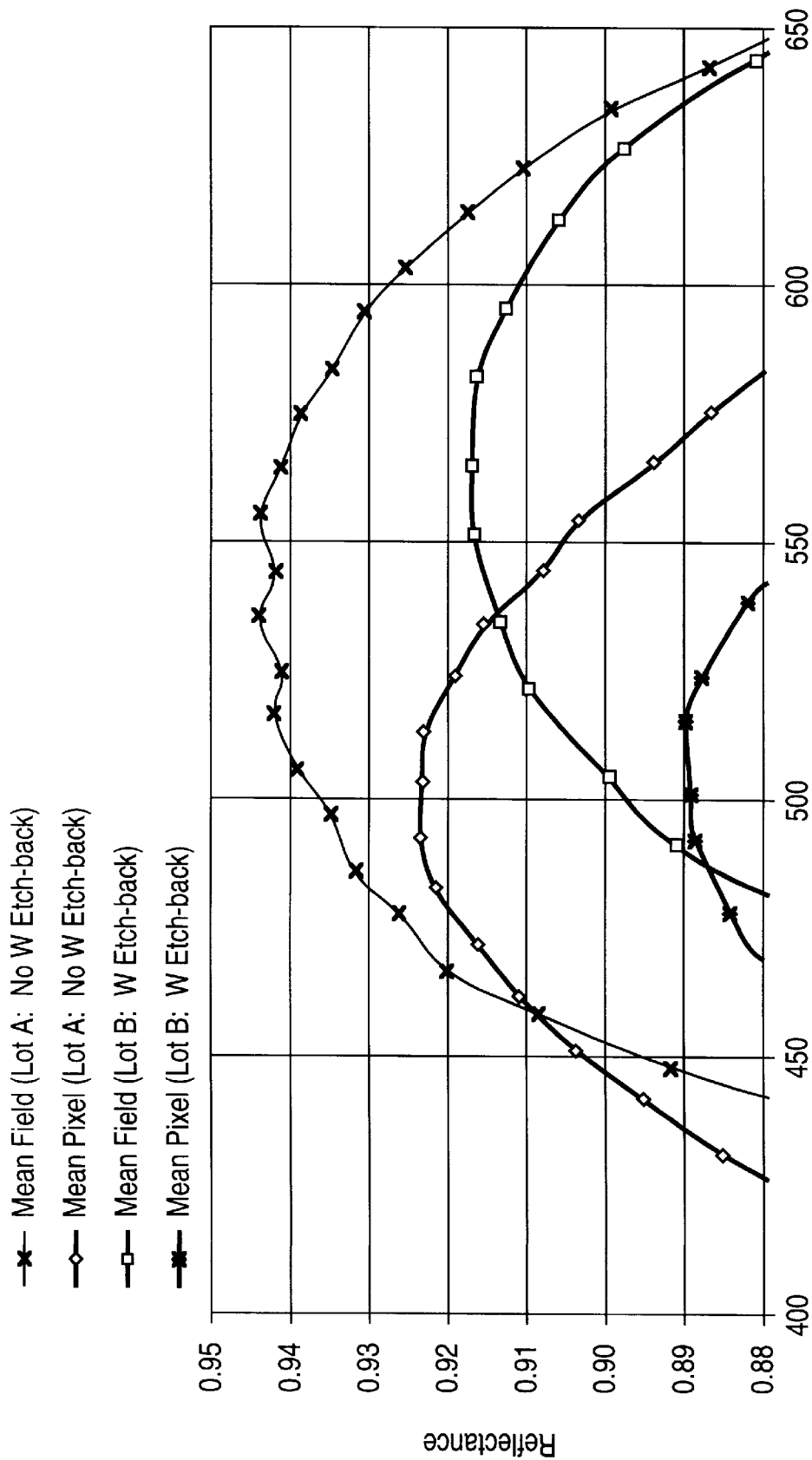
FIG. 26 plots reflectance in the field and pixel region of a lot of wafer's including via processing and a lot of wafers not including via processing.

Differing thickness in the REC overlying the pixel and field regions was initially indicated from review of the reflectance data shown in FIG. 26. FIG. 26 illustrates reflectance measurements from the field region and the pixel region of two lots of wafers: lot A included vias underlying the metal layer and lot B did not include such vias. In both lot A and lot B, the reflectance of the field region was greater than the reflectance of the pixel region.

Figure 27:
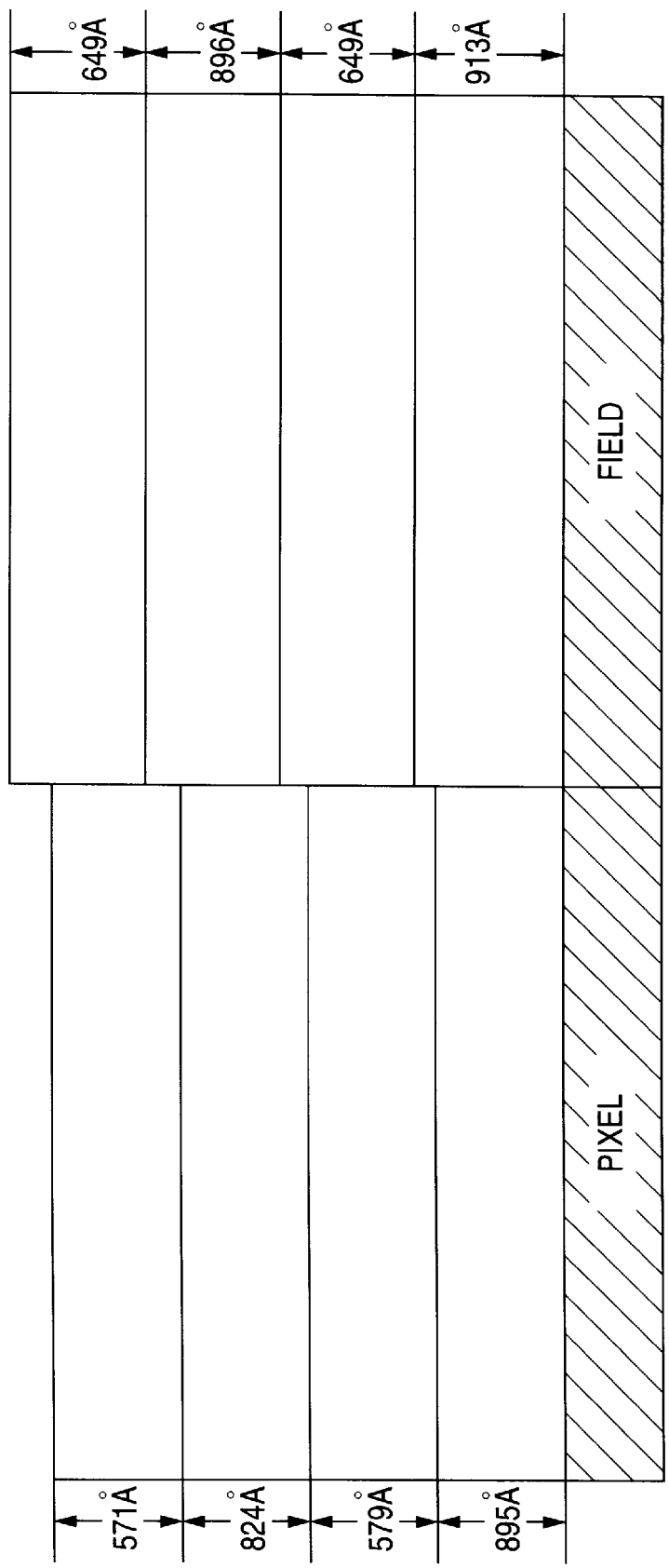
FIG. 27 shows a representation of a TEM cross-section of a four layer REC over field and pixel regions of a wafer from the same lot.

This result is confirmed by FIG. 27. FIG. 27 shows TEM cross sections over field region and pixel regions showing the thickness of a four layer REC. FIG. 27 consistently indicates the increased thickness of the REC layers over the field region as contrasted with their thickness over the pixel region.

Figure 28:
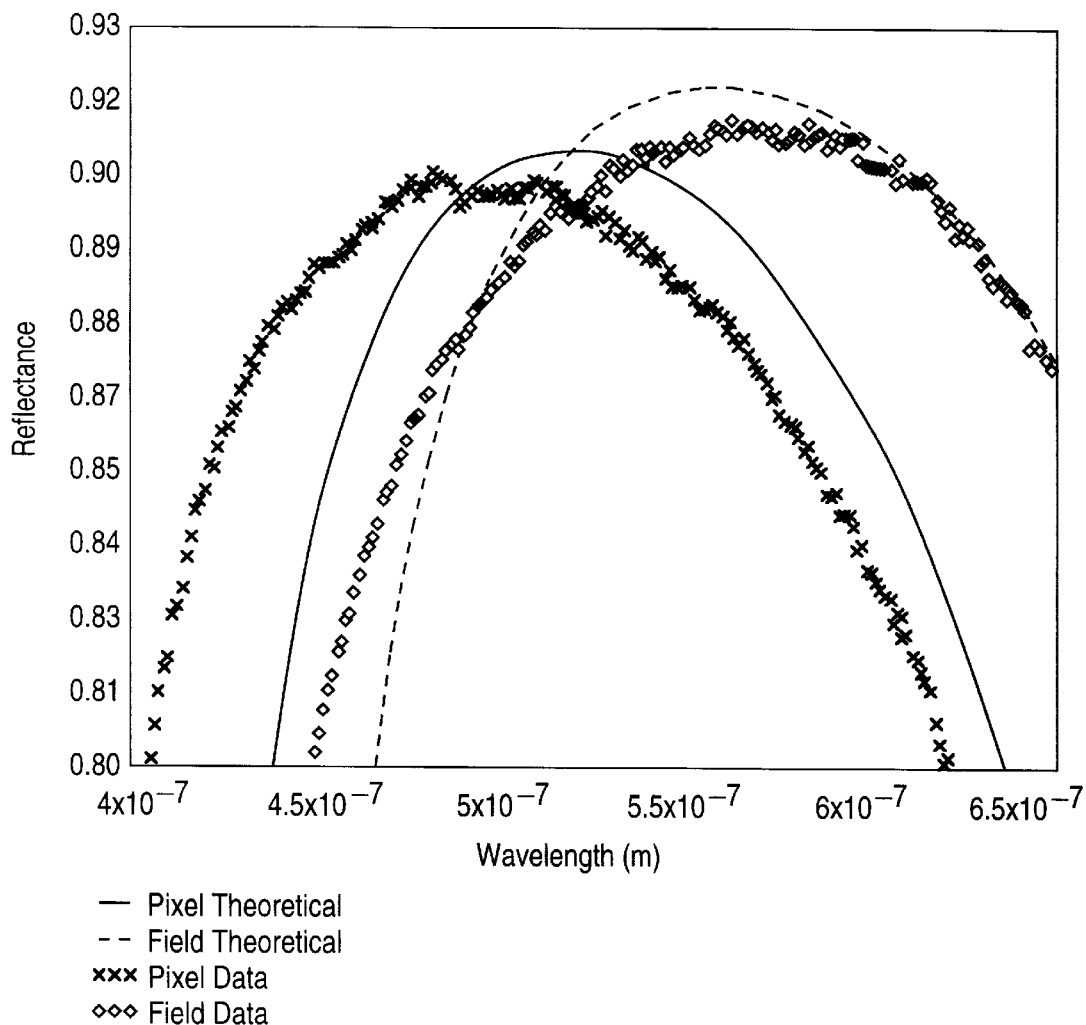
FIG. 28 plots theoretical and measured reflectance of the wafer whose TEM cross-section is shown in FIG. 27.

FIG. 28 presents theoretical and measured reflectance of the wafer whose cross-section is shown in FIG. 27. Theoretical reflectance is calculated utilizing Equation (5) and the film thicknesses shown in FIG. 27. Although the theoretical and measured reflectance spectra are not in exact agreement, FIG. 28 verifies the predicted relationship between thickness and spectral response: as the REC film thickness decreases, the reflectance spectra shifts to the left of the wavelength spectra.

Possible sources of error attributed to the difference in theoretical and measured reflectance spectra are:
(1) incorrect extrapolation of the thickness from the TEM are incorrect;
(2) incorrect dispersion of AlCu used in the calculation, and/or
(3) measurement of reflectance on the wafer not the same location as the TEM cross-section (i.e., the thicknesses were not the same).

B. Pixel "Dimple"

Figure 2:
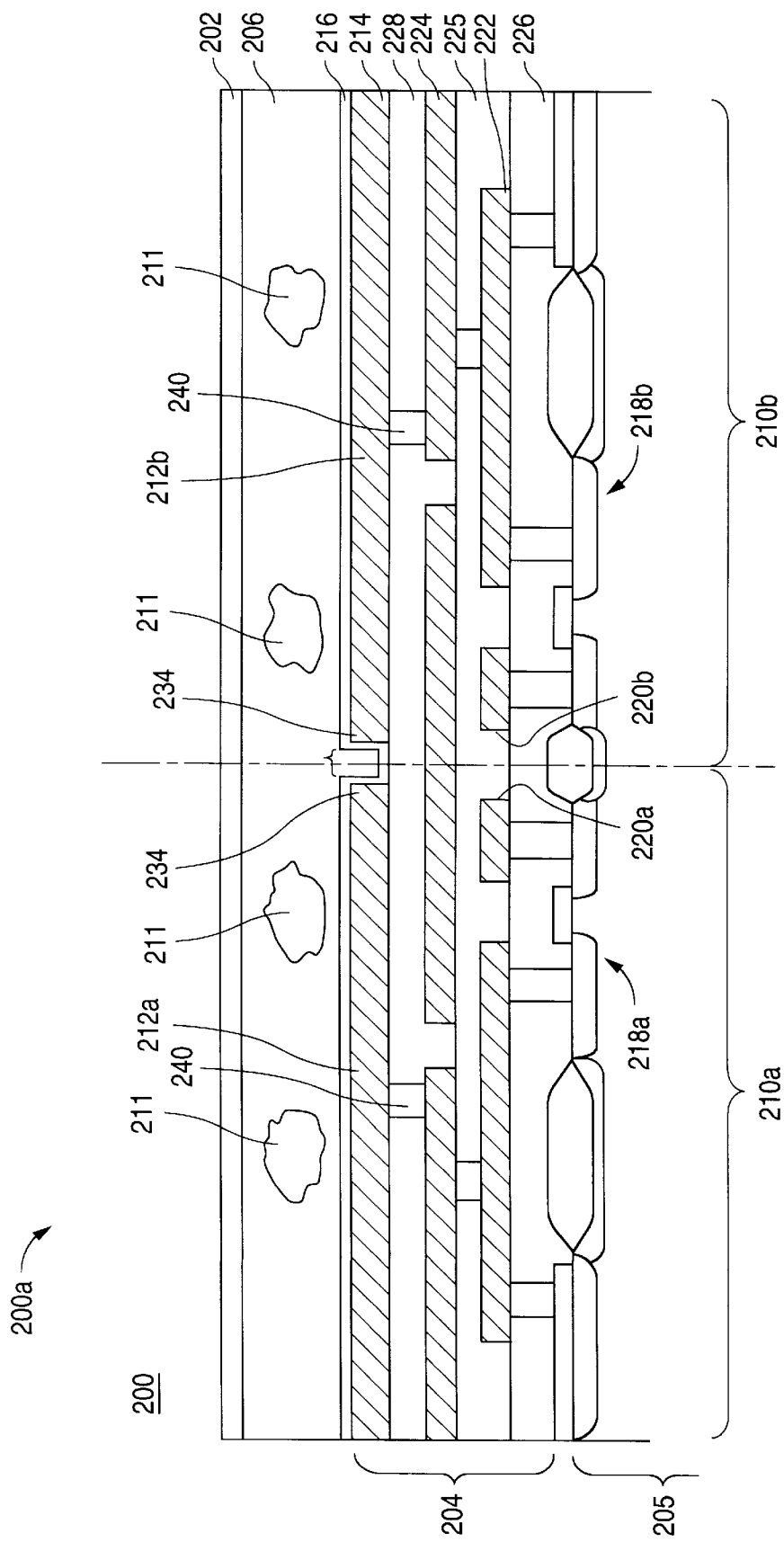
FIG. 2 illustrates a cross-sectional view of adjacent pixel cell structures that form a portion of a conventional light valve.

As shown in FIG. 2, the pixel electrodes 212a and 212b make electrical contact with the underlying storage capacitor structures 218a and 218b through underlying via 240 and interconnect metallization 222 and 224. Specifically, FIGS. 3C–3E, show etching of via 340 into the highest intermetal dielectric layer 328. Next, a via liner layer 342 comprising of titanium and titanium nitride is formed, and then tungsten 344 is deposited over the entire wafer. Finally, tungsten 344 is globally etched from the wafer surface.

This final etch shown in FIG. 3F removes tungsten in a direction normal to the surface of the wafer, and as a result leaves tungsten in the void which was previously created in the highest intermetal dielectric layer. To ensure that no residual tungsten is left on the surface of titanium nitride atop the highest intermetal dielectric layer, the tungsten etch is increased for a duration that is slightly longer than needed to etch the maximum tungsten thickness. As a result of this overetch, the tungsten plug 344a is located slightly lower than the surface of the titanium nitride via liner layer.

As the pixel electrode layer 312 is formed above the via, the deposited AlCu conforms to the titanium nitride and tungsten plug topography and a depression or "dimple" 347 is formed in the center of the pixel electrode.

Figure 29:
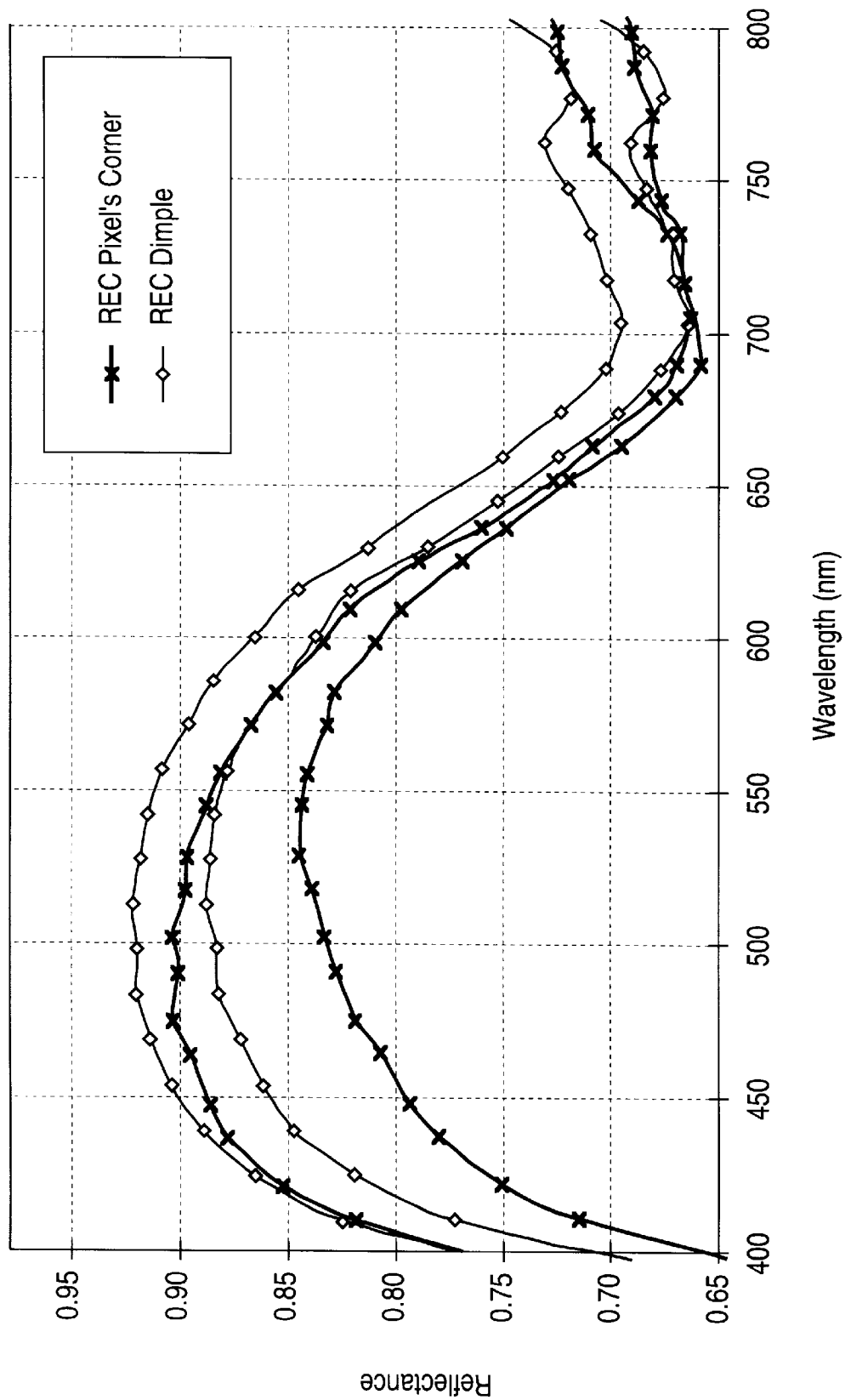
FIG. 29 plots maximum and minimum reflectance of the center (pixel region) and corner (field region) of pixel cells on the same wafer.

FIG. 29 illustrates high and low reflectance respectively, of the center and corner (field region) of pixel cells on the same wafer. FIG. 29 indicates that reflectance was consistently lower in the pixel region than in the field region. This difference in reflectance may possibly be attributable to
1) scattering from the edge of the pixel,
2) diffraction from the edge of the pixel, or
3) misalignment of the 10 $\mu$m diameter of the measurement spot (which is approximately the same size as the pixel).

9. Conclusion

Figure 30A:
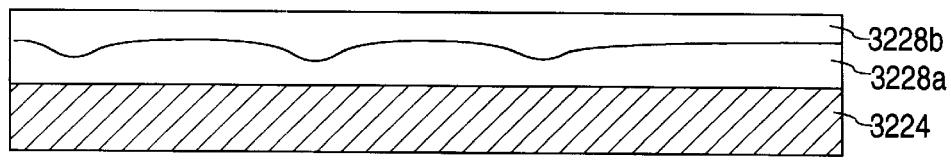
FIGS. 30A–30O show cross-sectional views of a process flow that incorporates many of the processing steps in accordance with the present invention.
Figure 30B:
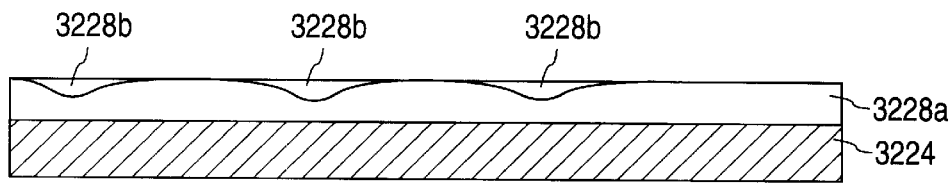
Figure 30C:
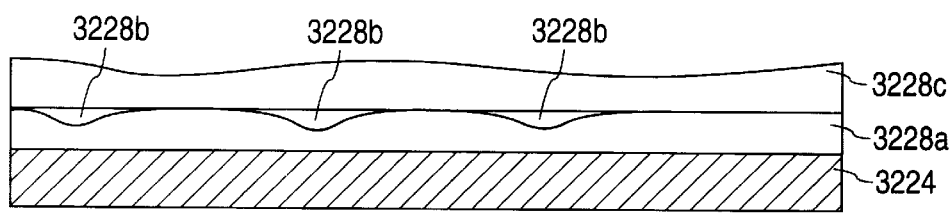
Figure 30D:
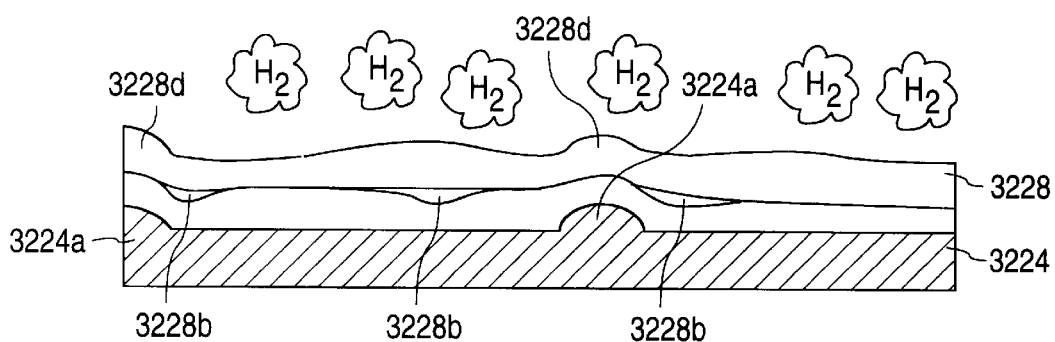
Figure 30E:
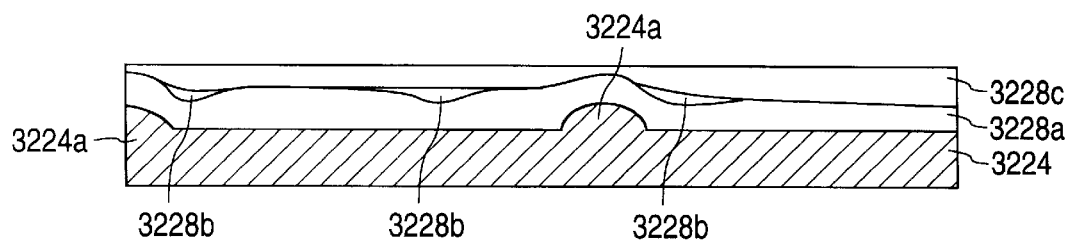
Figure 30F:
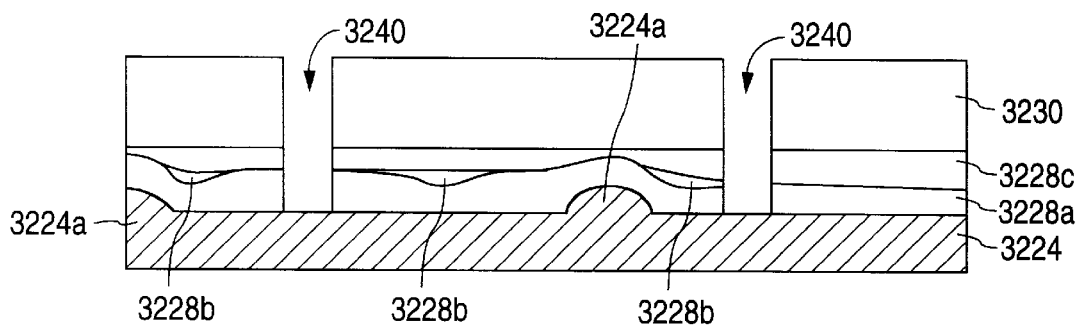
Figure 30G:
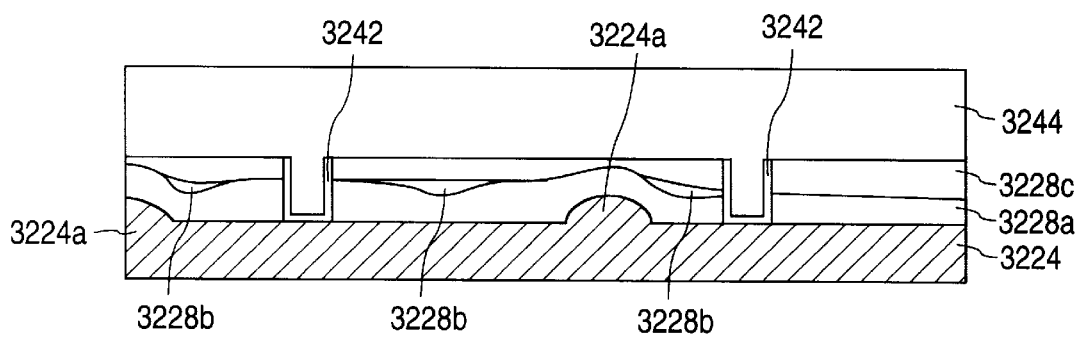
Figure 30H:
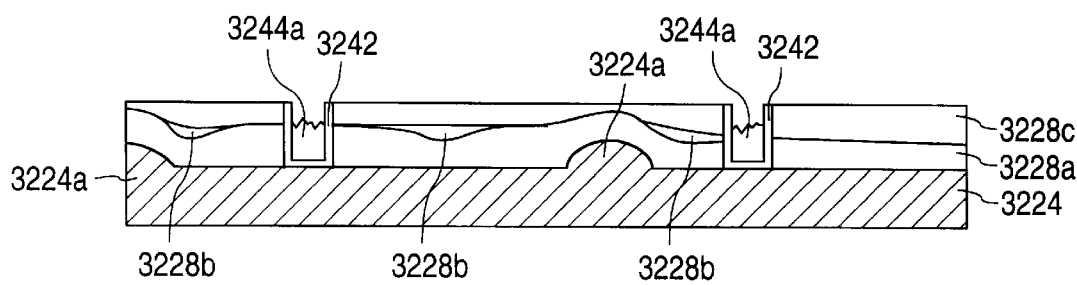
Figure 30I:
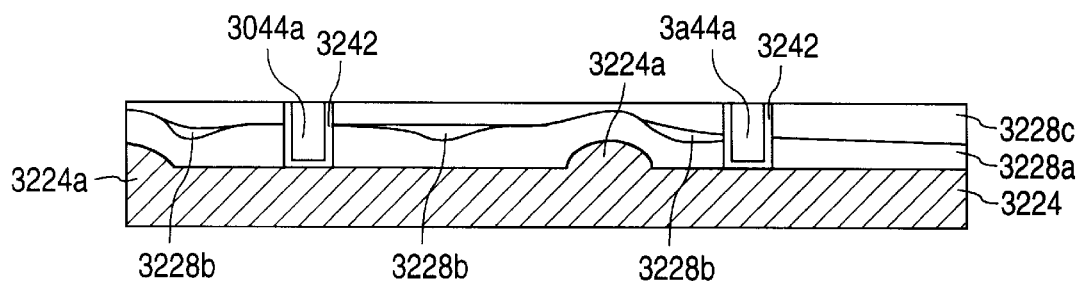
Figure 30J:
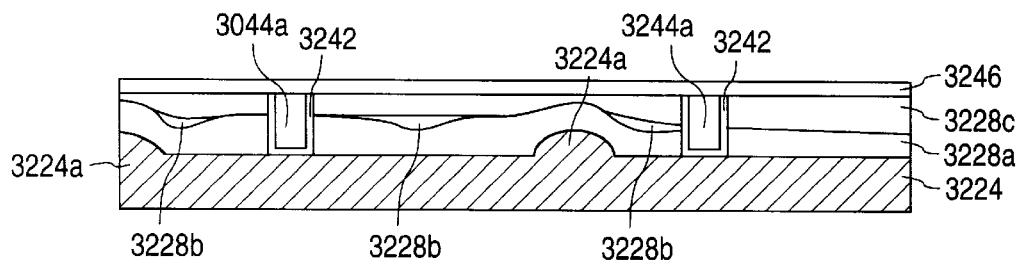
Figure 30K:
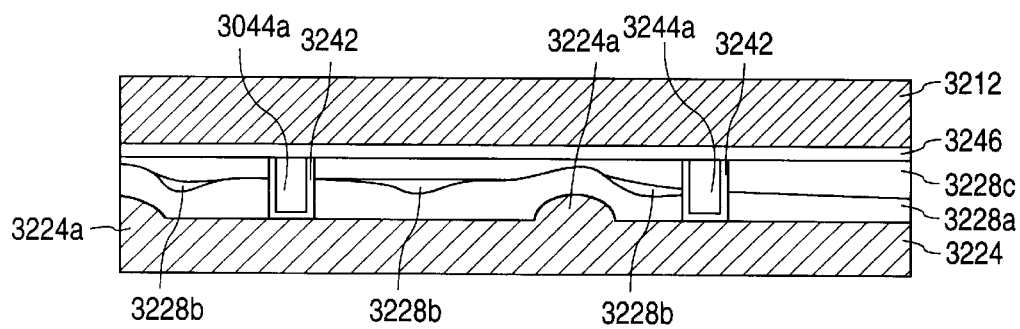
Figure 30L:
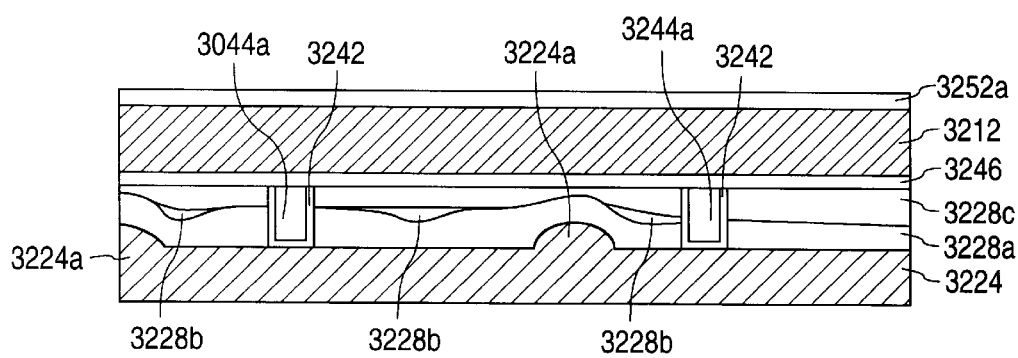
Figure 30M:
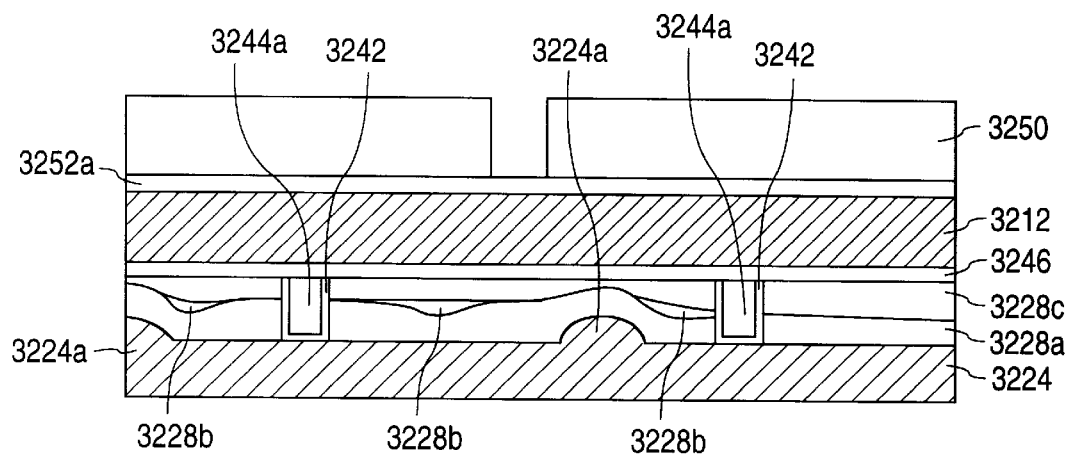
Figure 30N:
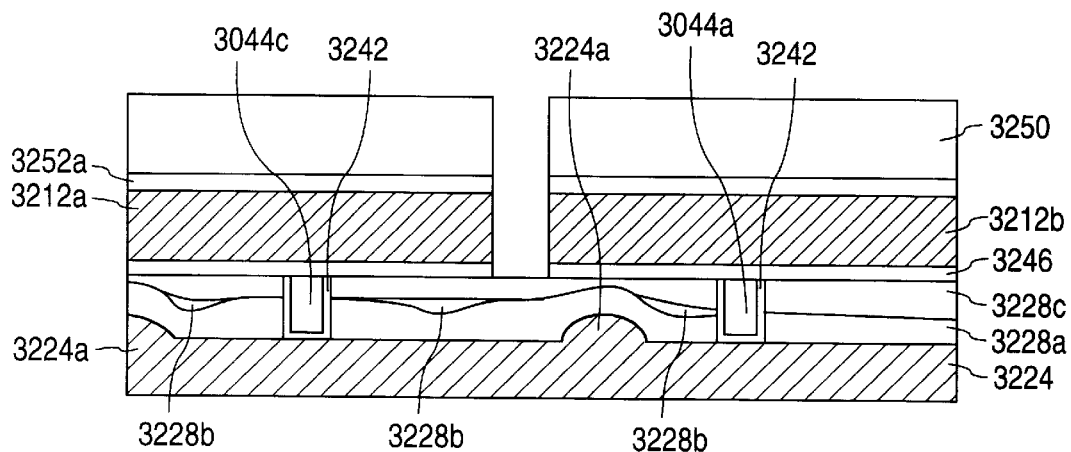
Figure 30O:
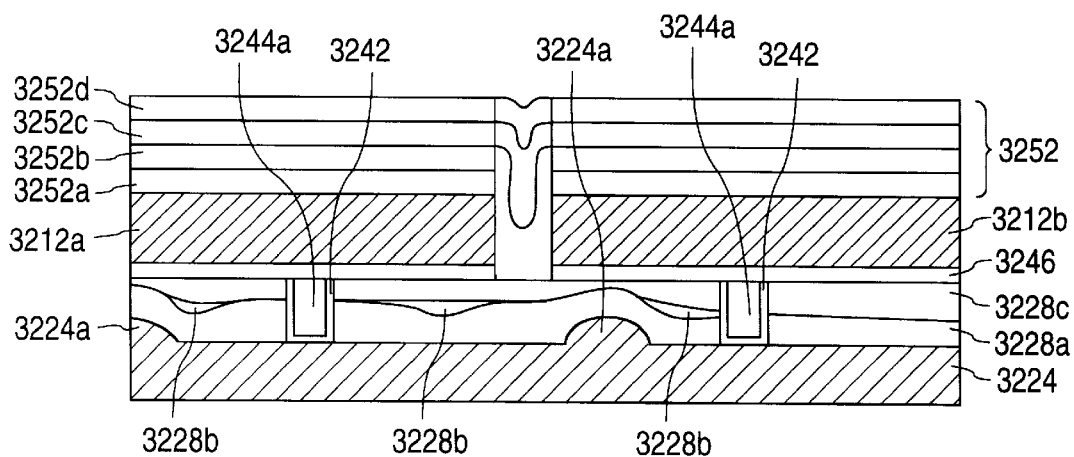

FIGS. 30A–30O show cross-sectional views of a process flow that incorporates steps in accordance with the various embodiments of the present invention.

FIG. 30A illustrates formation of TEOS base 3228a and SOG 3228b upon metallization layer 3224. FIG. 30B illustrates planarization of the intermetal dielectric by etchback of SOG 3228b. FIG. 3C shows formation of TEOS cap 3228c over planarized TEOS base 3228a and SOG 3228b, forming highest intermetal dielectric layer 3228.

FIG. 30D shows exposure of metallization layer 3224 and intermetal dielectric layer 3228 to heating and diffusion of $H_2$ gas in order to accomplish alloy/sintering of the underlying silicon-metallization junctions. This alloy step may cause growth or movement of grains of metallization layer 3224, giving rise to bumps 3224d in metallization layer 3224 and corresponding hillocks 3228a in dielectric layer 3228.

FIG. 30E illustrates leveling of the surface of intermetal dielectric layer 3228 by chemical-mechanical polishing.

This chemical-mechanical polishing step substantially removes bumps 3228a in dielectric layer 3228 attributable to the movement or growth of grains of metallization layer 3224 during the previous alloy/sintering step.

FIG. 30F illustrates the patterning of a photoresist mask 3230 over the planarized surface of highest intermetal dielectric 3228, followed by etching to create vias 3240.

FIG. 30G illustrates formation of a liner layer within vias 3240, followed by the formation of a layer of Tungsten 3244 over the highest intermetal dielectric 3228, including the vias. FIG. 30H illustrates etchback of Tungsten layer 3244 to remove Tungsten outside of the vias. FIG. 30I illustrates CMP following Tungsten etchback to reduce roughness contributed by the remaining via liner layer 3242.

FIG. 30J illustrates formation of the pixel adhesion underlayer 3246 formed from a layer of collimated Titanium between approximately 100 Å and 400 Å thick.

FIG. 30K shows formation of the pixel electrode layer 3212 on top of pixel adhesion underlayer 3246. Pixel electrode layer 3212 is formed by depositing an AlCu mixture at approximately 175° C.

FIG. 30L illustrates formation of first dielectric film 3252a on top of freshly deposited pixel electrode layer 3212. First dielectric film constitutes the lowest layer of the REC, and is deposited at a temperature as close as possible to the temperature at which the pixel electrode layer is formed.

FIG. 30M illustrates the formation of pixel photoresist mask 3250 on top of first dielectric film 3252a. FIG. 30N illustrates etching of first dielectric film 3252a, pixel electrode layer 3212, and pixel adhesion layer 3246 in regions unmasked by pixel photoresist mask 3250. This etching step creates the individual pixel cells by defining individual pixel electrodes 3212a and 3212b from pixel electrode layer 3212.

FIG. 30O shows completion of REC 3252 by forming second, third, and fourth dielectric films 3252b, 3252c, and 3252d respectively, on top of first dielectric film 3252d. During this step, dielectric material from films 3252b, 3252c, and 3252d enters into the etched gap 3260, further electrically isolating pixel electrodes 3212a and 3212b.

Although the invention has been described above in FIGS. 30A–30O in connection with one specific preferred embodiment of the process in accordance with the present invention, it should be understood that the invention as claimed should not be unduly limited to this exact process flow. Various other modifications and alterations in the process of this invention will be apparent to those skilled in the art without departing from the scope and spirit of the present invention.

For example, the discrete steps of the process depicted in the preferred embodiment of the present invention may be employed separately, as well as in combination. Thus, CMP following alloy of silicon/metal contacts can improve reflectance independent of use in conjunction with CMP after W etchback and/or REC formation. Similarly, formation of the REC in accordance with the present invention can be performed independent of whether or not CMP after SOG planarization of intermetal dielectric and/or CMP after tungsten etchback is performed.

Furthermore, the process in accordance with the present invention is not necessarily limited to the precise order of process steps described above in FIGS. 30A–30O. For example, all of the REC layers could be deposited prior to the etch of the pixel electrode layer to create the individual pixel cells without departing from the scope of the present invention.

Moreover, the process in accordance with the present invention is not limited to the specific process parameters cited to describe the first embodiment. Deposition of the pixel electrode layer and REC can occur at any feasible processing temperature, with the primary limitation being smallness in the size of the metal grain formed, and maintenance of as small a difference as possible between the temperature of metal and REC formation in order to suppress the creation of hillocks.

Therefore, it is intended that the following claims define the scope of the present invention, and that the methods and structures within the scope of these claims and their equivalents be covered hereby.

What is claimed is:

1. A process for forming a reflective electrode comprising the steps of:

forming a highest interconnect metallization layer over a silicon substrate having silicon-metal contacts;

forming a highest intermetal dielectric layer on top of the highest interconnect metallization;

heating the highest intermetal dielectric in the presence of hydrogen to alloy the silicon-metal contacts;

planarizing the highest intermetal dielectric after the heating step;

creating a via in the highest intermetal dielectric;

lining the walls of the via with a liner layer;

filling the via with an electrically conductive material;

forming an electrode adhesion layer on top of the highest level intermetal dielectric and the via;

forming an electrode layer on top of the electrode adhesion layer; and forming a reflectance enhancing coating on top of the electrode layer, the reflectance enhancing coating generating constructive interference of light waves reflected by the electrode layer.

2. The process according to claim 1 wherein:

the step of forming the intermetal dielectric comprises the steps of forming a base oxide layer, forming an etchback layer over the base oxide layer, etching the etchback layer, and forming a cap oxide layer over the etchback layer and the base oxide layer; and the step of planarizing the highest intermetal dielectric comprises the step of chemical mechanical polishing the cap oxide layer.

3. The process according to claim 2 further comprising the step of chemical mechanical polishing a top surface of the filled via prior to forming the electrode adhesion layer.

4. The process according to claim 3 wherein the step of forming an electrode adhesion layer includes forming a layer of collimated Titanium between approximately 100 Å and 400 Å thick.

5. The process according to claim 3 wherein the step of forming an electrode layer includes depositing metal at a first temperature, the first temperature maintained as low as possible such that the grain size and roughness of the electrode layer are minimized.

6. The process according to claim 5 wherein the step of forming an electrode layer includes depositing a mixture of approximately 99.5% aluminum and 0.5% copper by weight at a temperature of approximately 50° C.

7. The process according to claim 5 wherein the step of forming an electrode layer includes depositing a mixture of approximately 99.5% aluminum and 0.5% copper by weight at a temperature of approximately 175° C.

8. The process according to claim 5 wherein the step of forming a reflectance enhancing coating includes the step of forming a first dielectric film on top of the electrode layer immediately after formation of the electrode layer.

9. The process according to claim 8 wherein the step of forming a first dielectric film includes depositing the first dielectric film at a second temperature as close as possible to the first temperature, such that formation of hillocks in the electrode layer is suppressed.

10. The process according to claim 9 wherein
the step of forming an electrode layer includes depositing a mixture of 99.5% aluminum and 0.5% copper by weight at a first temperature of approximately 50° C., and
the step of forming the first dielectric film includes depositing the first dielectric film at a second temperature of approximately 300° C.

11. The process according to claim 9 wherein
the step of forming an electrode layer includes depositing a mixture of 99.5% aluminum and 0.5% copper by weight at a first temperature of approximately 175° C., and
the step of forming the first dielectric film includes depositing the first dielectric film at a second temperature of approximately 300° C.

12. The process according to claim 8 wherein the step of forming a reflectance enhancing coating further includes the steps of forming a first dielectric film of $SiO_2$ on top of the electrode layer, forming a second dielectric film of $Si_3N_4$ on top of the first dielectric film, forming a third dielectric film of $SiO_2$ on top of the second dielectric film, and forming a fourth dielectric film of $Si_3N_4$ on top of the third dielectric film.

13. A process for forming a reflective metal surface comprising the steps of:
providing a supporting surface having metal/semiconductor;
heating the supporting surface in presence of hydrogen to alloy the metal-semiconductor contacts;
chemical mechanical polishing the supporting surface after the heating step;
forming an adhesion layer;
depositing a metal layer on top of the adhesion layer at a first temperature, the first temperature as low as possible such that the grain size of the deposited metal layer is minimized;
depositing a reflectance enhancing coating immediately following deposition of the metal layer, the reflectance enhancing coating including a first dielectric film deposited on top of the metal layer at a second temperature as close as possible to the first temperature to suppress hillock formation in the metal layer, wherein the reflectance enhancing coating generates constructive interference of light waves reflected by the metal layer.

14. The process according to claim 13 wherein
the step of depositing the metal layer includes depositing a mixture of 99.5% aluminum and 0.5% copper by weight at a first temperature of approximately 175° C., and
the step of forming a reflectance enhancing coating includes depositing a first dielectric film at a second temperature of approximately 300° C.

15. The process according to claim 13 wherein
the step of depositing the metal layer includes depositing a mixture of 99.5% aluminum and 0.5% copper by weight at a first temperature of approximately 50° C., and
the step of forming a reflectance enhancing coating includes depositing a first dielectric film at a second temperature of approximately 300° C.

16. The process according to claim 13 wherein the step of forming a reflectance enhancing coating further includes the steps of forming a first dielectric film of $SiO_2$ on top of the electrode layer, forming a second dielectric film of $Si_3N_4$ on top of the first dielectric film, forming a third dielectric film of $SiO_2$ on top of the second dielectric film, and forming a fourth dielectric film of $Si_3N_4$ on top of the third dielectric film.

17. A process for forming a liquid crystal light valve having a plurality of reflective pixel electrodes, the process comprising the steps of:
forming a highest interconnect metallization layer over a silicon substrate having silicon-metal contacts;
forming a highest intermetal dielectric layer on top of the highest interconnect metallization;
heating the highest intermetal dielectric in the presence of hydrogen to alloy the silicon-metal contacts;
planarizing the highest intermetal dielectric after the heating step;
creating a via in the highest intermetal dielectric;
lining the walls of the via with a liner layer;
filling the via with an electrically conducting material;
forming an electrode adhesion layer on top of the highest level intermetal dielectric and the via;
forming an electrode layer on top of the electrode adhesion layer;
forming a reflectance enhancing coating on top of the electrode layer, the reflectance enhancing coating generating constructive interference of light waves reflected by the electrode layer; and
defining a plurality of electrically isolated reflective pixel electrodes by etching the reflectance enhancing coating, the electrode layer, and the pixel adhesion layer in selected regions.

18. The process according to claim 17 wherein:
the step of forming the intermetal dielectric comprises the steps of forming a base oxide layer, forming an etchback layer over the base oxide layer, etching the etchback layer, and forming a cap oxide layer over the etchback layer and the base oxide layer; and
the step of planarizing the highest intermetal dielectric comprises the step of chemical mechanical polishing the cap oxide layer.

19. The process according to claim 18 further comprising the step of chemical mechanical polishing a top surface of the filled via prior to forming the pixel adhesion layer.

20. The process according to claim 19 wherein the step of forming an electrode layer includes depositing a metal at a first temperature, the first temperature maintained as low as possible such that the grain size and roughness of the electrode layer are minimized.

21. The process according to claim 20 wherein the step of forming a reflectance enhancing coating includes the step of depositing a first dielectric film at a second temperature as close as possible to the first temperature, such that formation of hillocks in the pixel electrode layer is suppressed.

22. The process according to claim 21 wherein
the step of forming an electrode layer includes depositing a mixture of 99.5% aluminum and 0.5% copper by weight at a first temperature of approximately 50° C., and
the step of forming a first dielectric film includes depositing the first dielectric film at a second temperature of approximately 300° C.

23. The process according to claim 21 wherein the step of forming an electrode layer includes depositing a mixture of 99.5% aluminum and 0.5% copper by weight at a first temperature of approximately 175° C., and
the step of forming a first dielectric film includes depositing the first dielectric film at a second temperature of approximately 300° C.

* * * * *